US011675118B2

(12) United States Patent
Malhotra et al.

(10) Patent No.: US 11,675,118 B2
(45) Date of Patent: Jun. 13, 2023

(54) OPTICALLY ANISOTROPIC FILM STACK INCLUDING SOLID CRYSTAL AND FABRICATION METHOD THEREOF

(71) Applicant: Meta Platforms Technologies, LLC, Menlo Park, CA (US)

(72) Inventors: Tanya Malhotra, Redmond, WA (US); Tingling Rao, Bellevue, WA (US); Liliana Ruiz Diaz, Redmond, WA (US); Oleg Yaroshchuk, Kyiv (UA); Sheng Ye, Redmond, WA (US); Andrew John Ouderkirk, Kirkland, WA (US); Alexander Koshelev, Redmond, WA (US); Lafe Joseph Purvis, II, Redmond, WA (US); Junren Wang, Kirkland, WA (US); Arman Boromand, Issaquah, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/363,982

(22) Filed: Jun. 30, 2021

(65) Prior Publication Data
US 2022/0082749 A1    Mar. 17, 2022

Related U.S. Application Data

(60) Provisional application No. 63/078,863, filed on Sep. 15, 2020.

(51) Int. Cl.
*G02B 5/30* (2006.01)

(52) U.S. Cl.
CPC ......... *G02B 5/3041* (2013.01); *G02B 5/3016* (2013.01); *C09K 2323/03* (2020.08); *C09K 2323/031* (2020.08); *C09K 2323/035* (2020.08)

(58) Field of Classification Search
CPC ............... G02B 5/3041; G02B 5/3016; C09K 2323/03; C09K 2323/031; C09K 2323/035
USPC ................... 428/1.3, 1.31, 1.33; 359/483.01
See application file for complete search history.

(56) References Cited

U.S. PATENT DOCUMENTS

| 4,153,529 A | 5/1979 | Little et al. |
| 2006/0286396 A1* | 12/2006 | Jonza ................ B32B 27/308 428/480 |

OTHER PUBLICATIONS

Janning, J., "Thin film surface orientation for liquid crystals," Applied Physics Letters, vol. 21, No. 4, Aug. 15, 1972, pp. 173-174 (2 pages).
Motohiro, T., et al., "Sputter-deposited SiOx films for liquid crystal alignment," Thin Solid Films, vol. 185, Issue 1, 1990, pp. 137-144 (8 pages).

(Continued)

*Primary Examiner* — Ruiyun Zhang
(74) *Attorney, Agent, or Firm* — Millburn IP PLLC

(57) ABSTRACT

A film stack includes a plurality of first films and a plurality of second films alternately stacked. At least one second film of the plurality of second films includes a solid crystal including crystal molecules aligned in a predetermined alignment direction. At least one first film of the plurality of first films includes an alignment structure configured to at least partially align the crystal molecules of the solid crystal in the predetermined alignment direction.

15 Claims, 42 Drawing Sheets

(56) References Cited

OTHER PUBLICATIONS

Yaroshchuk, O., et al., "Photoalignment of liquid crystals: basics and current trends," Journal of Materials Chemistry, vol. 22, 2012, pp. 286-300 (15 pages).

Yaroshchuk, O., et al., "Planar and tilted uniform alignment of liquid crystals by plasma-treated substrates," Liquid Crystals, vol. 31, No. 6, 2004, pp. 859-869 (11 pages).

Khakhlou, A., et al., "Second wind of the oblique deposition method of liquid-crystal alignment: Ion-beam sputtering technique," Journal of the Society for Information Display, vol. 4, Issue 3, 2006, pp. 257-263 (7 pages).

Chaudhari, P., et al., "Atomic-beam alignment of inorganic materials for liquid-crystal displays," Nature, vol. 411, May 3, 2021, pp. 56-59 (4 pages).

\* cited by examiner

A — B — C — D — E

A: alkyl, alkoxy, or alkenyl

B/D:

M: S, N, or Si

C: -CH$_2$-, -C$_2$H$_4$-, -(C≡C)-, , -(N=N)-

E: -CN, -Br, -F, -Cl, -CF$_3$, -SNC, -NCS, -OCF$_3$, -SF$_5$, Alkyl, Alkoxy, or mono- or polyfluorinated C$_1$-C$_{10}$ alkyl

OPTICALLY ANISOTROPIC FILM STACK INCLUDING SOLID CRYSTAL AND FABRICATION METHOD THEREOF

CROSS-REFERENCE TO RELATED APPLICATION

This application claims the benefit of priority to U.S. Provisional Patent Application No. 63/078,863, filed on Sep. 15, 2020, the entire content of which is incorporated by reference.

TECHNICAL FIELD

The present disclosure relates generally to optical devices and, more specifically, to an optically anisotropic film stack including a solid crystal and a fabrication method thereof.

BACKGROUND

Visually appealing, light-weight, compact, and power efficient consumer electronic devices are in high demand. Accordingly, it is desirable to design optical elements or devices implemented in these devices such that these devices can be adaptive, optically efficient, light-weight, compact, and broadband. Technology for fabricating optical devices with enhanced optical performance and physical properties has become an attractive topic for research and development. Liquid crystals ("LCs") have been used to fabricate polarization selective optical elements. Optical characteristics of the polarization selective optical elements may depend on the refractive index and/or birefringence of LCs. For example, an angular and diffraction bandwidth of a polarization selective grating may increase as the birefringence of LCs increases. Currently available LCs may be formulated to achieve a large refractive index of about 1.97 and a large birefringence of about 0.3. Optical elements based on materials having higher refractive index and larger birefringence are highly desirable to reduce the size and weight and to enhance the optical characteristics.

SUMMARY OF THE DISCLOSURE

One aspect of the present disclosure provides a film stack. The film stack includes a plurality of first films and a plurality of second films alternately stacked. At least one second film of the plurality of second films includes a solid crystal including crystal molecules aligned in a predetermined alignment direction. At least one first film of the plurality of first films includes an alignment structure configured to at least partially align the crystal molecules of the solid crystal in the predetermined alignment direction.

Another aspect of the present disclosure provides a method. The method includes providing a first alignment structure on a surface of a substrate. The method includes forming a first solid crystal on the first alignment structure. The first solid crystal includes first crystal molecules aligned in a first alignment direction. The method includes providing a second alignment structure on the first solid crystal. The method includes forming a second solid crystal on the second alignment structure. The second solid crystal includes second crystal molecules aligned in a second alignment direction. Refractive indices of the first solid crystal and the first alignment structure in a first in-plane direction are different.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
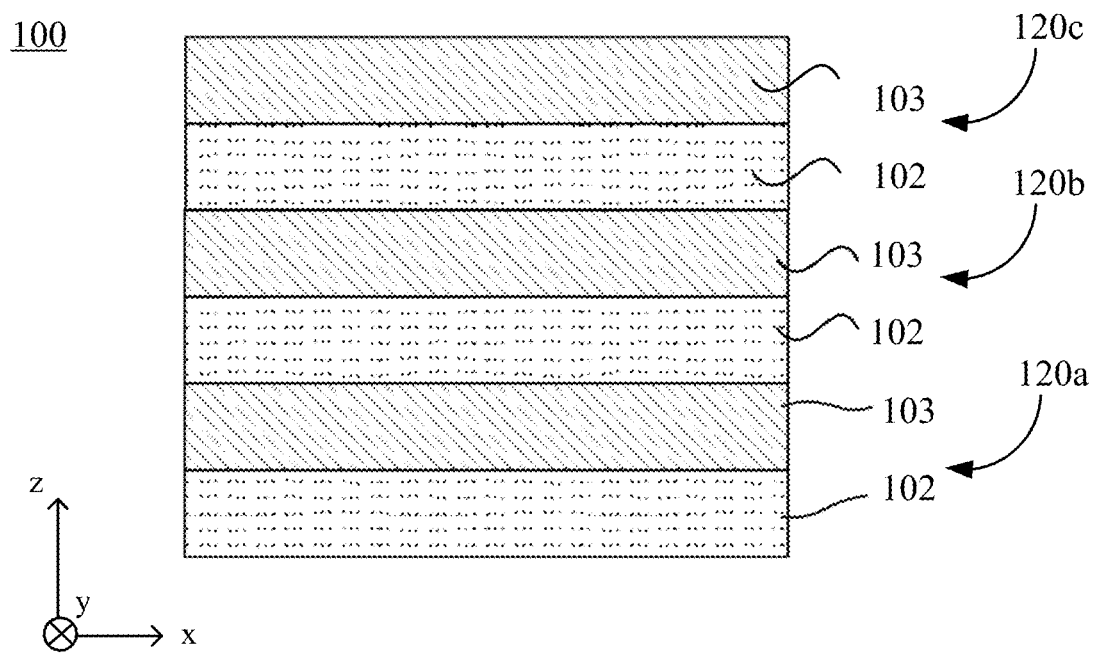
FIG. 1A illustrates a schematic cross-sectional view of a film stack, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical devices refers to a configuration in which the two optical devices are arranged in an optical series, and a light output from one optical device may be directly or indirectly received by the other optical device. An optical series refers to optical positioning of a plurality of optical devices in a light path, such that a light output from one optical device may be transmitted, reflected, diffracted, converted, modified, or otherwise processed or manipulated by one or more of other optical devices. In some embodiments, the sequence in which the plurality of optical devices are arranged may or may not affect an overall output of the plurality of optical devices. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" has a meaning similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared ("IR") wavelength range, or a combination thereof.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable. The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" or "out-of-plane orientation" indicates a direction or an orientation that is non-parallel to the plane of the film or layer (e.g., perpendicular to the surface plane of the film or layer, e.g., perpendicular to a plane parallel to the surface plane). For example, when an "in-plane" direction or orientation refers to a direction or an orientation within a surface plane, an "out-of-plane" direction or orientation may refer to a thickness direction or orientation perpendicular to the surface plane, or a direction or orientation that is not parallel with the surface plane.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("ROM"), a flash memory, etc.

Reflective polarizers are used in many display-related applications, e.g., for brightness enhancement within display systems that use a polarized light. For example, a light source such as micro light-emitting diodes ("uLEDs" or "mLEDs") may be configured to generate an unpolarized light. In a near-eye display or a head-up display, when the unpolarized light is projected to a polarization selective combiner, the coupling efficiency may be reduced. One approach to increase the efficiency to a desirable level is to convert the unpolarized light into a polarized light by applying a brightness enhancement film in front of µLED (or mLED) pixels. The brightness enhancement film may include a reflective polarizer (also referred to as a polarized birefringent mirror). A conventional multilayer reflective polarizer may include alternating polymeric layers having different refractive indices. A thickness of the multilayer reflective polarizer depends on the number of layers and the refractive index (both ordinary and extraordinary refractive indices values) of the materials from which the multilayer reflective polarizer is fabricated. A conventional multilayer reflective polarizer has a thickness of tens of micrometers because of the birefringence limitation that can be achieved with existing polymeric layers. Such a thickness of the conventional multilayer reflective polarizer may cause the light to be reflected from the multilayer reflective polarizer and spread out. The reflected light maybe further reflected back to the eye from the adjacent pixels, resulting in a blurry image. It is highly desirable to reduce the overall thickness of the multilayer reflective polarizer while maintaining a high extinction ratio.

The present disclosure provides an optically anisotropic film stack (e.g., a thin-film stack) that may form, or be incorporated into, an optical element such as a reflective polarizer. The film stack may include a stack of alternating first films and the second films. In some embodiments, at least one of the plurality of second films may include a solid crystal (or a solid crystal material). The solid crystal may include crystal molecules aligned in a predetermined alignment pattern. In some embodiments, the solid crystal may be an anisotropic solid crystal, e.g., a uniaxially or biaxially birefringent film.

In some embodiments, a first film may include an anisotropic organic solid crystalline material (e.g., an anisotropic organic solid crystal), an anisotropic polymer (e.g., an anisotropic crystalline polymer), an anisotropic inorganic crystalline material (e.g., an anisotropic inorganic crystal), an isotropic material (e.g., an isotropic polymer (e.g., an amorphous polymer) or an isotropic inorganic crystal), or a combination thereof. In some embodiments, at least one of the plurality of first films may include an alignment structure configured to at least partially align the crystal molecules of the solid crystal of the second film in a predetermined alignment pattern (e.g., a predetermined alignment direction).

The first film may be an optically anisotropic film, e.g., a uniaxially or biaxially birefringent film. The second film may be an optically anisotropic (e.g., a uniaxially or biaxially birefringent film) film or an optically isotropic film. Each film may have a first in-plane refractive index in a first direction of the film, a second in-plane refractive index in a second direction of the film orthogonal to the first direction, and a third out-of-plane refractive index in a direction orthogonal to both the first direction and the second direction. A difference between the first in-plane refractive index and the second in-plane refractive index is referred to as an in-plane optical anisotropy of the film. When the film is an optically isotropic film, the in-plane optical anisotropy of the film is substantially zero.

In some embodiments, the second film may be configured to have a higher in-plane optical anisotropy than the first film. In some embodiments, the second film may be a uniaxially or biaxially birefringent film. In some embodiments, in the second film, a refractive index difference between the first in-plane refractive index and the second in-plane refractive index (i.e., the in-plane optical anisotropy) may be configured to be greater than or equal to about 0.2, greater than or equal to about 0.25, greater than or equal to about 0.3, greater than or equal to about 0.35, greater than or equal to about 0.4, greater than or equal to about 0.45, or greater than or equal to about 0.5. In some embodiments, in the second film, the first in-plane refractive index may be configured to be greater than the second in-plane refractive index. In some embodiments, in the first film, a refractive index difference between the first in-plane refractive index and the second in-plane refractive index (i.e., the in-plane optical anisotropy) may be configured to be smaller than or equal to about 0.1, smaller than or equal to about 0.08, smaller than or equal to about 0.05, or smaller than or equal to about 0.03. In some embodiments, the first film may be a uniaxially or biaxially birefringent film, in which the first in-plane refractive index may be configured to be greater than or substantially equal to the second in-plane refractive index. In some embodiments, the first film may be an optically isotropic film, in which the in first in-plane refractive index is configured to be substantially equal to the second in-plane refractive index.

In some embodiments, the first in-plane refractive index of the second film may be configured to be greater than the first in-plane refractive index of the first film. For example, a refractive index difference between the first in-plane refractive index of the second film and the first in-plane refractive index of the first film may be configured to be greater than or equal to about 0.2, greater than or equal to about 0.25, greater than or equal to about 0.3, greater than or equal to about 0.35, greater than or equal to about 0.4, greater than or equal to about 0.45, or greater than or equal to about 0.5. In some embodiments, a refractive index difference between the second in-plane refractive index of the second film and the second in-plane refractive index of the first film may be configured to be smaller than or equal to about 0.1, smaller than or equal to about 0.08, smaller than or equal to about 0.05, or smaller than or equal to about 0.03. In some embodiments, the second in-plane refractive index of the second film may be configured to be substantially equal to the second in-plane refractive index of the first film. In some embodiments, the second in-plane refractive index of the second film may be configured to be greater than the second in-plane refractive index of the first film. In some embodiments, the second in-plane refractive index of the second film may be configured to be smaller than the second in-plane refractive index of the first film.

In some embodiments, the third out-of-plane refractive index of the second film may be configured to be substantially equal to the third out-of-plane refractive index of the first film. In some embodiments, the third out-of-plane refractive index of the second film may be configured to be smaller than the third out-of-plane refractive index of the first film. In some embodiments, the third out-of-plane refractive index of the second film may be configured to be greater than the third out-of-plane refractive index of the first film.

A first film and a neighboring second film in direct contact with the first film may be referred to as a film set. The film stack may include a plurality of film sets. In some embodiments, different film sets may be configured to have an optical thickness of about half (0.5) wavelength for a same predetermined wavelength of interest (or a design wavelength), and different film sets may be configured to reflect lights having a substantially same predetermined wavelength range. The optical thickness measured in terms of wavelength may also be referred to as a wavelength thickness. In some embodiments, each film (e.g., first film and second film) in the film set may be configured to have a quarter (0.25) wavelength thickness for the predetermined wavelength of interest. In some embodiments, the first film and the second film in the same film set may be configured to have different wavelength thicknesses for the predetermined wavelength of interest. That is, the first film and the second film in the same film set may be configured to have different thicknesses.

In some embodiments, different film sets may be configured to have an optical thickness of about half (0.5) wavelength for different predetermined wavelengths of interest, and different film sets may be configured to reflect lights having different predetermined wavelength ranges. In some embodiments, each film in different film sets may be configured to have a quarter (0.25) wavelength thickness for different predetermined wavelengths of interest. For example, each film in a first film set may be configured to have a quarter (0.25) wavelength thickness for a first predetermined wavelength of interest, and each film in a second film set may be configured to have a quarter (0.25) wavelength thickness for a second predetermined wavelength of interest, and the first predetermined wavelength may be substantially different from the second predetermined wavelength. In some embodiments, the first film and the second film in the same film set may be configured to have different wavelength thicknesses for the predetermined wavelength of interest. That is, the first film and the second film in the same film set may be configured to have different thicknesses.

The solid crystal included in the at least one second film may be a single crystal or a polycrystal. The solid crystal material may include an organic material, an inorganic material, or a combination thereof. For example, the solid crystal may include an organic and crystalline material, an organic and non-crystalline material, an organic and amorphous material, an organic and semi-crystalline and semi-amorphous material, an inorganic and crystalline material, an inorganic and non-crystalline material, an inorganic and amorphous material, an inorganic and semi-crystalline and semi-amorphous material, an organic and semi-crystalline and semi-non-crystalline material, an inorganic and semi-crystalline and semi-non-crystalline material, or a combination thereof. For discussion purposes, a solid organic crystal material may be used as an example of the solid crystal material. For convenience of discussion, solid crystal molecules included in the solid crystal material may also be referred to as organic molecules or crystal molecules. It is understood that the technical solutions disclosed herein is not limited to organic crystal materials.

As used herein, an "axis" of a crystal (or solid crystal) may refer to an axis of the solid crystal along which the solid crystal has the highest or largest refractive index. An "axis" of a crystal molecule included in the solid crystal may refer to an axis of the crystal molecule along which the crystal molecule may have the highest or largest refractive index. The axis of the crystal may be an aggregated effect of the axes of the crystal molecules included in the crystal. Local orientations of axes of the crystal molecules included in the solid crystal (and hence the orientation of the axis of the solid crystal) may be configured, such that the solid crystal may provide at least one predetermined optical function for the optical device that includes the solid crystal. The orientation of the axis of the solid crystal may be an aggregated effect of the orientations of the axes of crystal molecules in the solid crystal. The above definitions of the axis of the solid crystal and the axis of the crystal molecules are for the convenience of discussion. The orientation of the axis of the solid crystal may also be referred to as a crystal orientation of the solid crystal. The orientations associated with the solid crystal and the crystal molecules are not limited to be defined by the axes along which the refractive index is the highest. Other suitable axes (e.g., axes along which the refractive index is the smallest, or axes perpendicular to the axes along which the refractive index is the highest) may be used as a configurable object for the discussion of the orientation of the solid crystal and the orientations of the crystal molecules, or for the discussion of the alignment pattern associated with the solid crystal or the crystal molecules.

In some embodiments, the solid crystal may have a first principal refractive index along a first direction, and a second principal refractive index along an in-plane direction perpendicular to the first direction. In some embodiments, the first direction may be parallel to the axis of the solid crystal along which the solid crystal may have the highest or largest refractive index. In some embodiments, the first principal refractive index of the solid crystal may be at least about 1.5, at least about 1.6, at least about 1.7, at least about 1.8, at least about 1.9, at least about 2.0, at least about 2.1, or at least about 2.2. In some embodiments, the first principal refractive index of the solid crystal may be in a range of about 1.6 to about 2.6. In some embodiments, an optical anisotropy (e.g., an in-plane birefringence) of the solid crystal may be at least about 0.1, at least about 0.2, at least about 0.3, at least about 0.35, at least about 0.4, at least about 0.45, or at least about 0.5.

In some embodiments, the orientation of the axis of the solid crystal may be configured by aligning the crystal molecules (e.g., aligning the orientations of the axes of the crystal molecules) in a predetermined alignment pattern. In some embodiments, the predetermined alignment pattern may refer to a non-natural alignment pattern of the crystal molecules in the solid crystal. The predetermined alignment pattern of the crystal molecules may be specifically designed, configured, or introduced for the purpose of realizing at least one predetermined optical function of the optical element. The predetermined alignment pattern may be a one-dimensional pattern (e.g., crystal molecules may be aligned in a same, single direction), a two-dimensional pattern (e.g., crystal molecules may be aligned in predetermined directions in a two-dimensional plane), or a three-dimensional pattern (e.g., crystal molecules may be aligned in predetermined directions in a three-dimensional space).

In some embodiments, the predetermined alignment pattern of the crystal molecules of the solid crystal may be at least partially configured, set, or defined by the alignment structure. In some embodiments, the alignment structure may include a photosensitive material (e.g., a photoalignment material), of which the molecules/functional groups may be configured to have an orientational order under polarized light irradiation. In some embodiments, the alignment structure may include a polymer, of which the polymer chain/functional group may be configured to have an orientational order under a mechanical rubbing. In some embodiments, the alignment structure may include an amorphous polymer configured to induce an orientation order of crystal molecules via a surface interaction between the solid crystal and the amorphous polymer. In some embodiments, the alignment structure may include liquid crystalline, crystalline polymers, or a combination thereof. In some embodiments, the alignment structure may include an amorphous inorganic material, a crystalline inorganic material, or a combination thereof. In some embodiments, the alignment structure may include a mixture of the above-mentioned materials.

In some embodiments, the alignment structure may refer to a structure (such as a layer, a film, or physical features) configured to define or set the orientations of the axes of the crystal molecules (e.g., a direction of growth of a solid crystal material that is grown on the alignment structure). In some embodiments, the alignment structure may be thin, such as a few molecules thick. The layer, film, or physical features of the alignment structure may interact with molecules of the solid crystal material (e.g., solid crystal molecules) to be grown via mechanical, dipole-dipole, magnetic mechanisms, or any other suitable mechanisms. For example, the alignment structure may be similar to those that have been used in LC devices (e.g., LC displays, LC lenses, LC gratings, or LC waveplates, etc.) for aligning orientations of the nematic LC molecules. In some embodiments, the crystal molecules may be aligned substantially uniformly over the alignment structure. That is, orientations of the axes of the crystal molecules may be substantially uniformly aligned, resulting in a spatially non-varying (e.g., constant) orientation of the axis of the solid crystal.

In some embodiments, the alignment structure may be in a form of an alignment film or layer, such as a photoalignment layer ("PAL") or a photoalignment material ("PAM") layer, a mechanically rubbed polymeric layer, or a polymer layer with anisotropic nanoimprint. In some embodiments, the alignment structure may be in a form of an alignment film or layer including an anisotropic relief, a ferroelectric or ferromagnetic material, or a crystalline film. In some embodiments, the alignment structure may be integrally formed etched, disposed, or otherwise provided at a surface of the first film. For example, the first film may function as the alignment film or layer.

In some embodiments, the first film may not include an alignment structure. For example, in some embodiments, the alignment structure may be directly formed within the solid crystal (e.g., the solid crystal layer) through a special mechanism. The alignment structure may be a structural property inside the solid crystal. For example, the alignment pattern may be formed during a crystallization process of the solid crystal occurring in a presence of a magnetic field or an electric field that may be configured to affect the alignment of the growing solid crystal. In some embodiments, the alignment pattern may be formed during a crystallization process of the solid crystal occurring in a presence of a uniaxial/biaxial stretching force applied to the first film. For example, the first film may include a stretchable (crystalline/amorphous) polymer, through stretching the first film while configuring the second film at a temperature that is higher than a melting temperature of the solid crystal, a uniaxial/biaxial shearing may be applied to the second film along with the first film. The uniaxial/biaxial shearing may align the crystal molecules in the second film in one or more predetermined directions. In some embodiments, a cooling process may be applied to the second film to crystalize. In some embodiments, the alignment structure may be integrally formed at a surface of the solid crystal during the crystallization process.

In some embodiments, the film stack may also include a plurality of third films. The first films, the second films, and the third films may be alternately arranged. For example, the second film (e.g., solid crystal) may be disposed between the first film (e.g., alignment layer) and the third film. In some embodiments, the third film may include an anisotropic organic solid crystalline material, an anisotropic crystalline polymer, an anisotropic inorganic crystalline material, an isotropic material (e.g., an isotropic polymer or an isotropic inorganic crystal), or a combination thereof.

The solid crystal may be in a form of a layer, a film, or a plate. The solid crystal may be configured to have a high refractive index. As a result, the solid crystal may be made thin and light weight. For example, the solid crystal may have a thickness of about 500 nanometer ("nm") to about 5 micrometer ("μm"). Accordingly, the optical device including the solid crystal may be made thin, light weight, and compact. Solid crystal materials have been used to fabricate semiconductor elements or devices with limited small sizes. For example, conventional semiconductor elements or devices fabricated using solid original crystal materials may have a size of about 10 millimeter ("mm") by 10 mm or less. The technical solution disclosed in the present disclosure enables fabrication of solid crystals having a large size. For example, by forming (e.g., growing) a solid crystal using an alignment structure, the solid crystal may be fabricated to have one or more lateral dimensions of about 30-100 mm or greater. Solid crystals having such large sizes may widen the applications of optical devices in a wide variety of technical fields.

FIG. 1A illustrates a schematic x-z sectional view of a film stack 100 (e.g., a thin-film stack 100) according to an embodiment of the present disclosure. The film stack 100 may be optically anisotropic, and may form, or be incorporated into, an optical element such as a reflective polarizer. As shown in FIG. 1A, the film stack 100 may include a plurality of thin films stacked in a thickness direction (e.g., a z-axis direction) of the film stack 100. The plurality of thin films may include alternating first films and the second films. For example, as shown in FIG. 1A, a plurality of first films 102 and a plurality of second films 103 may be alternately arranged in the thickness direction of the film stack 100. A first film 102 and a second film 103 in contact with the first film 102 and disposed on the first film 102 may form a film set (e.g., 120a, 120b, 120c). For discussion purposes, FIG. 1A shows that the film stack 100 includes four first films 102 and four second films 103 alternately arranged. That is, the film stack 100 includes four film sets. The film stack 100 may include any suitable number of the first films and any suitable number of the second films, forming any suitable number of film sets. Although the bodies of the first films 102 and the second films 103 are shown as flat for illustrative purposes, the bodies of the first films 102 and/or the second films 103 may have a curved shape. In some embodiments, the first films 102 may be configured to have a substantially same thickness. In some embodiments, at least two of the first films 102 may be configured to have different thicknesses. In some embodiments, the second films 103 may be configured to have a substantially same thickness. In some embodiments, at least two of the second films 103 may be configured to have different thicknesses. In some embodiments, the first films 102 may have slightly different optical properties, materials, etc. In some embodiments, the second films 103 may have slightly different optical properties, materials, etc. In some embodiments, all of the first films 102 may have the same material and optical properties. In some embodiments, all of the second films 103 may have the same material and optical properties. In other figures or embodiments, when a same reference numeral is used to label a plurality of first films (or second films), the first films (or second films) may be the same, or may be different.

At least one (e.g., each) of the plurality of second films 103 may include a solid crystal (or a solid crystal material) in a form of a solid crystal film or layer. The solid crystal may include crystal molecules aligned in a predetermined alignment pattern. In some embodiments, the solid crystal may include crystal molecules aligned in a spatially uniform alignment pattern. That is, the crystal molecules in the solid crystal layer may be substantially uniformly aligned, e.g., in a predetermined direction. The solid crystal may be a continuous solid crystal film, where neighboring crystal lattices may be contiguously connected to each other across the entire film stack 100. In some embodiments, the solid crystal may be structurally configured or fabricated to have a substantially spatially non-varying (e.g., constant) orientation of the axis of the solid crystal. In some embodiments, configuring the spatially constant orientation of the axis of the solid crystal may be realized by aligning the crystal molecules in the solid crystal in the predetermined alignment pattern, e.g., a spatially uniform alignment pattern.

In some embodiments, a first film 102 may include an anisotropic organic solid crystalline material (e.g., an anisotropic organic solid crystal), an anisotropic polymer (e.g., an anisotropic crystalline polymer), an anisotropic inorganic crystalline material (e.g., an anisotropic inorganic crystal), an isotropic material (e.g., an isotropic polymer or an isotropic inorganic crystal), or a combination thereof. In some embodiments, at least one (e.g., each) of the plurality of first films 102 may include an alignment structure configured to at least partially align the crystal molecules of the solid crystal of the at least one (e.g., each) of the plurality of second films 103 in the predetermined alignment pattern, e.g., the spatially uniform alignment pattern. In some embodiments, the first film 102 may not include an alignment structure. For example, the predetermined alignment pattern may be introduced inside the solid crystal of the second film 103 through crystallization of a ferroelectric or ferromagnetic material in the presence of a ferroelectric or ferromagnetic field. In this embodiment, the first film 102 may be, e.g., an optically isotropic polymer that may not provide an alignment function to the crystal molecules in the solid crystal of the second film 103. The first film 102 may have an effective refractive index in at least one direction that is smaller than an effective refractive index of the second film 103 in the same direction.

Figure 1B:
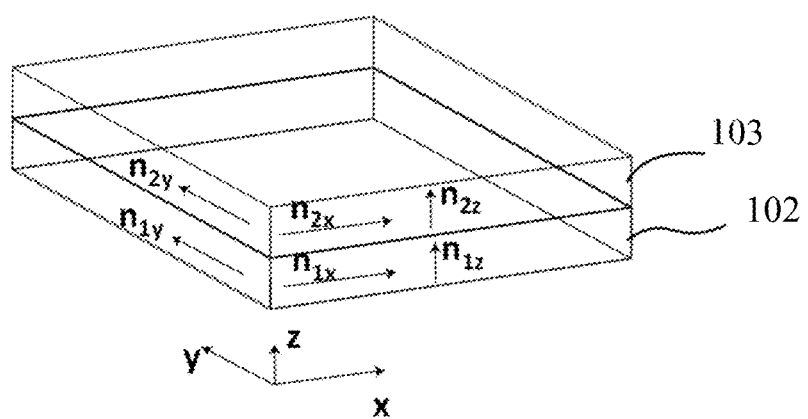
FIG. 1B illustrates refractive indices of a first film and a second film, according to an embodiment of the present disclosure.

FIG. 1B illustrates refractive indices of a first film 102 and a second film 103 included in the same film set, according to an embodiment of the present disclosure. In some embodiments, each film 102 or 103 may have a first principal refractive index in a first direction, a second principal refractive index in a second direction orthogonal to the first direction, and a third principal refractive index in a third direction orthogonal to both the first direction and the second direction. For discussion purpose, the second film 103 may also be referred to as a solid crystal 103. In some embodiments, the first direction may be parallel to the axis of the solid crystal 103 along which the solid crystal 103 may have the highest or largest refractive index. In some embodiments, the first principal refractive index of the solid crystal 103 may be at least about 1.5, at least about 1.6, at least about 1.7, at least about 1.8, at least about 1.9, at least about 2.0, at least about 2.1, or at least about 2.2. In some embodiments, the first principal refractive index of the solid crystal 103 may be in a range of about 1.6 to about 2.6. In some embodiments, an optical anisotropy of the solid crystal 103 may be at least about 0.1, at least about 0.2, at least about 0.3, at least about 0.35, at least about 0.4, at least about 0.45, or at least about 0.5.

As shown in FIG. 1B, each film 102 or 103 may have a first effective refractive index of $n_{1x}$ or $n_{2x}$ in a first in-plane direction (e.g., x-axis direction) of the film, and a second effective refractive index of $n_{1y}$ or $n_{2y}$ in a second in-plane direction orthogonal to the first in-plane direction (e.g., y-axis direction) of the film. The first effective refractive index and the second effective refractive index may also be referred to as a first in-plane refractive index and a second in-plane refractive index, respectively. A refractive index difference between the first in-plane refractive index and the second in-plane refractive index may be referred to as an in-plane optical anisotropy. Each film 102 or 103 may also have a third effective refractive index of $n_{1z}$ or $n_{2z}$ in an out-of-plane vertical direction (e.g., z-axis direction) orthogonal to both the first in-plane direction and the second in-plane direction. The third effective refractive index may also be also referred to as a third out-of-plane refractive index of the film 102 or 103 or an effective refractive index in the film thickness direction.

In each film 102 or 103, the first in-plane refractive index may be equal to the first principal refractive index or equal to a component of the first principal refractive index in the first in-plane direction (e.g., an x-axis direction). For example, when the first direction is parallel to the first in-plane direction, the first in-plane refractive index may be equal to the first principal refractive index. When the first direction is not parallel to the first in-plane direction, the first in-plane refractive index may be equal to a component of the first principal refractive index in the first in-plane direction (e.g., a y-axis direction). The second in-plane refractive index may be equal to the second principal refractive index or equal to a component of the second principal refractive index in the second in-plane direction (e.g., the y-axis direction). For example, when the second direction is parallel to the second in-plane direction, the second in-plane refractive index may be equal to the second principal refractive index. When the second direction is not parallel to the second in-plane direction, the second in-plane refractive index may be equal to a component of the second principal refractive index in the second in-plane direction (e.g., the x-axis direction). The third out-of-plane refractive index may be equal to the third principal refractive index or equal to a component of the third principal refractive index in the film thickness direction (e.g., a z-axis direction). For example, when the third direction is parallel to the film thickness direction, the third out-of-plane refractive index may be equal to the third principal refractive index. When the third direction is not parallel to the film thickness direction, the third out-of-plane refractive index may be equal to a component of the third principal refractive index in the film thickness direction (e.g., the z-axis direction).

The second film 103 may be configured to have a higher in-plane optical anisotropy than the first film 102. In some embodiments, a refractive index difference between the first in-plane refractive index $n_{2x}$ and the second in-plane refractive index $n_{2y}$ of the second film (solid crystal) 103 (also referred to as an in-plane optical anisotropy) may be configured to be at least about 0.2, at least about 0.25, at least about 0.3, at least about 0.35, at least about 0.4, at least about 0.45, or at least about 0.5. The second film (solid crystal) 103 may be a uniaxially or biaxially birefringent film, in which the first in-plane refractive index $n_{2x}$ is configured to be different from the second in-plane refractive index $n_{2y}$. In some embodiments, the first in-plane refractive index $n_{2x}$ may be configured to be larger than the second in-plane refractive index $n_{2y}$.

In some embodiments, a refractive index difference between the first in-plane refractive index $n_{1x}$ and the second in-plane refractive index $n_{1y}$ (also referred to as an in-plane optical anisotropy) of the first film 102 may be configured to be smaller than about 0.1, smaller than about 0.08, smaller than about 0.05, or smaller than about 0.03. In some embodiments, the first film 102 may be a uniaxially or biaxially birefringent film, in which the first in-plane refractive index $n_{1x}$ is configured to be different from or substantially equal to the second in-plane refractive index $n_{1y}$. In some embodiments, the first in-plane refractive index $n_{1x}$ may be configured to be larger than the second in-plane refractive index $n_{1y}$. In some embodiments, the first film 102 may be an optically isotropic film, in which the in first in-plane refractive index $n_{1x}$ is configured to be substantially equal to the second in-plane refractive index $n_{1y}$, i.e., the in-plane optical anisotropy may be substantially zero. In addition, a third out-of-plane refractive index $n_{1z}$ may be substantially equal to the first in-plane refractive index $n_{1x}$ and the second in-plane refractive index $n_{1y}$.

In some embodiments, the first in-plane refractive index $n_{2x}$ of the second film (solid crystal) 103 may be configured to be larger than the first in-plane refractive index $n_{1x}$ of the first film 102. For example, a refractive index difference between the first in-plane refractive index $n_{2x}$ of the second film (solid crystal) 103 and the first in-plane refractive index $n_{1x}$ of the first film 102 may be configured to be at least about 0.2, at least about 0.25, at least about 0.3, at least about 0.35, at least about 0.4, at least about 0.45, or at least about 0.5. In some embodiments, a refractive index difference between the second in-plane refractive index $n_{1y}$ of the second film (solid crystal) 103 and the second in-plane refractive index my of the first film 102 may be configured to be smaller than about 0.1, smaller than about 0.08, smaller than about 0.05, or smaller than about 0.03. In some embodiments, the second in-plane refractive index $n_{1y}$ of the second film (solid crystal) 103 may be configured to be substantially equal to the second in-plane refractive index $n_{1y}$ of the first film 102. In some embodiments, the second in-plane refractive index $n_{1y}$ of the second film (solid crystal) 103 may be configured to be larger than the second in-plane refractive index my of the first film 102. In some embodiments, the second in-plane refractive index $n_{1y}$ of the second film (solid crystal) 103 may be configured to be smaller than the second in-plane refractive index $n_{1y}$ of the first film 102.

In some embodiments, the third out-of-plane refractive index $n_{2z}$ of the second film 103 may be configured to be substantially equal to the third out-of-plane refractive index $n_{1z}$ of the first film 102. In some embodiments, the third out-of-plane refractive index $n_{2z}$ of the second film 103 may be configured to be larger than the third out-of-plane refractive index $n_{1z}$ of the first film 102. In some embodiments, the third out-of-plane refractive index $n_{2z}$ of the second film 103 may be configured to be smaller than the third out-of-plane refractive index $n_{1z}$ of the first film 102.

Referring to FIGS. 1A and 1B, at least one (e.g., each) of the second films 103 may include a solid crystal (or a solid crystal material) in a form of a solid crystal film or layer, and at least one (e.g., each) of the first films 102 may include an alignment structure. A first film 102 and a neighboring second film 103 in direct contact with the first film 102 (e.g., disposed on the first film 102) may be referred to as a film set. The film stack 100 may include a plurality of film sets, e.g., film sets 120a, 120b, and 120c. In some embodiments, each of the film sets 120a, 120b, and 120c may be configured to have an optical thickness of about half (0.5) wavelength for a same predetermined wavelength of interest. In some embodiments, each of the film sets 120a, 120b, and 120c may be configured to reflect a substantially same predetermined wavelength range. In some embodiments, each film in the film set 120a, 120b, or 120c may be configured to have a quarter (0.25) wavelength thickness for the predetermined wavelength of interest. In some embodiments, the first film 102 and the second film 103 in the same film set (e.g., 120a, 120b, or 120c) may be configured to have different wavelength thicknesses for the predetermined wavelength of interest. That is, the first film 102 and the second film 103 in the same film set (e.g., 120a, 120b, or 120c) may be configured to have different thicknesses. In some embodiments, the film sets 120a, 120b, and 120c may be configured to have an optical thickness of about half (0.5) wavelength for different predetermined wavelengths of interest. The film sets 120a, 120b, and 120c may be configured to substantially reflect lights of different predetermined wavelength ranges of interest. In some embodiments, each film in respective film sets may be configured to have a quarter (0.25) wavelength thickness for respective predetermined wavelengths of interest. For example, each film in a first film set 120a may be configured to have a quarter (0.25) wavelength thickness for a first predetermined wavelength of interest, and each film in a second film set 120b may be configured to have a quarter (0.25) wavelength thickness for a second predetermined wavelength of interest that is substantially different from the first predetermined wavelength of interest. In some embodiments, the first film 102 and the second film 103 in the same film set (e.g., 120a, 120b, or 120c) may be configured to have different wavelength thicknesses for the same predetermined wavelength of interest. That is, the first film 102 and the second film 103 in the same film set (e.g., 120a, 120b, or 120c) may be configured to have different thicknesses. The periodic arrangements of the refractive indices and thicknesses of films in the film stack 100 may generate photonic bands for lights, such that lights within predetermined wavelength ranges and having a predetermined polarizations state may be substantially reflected by the film stack 100.

The first film 102 may be referred to as an alignment structure 102, and the second film 103 may be referred to as a solid crystal 103. The solid crystal 103 may be disposed at (e.g., on) the respective alignment structure 102. In some embodiments, the solid crystal 103 may be grown on the respective alignment structure 102. In some embodiments, the alignment structure 102 may be configured to at least partially define or set an orientation of an axis of the solid crystal 103 or a predetermined alignment pattern for aligning the crystal molecules of the solid crystal 103. For discussion purposes, the axis of the solid crystal 103 may refer to an axis along which the solid crystal 103 may have a highest or largest refractive index. An axis of a crystal molecule in the solid crystal 103 may refer to as an axis along which the crystal molecule may have a highest or largest refractive index. The orientation of the axis of the solid crystal 103 may be an aggregated effect of the orientations of the axes of the crystal molecules included in the solid crystal 103.

In some embodiments, the alignment structure 102 may be configured to at least partially align the crystal molecules in the predetermined alignment pattern. In some embodiments, the orientations of the axes of the crystal molecules that are in contact with the alignment structure 102 may be aligned by (or with) the alignment structure 102, and the orientations of the axes of remaining crystal molecules may be aligned according to the neighboring crystal molecules that have been aligned and/or configured by the alignment structure 102. In some embodiments, the predetermined alignment pattern of the crystal molecules may result in the spatially uniform (or constant) orientations of the axes of the crystal molecules within the solid crystal 103. Accordingly, the axis of the solid crystal 103 may be configured to have a constant orientation within the solid crystal 103.

In some embodiments, the alignment structure 102 may include an alignment layer, which may be separate film formed on or bonded to a substrate (not shown in FIG. 1A or FIG. 1B). The alignment layer 102 may be disposed between the substrate and the solid crystal 103, and may be in contact with the solid crystal 103. In some embodiments, the alignment layer 102 may be a photo-alignment material ("PAM") layer, which may include one or more photo-alignment materials. In some embodiments, the photo-alignment materials may include photosensitive molecules that may undergo orientational ordering when subject to a polarized light irradiation. In some embodiments, the photosensitive molecules may include elongated anisotropic photosensitive units (e.g., small molecules or fragments of polymeric molecules), which may be aligned in an alignment structure pattern when subject to the polarized light irradiation.

In some embodiments, the photosensitive units may be polarization sensitive. For example, the photosensitive units may be aligned by a light with a predetermined polarization. For example, the photosensitive units may be aligned in a direction perpendicular to the polarization direction of a linearly polarized light or parallel to a polarization direction of a linearly polarized light. In some embodiments, the alignment layer 102 may be a mechanically rubbed layer (e.g., a mechanically rubbed polymer layer). In some embodiments, the alignment layer 102 may be a polymer layer with anisotropic nanoimprint, e.g., a polymer layer including a pattern of anisotropic nanostructures fabricated using e.g., a lithographic or a nanoimprinting technique. In some embodiments, the alignment layer 102 may include a ferroelectric or ferromagnetic material configured to at least partially align the crystal molecules in the solid crystal 103 in a presence of a magnetic field or an electric field. In some embodiments, the alignment layer 102 may be a substantially thin crystalline film (or layer) or a crystalline substrate configured to at least partially align the crystal molecules in the solid crystal 103. The crystalline film or the crystalline substrate may include solid crystal molecules that have already been aligned in an alignment structure pattern. When crystal molecules that form the solid crystal 103 are grown on the crystalline film or crystalline substrate, through lattice constant matching, the growth of the crystal molecules that form the solid crystal 103 may be configured, affected, or determined by the alignment structure pattern defined by the molecules of the crystalline film or crystalline substrate. The alignment structure pattern of the thin crystalline film or crystalline substrate may be formed using any suitable methods disclosed herein. In a process of fabricating the solid crystal 103, crystal molecules of the solid crystal 103 may be deposited on (e.g., grown on) the thin crystalline film or substrate. The crystal molecules of the solid crystal 103 in contact with the thin crystalline film or substrate may be aligned with the crystal molecules included in the thin crystalline film or substrate. Multiple thin crystalline films or substrates may be used to form a stack of layers of crystal molecules in the solid crystal 103 having different alignment patterns. In some embodiments, the alignment layer 102 may be configured to at least partially align the crystal molecules in the solid crystal 103 based on a crystallization occurring in a presence of a magnetic field or an electric field. In some embodiments, the alignment layer 102 may include an hexagonal boron nitride (h-BN) layer or a graphene layer.

In some embodiments, the film stack 100 may also include a substrate on which the stack of films is disposed. For example, an alignment structure 102 (e.g., the lowest alignment structure) may be in contact with the substrate or at least partially in the substrate. The alignment structure (e.g., the lowest alignment structure) may include features directly formed on or at least partially in the substrate, or formed on or at least partially in the solid crystal 103 disposed above the alignment structure 102 (e.g., the lowest alignment structure). In some embodiments, the alignment structure 102 may be generated in the solid crystal 103 based on a crystallization occurring in a presence of a magnetic field or an electric field. In some embodiments, the alignment structure 102 may be generated in the solid crystal 103 based on an external light field, which may at least partially align the crystal molecules in the solid crystal 103 in the predetermined alignment structure. In some embodiments, the crystal molecules included in the solid crystal 103 may be aligned according to an interference pattern. In some embodiments, the interference pattern may be an intensity interference pattern that creates regions of constructive or destructive interference, where the crystal molecules may be selectively aligned. For example, the crystal molecules may be aligned differently in the regions of constructive or destructive interference. In some embodiments, the interference pattern may be a polarization interference pattern, e.g., formed by two optical beams with different states of polarization, or the same state of polarization. The crystal molecules included in the solid crystal 103 may be aligned according to a polarization interference pattern (e.g., formed by two optical beams with different states of polarization).

In some embodiments, the substrate may be nanofabricated to have the alignment structure 102 for at least partially aligning the crystal molecules in the solid crystal 103. For example, the substrate may be fabricated from an organic material, such as amorphous or liquid crystalline polymers, cross-linkable monomers including those having liquid crystal properties. In some embodiments, the substrate may be fabricated from an inorganic material, such as metals or oxides used for manufacturing of metasurfaces. The material(s) of the substrate may be isotropic or anisotropic. In some embodiments, the substrate may be nanofabricated from a resist material that is transparent or nearly transparent to a range of electromagnetic frequencies, such as the visible wavelength spectrum. The resist material may be in a form of thermoplastic, polymer, optically transparent photoresist, etc. After being set or cured, the resist material may provide an alignment to the crystal molecules included in the solid crystal 103. That is, in some embodiments, the substrate may also function as an alignment layer for at least partially aligning the crystal molecules included in the solid crystal 103. Various alignment patterns and features may be realized using the nanofabrication techniques of the substrate, which allow for the creation of an alignment structure 102 to at least partially align the crystal molecules included in the solid crystal 103 with high customizability. In some embodiments, the alignment structure 102 may include an anisotropic relief, which may be formed by wet or dry etching the anisotropic relief directly on a surface of the substrate or on a surface of the solid crystal 103. In some embodiments, the substrate may be a substantially thin crystalline substrate configured at least partially align the crystal molecules included in the solid crystal 103, and the substrate may function as the alignment structure.

In some embodiments, the solid crystal 103 may fabricated based on one or more solid crystal materials, such as anthracene, tetracene, pentacene or any other saturated or unsaturated polycyclic hydrocarbons and their derivatives; nitrogen, sulfur and oxygen heterocycles; quinolines, benzothiophenes, and benzopyrans; bent and asymmetric acenes such as phenanthrene, phenanthroline, pyrene, and fluoranthene and their derivatives; 2,6-naphthalene dicarboxylic acid, 2,6-dimethyl carboxylic ester molecules and their derivatives; biphenyl, terphenyl, quaterphenyl, or phenylacetylene, or their derivatives including substitutes with alkyl groups, cyano groups, isothiocyanate groups, fluorine, chlorine or fluorinated ether; polycyclic aromatic hydrocarbons, such as naphthalene, anthracene, tetracene, pentacene, pyrene, polycene, fluoranthene, benzophenone, benzochromene, benzil, benzimidazole, benzene, hexachlorobenzene, nitropyridine-N-oxide, benzene-1, 4-dicarboxylic acid, diphenylacetylene, N-(4-nitrophenyl)-(s)-prolinal, 4,5-dicyanoimidazole, benzodithiophene, cyanopyridine, thienothiophene, stilbene, azobenzene, or their derivatives. In some embodiments, the solid crystal 103 may include chiral crystal molecules or crystal molecules doped with chiral dopants, and the solid crystal 103 may exhibit chirality, i.e., handedness.

In some embodiments, the solid crystal material may include at least one of the following molecules, each of which may include a ring structure (or a ring structure system) and two terminal groups (or terminal group systems). In some embodiments, the ring structure may include one or more saturated cyclic groups, such as cyclohexane, cyclopentane, tetrahydropyran, piperidine, tetrahydrofuran, pyrrolidine, tetrahydrothiophene, or their derivatives. In some embodiments, the ring structure may include one or more unsaturated aromatic groups, such as benzene, naphthalene, anthracene, thiophene, bi-phenyl, tolane, benzimidazole, diphenylacetylene, cyanopyridine, thienothiophene, dibenzothiophene, carbazole, silafluorene, or their derivatives. The terminal group may include one or more $C_1$-$C_{10}$ alkyl, alkoxy, alkenyl groups, —CN, —NCS, —SCN, —$SF_5$, —Br, —Cl, —F, —$OCF_3$, —$CF_3$, mono- or polyfluorinated $C_1$-$C_{10}$ alkyl or alkoxy group.

In some embodiments, the solid crystal material may include crystalline polymers. Precursors of the crystalline polymers may include aromatic hydrocarbon or heteroarene groups, and their derivatives. Examples of the crystalline polymers may include polyethylene naphthalate, poly (vinyl phenyl sulfide), poly(a-methylstyrene, polythienothiophene, polythiophene, poly(n-vinylphtalimide), parylene, polysulfide, polysulfone, poly(bromophenyl), poly(vinlynaphthalene), or liquid crystal polymers with precursors with functional groups. In some embodiments, precursors of the liquid crystal polymers may include aliphatic, hetroaliphatic, aromatic hydrocarbon, or heteroarene groups.

In some embodiments, the solid crystal material may include amorphous polymers with aliphatic, hetroaliphatic, aromatic hydrocarbon or heteroarene groups (e.g., polystyrene) as binder. In some embodiments, the solid crystal material may also include additives, such as fatty acid, lipids, plasticizer, or surfactant (e.g., molecules with mono- or polyfluorinated alkyl or alkoxy group).

Figure 8A:
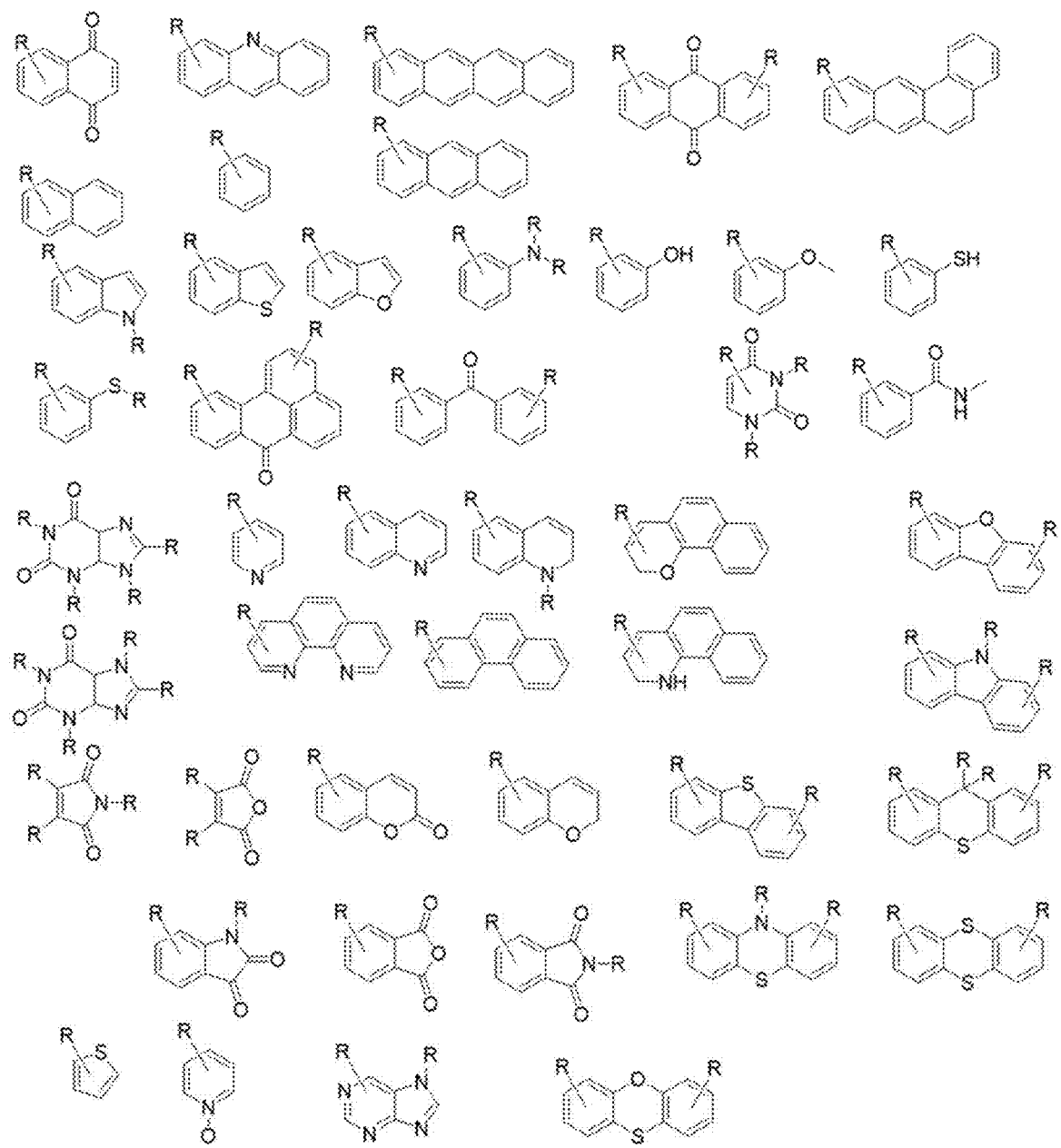
FIGS. 8A-8J illustrate example chemical structures of various molecules that may be included in a solid crystal material, according to various embodiments of the present disclosure.
Figure 8B:
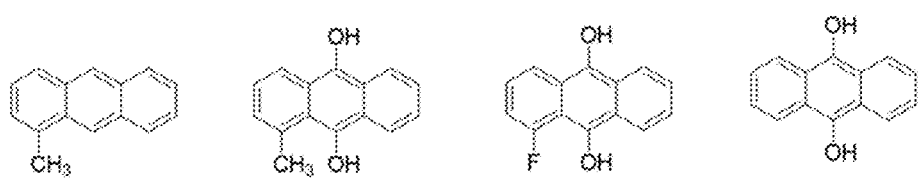

FIG. 8A illustrates example chemical structures of various molecules that may be included in the solid crystal material. In the chemical structures, R is a functional group, which may be any one or any combination of $CH_3$, H, OH, OMe, OEt, OiPr, F, Cl, Br, I, Ph, $NO_2$, $SO_3$, $SO_2Me$, iPr, Pr, t-Bu, sec-Bu, Et, acetyl, SH, SMe, carboxyl, aldehyde, amide, nitrile, ester, $SO_2NH_3$, $NH_2$, $NMe_2$, NMeH, or $C_2H_2$. For example, when a chemical formula includes two or more Rs, all of the Rs may be different, all of the Rs may be the same, at least two Rs may be different, or at least two Rs may be the same. FIG. 8B illustrates example chemical structures of molecules that include one or a combination of the functional groups R listed above and shown in FIG. 8A.

Figure 8C:
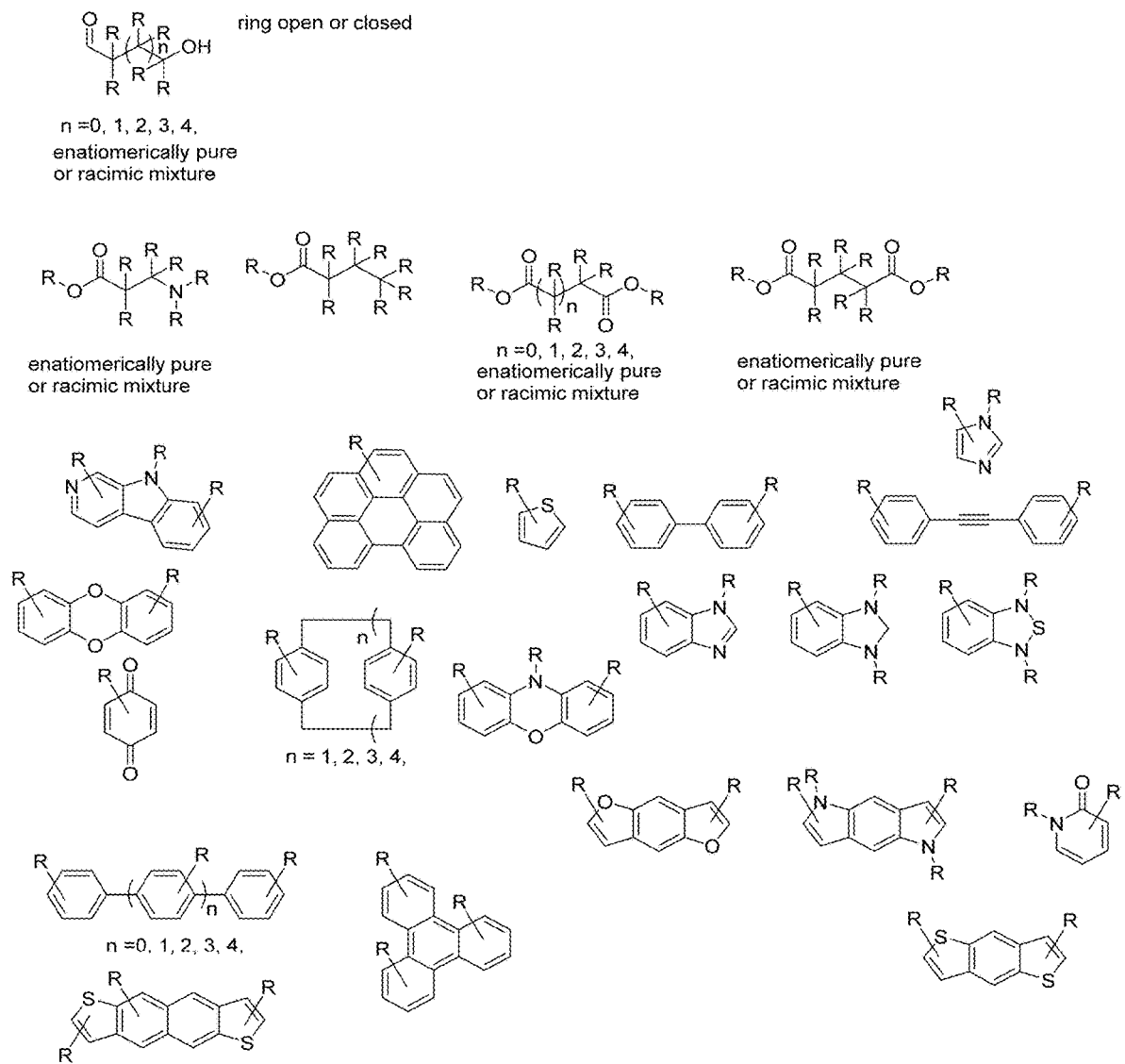

In some embodiments, the solid crystal material may include sugars or fatty acids. FIG. 8C illustrates chemical structures of various sugars and fatty acids that may be included in the solid crystal material. The functional group R may be any of $CH_3$, H, OH, OMe, OEt, OiPr, F, Cl, Br, I, Ph, $NO_2$, $SO_3$, $SO_2Me$, iPr, Pr, t-Bu, sec-Bu, Et, acetyl, SH, SMe, carboxyl, aldehyde, amide, nitrile, ester, $SO_2NH_3$, $NH_2$, $NMe_2$, NMeH, or $C_2H_2$. In addition, in some embodiments, the molecules shown in FIG. 8C may include any one or any combination of the listed functional groups R.

Figure 8D:
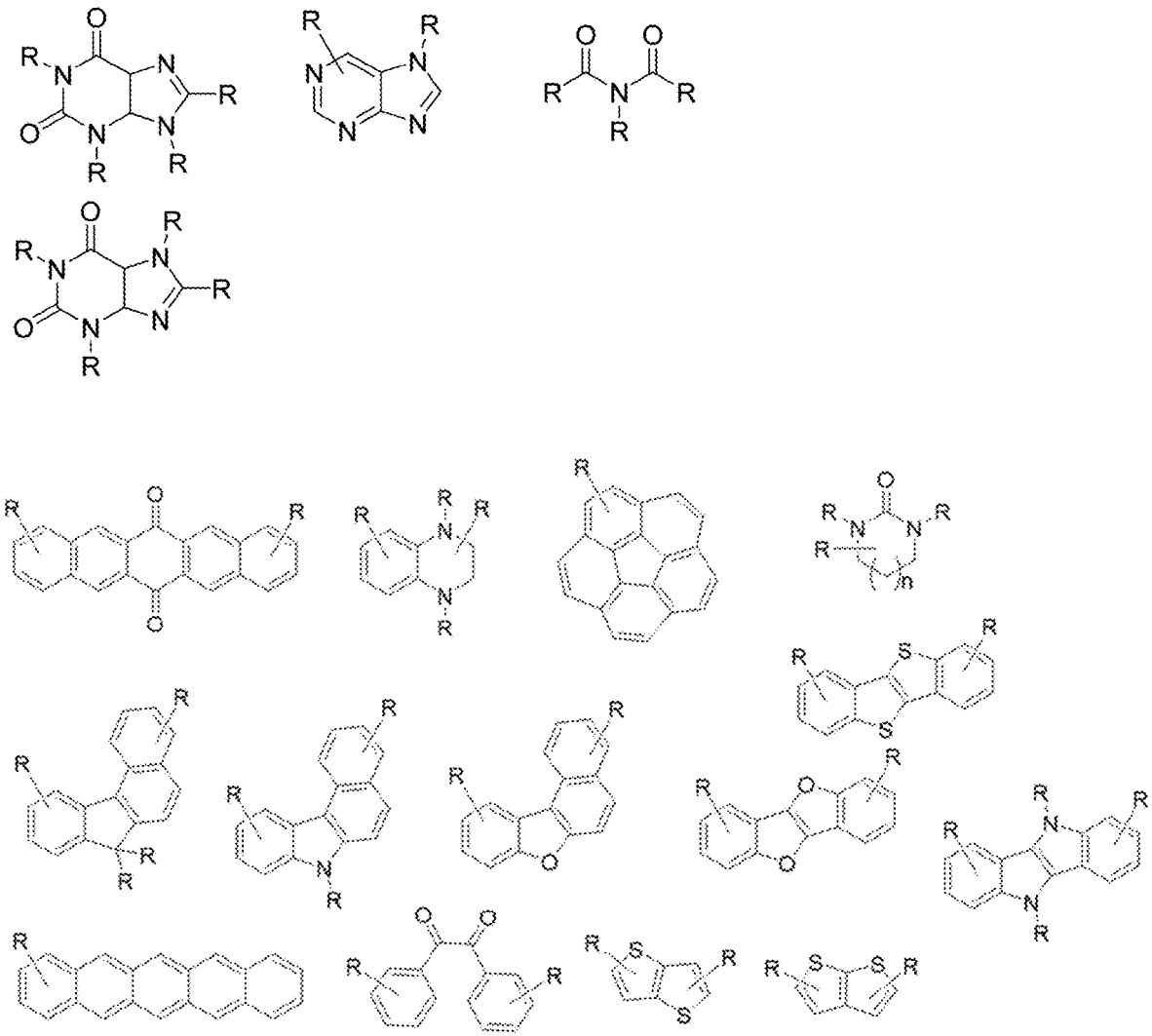

FIG. 8D illustrates example chemical structures of molecules that may be included in the solid crystal material. In some embodiments, a molecule may include one or a combination of the above functional groups R, i.e., any one or any combination of $CH_3$, H, OH, OMe, OEt, OiPr, F, Cl, Br, I, Ph, $NO_2$, $SO_3$, $SO_2Me$, iPr, Pr, t-Bu, sec-Bu, Et, acetyl, SH, SMe, carboxyl, aldehyde, amide, nitrile, ester, $SO_2NH_3$, $NH_2$, $NMe_2$, NMeH, or $C_2H_2$.

Figure 8E:
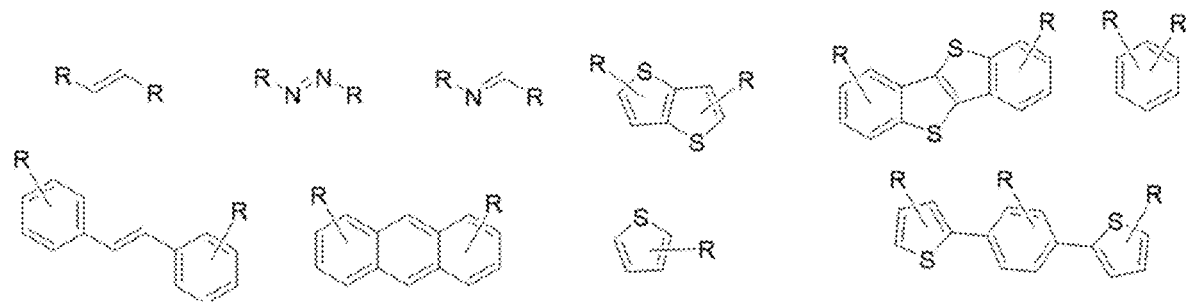
Figure 8F:
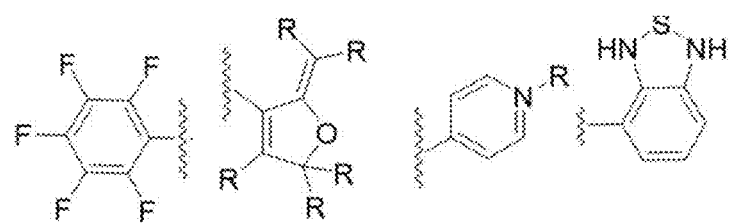
Figure 8G:
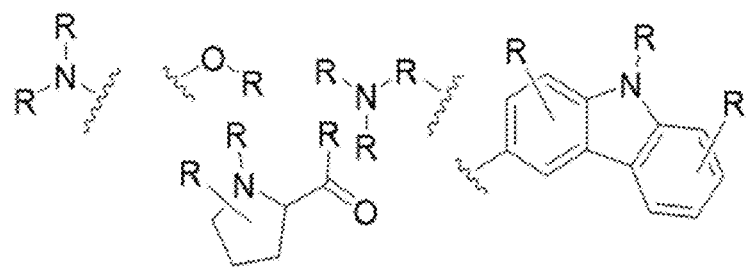

In some embodiments, the molecules that may be included in the solid crystal material may have a donor-bridge-acceptor molecular motif, a donor-bridge-donor molecular motif, or an acceptor-bridge-acceptor molecular motif. FIG. 8E illustrates example bridge functional groups that may be included in the molecules. FIG. 8F illustrates example electron withdrawing groups (acceptor groups) that may be included in the molecules. FIG. 8G illustrates example electron donating groups (donor groups) that may be included in the molecules. In some embodiments, a molecule may include one or a combination of the above functional groups R, i.e., any one or any combination of $CH_3$, H, OH, OMe, OEt, OiPr, F, Cl, Br, I, Ph, $NO_2$, $SO_3$, $SO_2Me$, iPr, Pr, t-Bu, sec-Bu, Et, acetyl, SH, SMe, carboxyl, aldehyde, amide, nitrile, ester, $SO_2NH_3$, $NH_2$, $NMe_2$, NMeH, or $C_2H_2$.

Figure 8H:
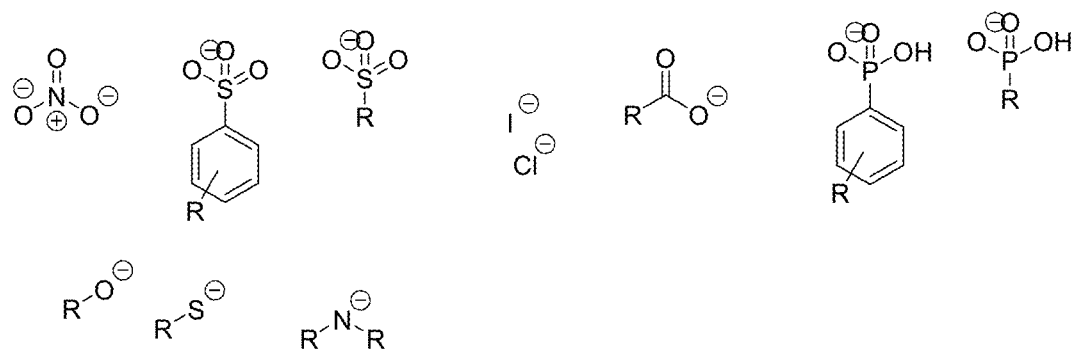
Figure 8I:
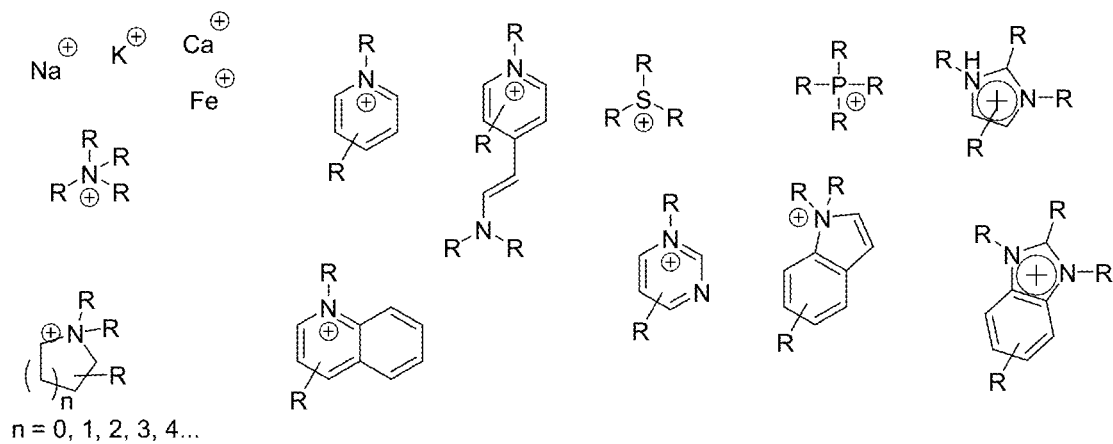
Figure 8J:
Figure 8J:

In some embodiments, the solid crystal material may include organo-salts, a mix of anionic and cationic molecules with at least one organic based component. FIG. 8H illustrates example chemical structures of Anionic molecules that may be included in the solid crystal material. FIG. 8I illustrates example chemical structures of cationic molecules. The functional group R may be any one or any combination of $CH_3$, H, OH, OMe, OEt, OiPr, F, Cl, Br, I, Ph, $NO_2$, $SO_3$, $SO_2Me$, iPr, Pr, t-Bu, sec-Bu, Et, acetyl, SH, SMe, carboxyl, aldehyde, amide, nitrile, ester, $SO_2NH_3$, $NH_2$, $NMe_2$, NMeH, or $C_2H_2$. In some embodiments, the functional group R may also include a mix of electron donating and electron withdrawing functions shown in FIG. 8F and FIG. 8G. FIG. 8J illustrates example chemical structures of molecules of materials with a solid crystal phase and/or a liquid crystal phase. The chemical structures of molecules of materials with a solid crystal phase and/or a liquid crystal phase may have a structural formula of A-B-C-D-E. Examples of the "A," "B," "C," "D," and "E" elements are shown in FIG. 8J.

FIGS. 2A-2E schematically illustrate x-z sectional views of film stacks (e.g., thin-film stacks), according to various embodiments of the present disclosure. The film stacks shown in FIGS. 2A-2E may include structures or elements that are the same as or similar to those included in the film stack 100 shown in FIGS. 1A and 1B. Descriptions of the same or similar structures or elements included in the embodiments shown in FIGS. 2A-2E can refer to the above descriptions, including those rendered in connection with the embodiments shown in FIG. 1A and FIG. 1B.

Figure 2A:
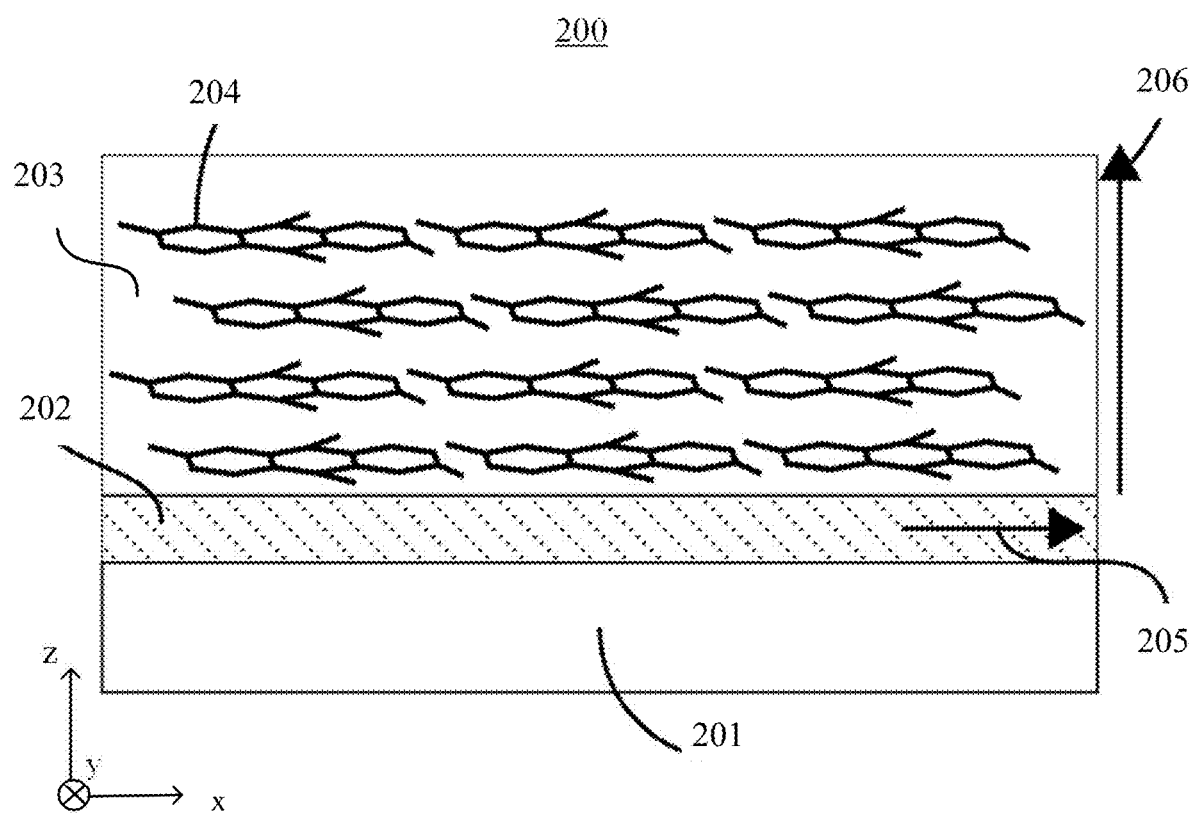
FIGS. 2A-2E illustrate schematic cross-sectional views of film stacks, according to various embodiments of the present disclosure.
Figure 2B:
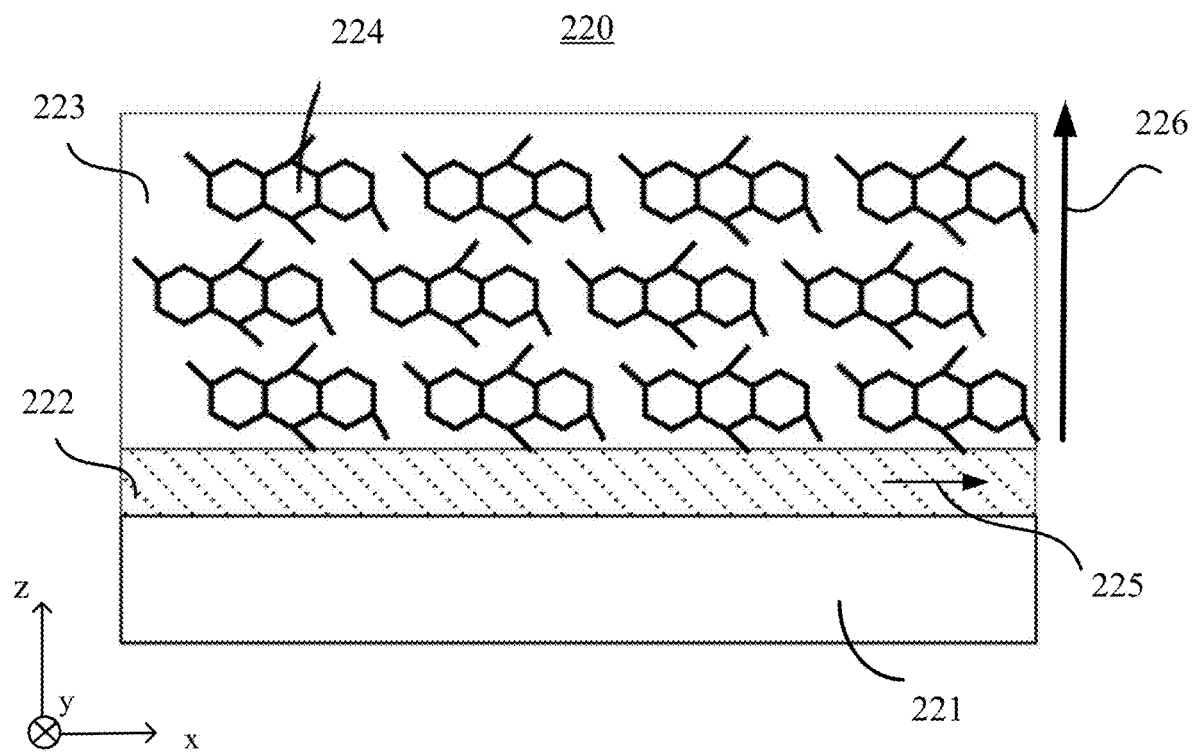
Figure 2C:
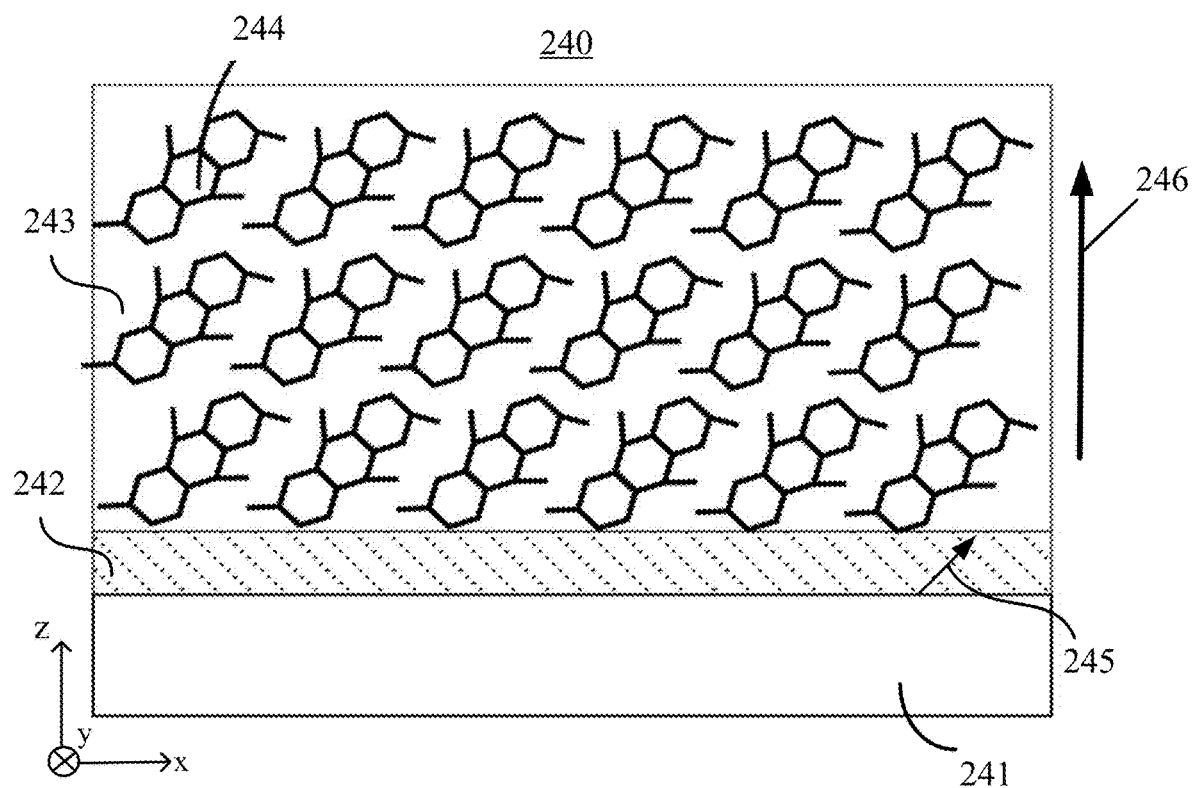
Figure 2D:
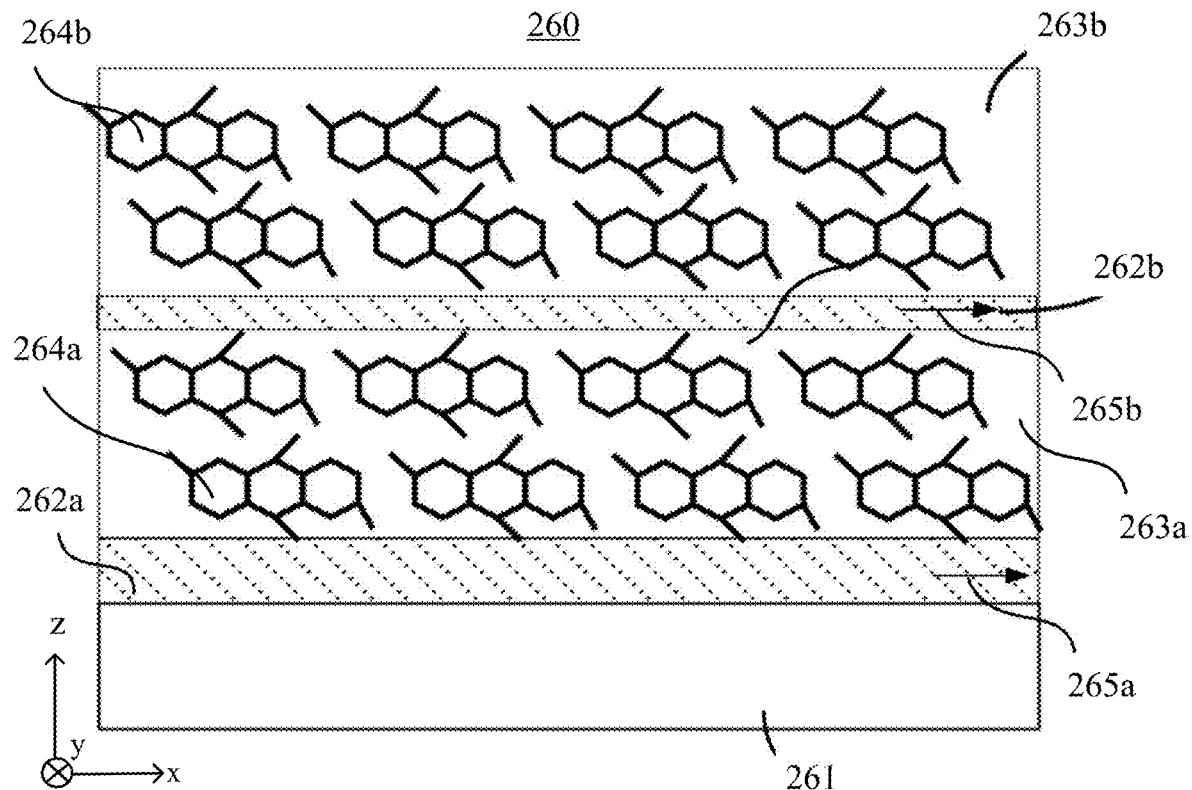
Figure 2E:
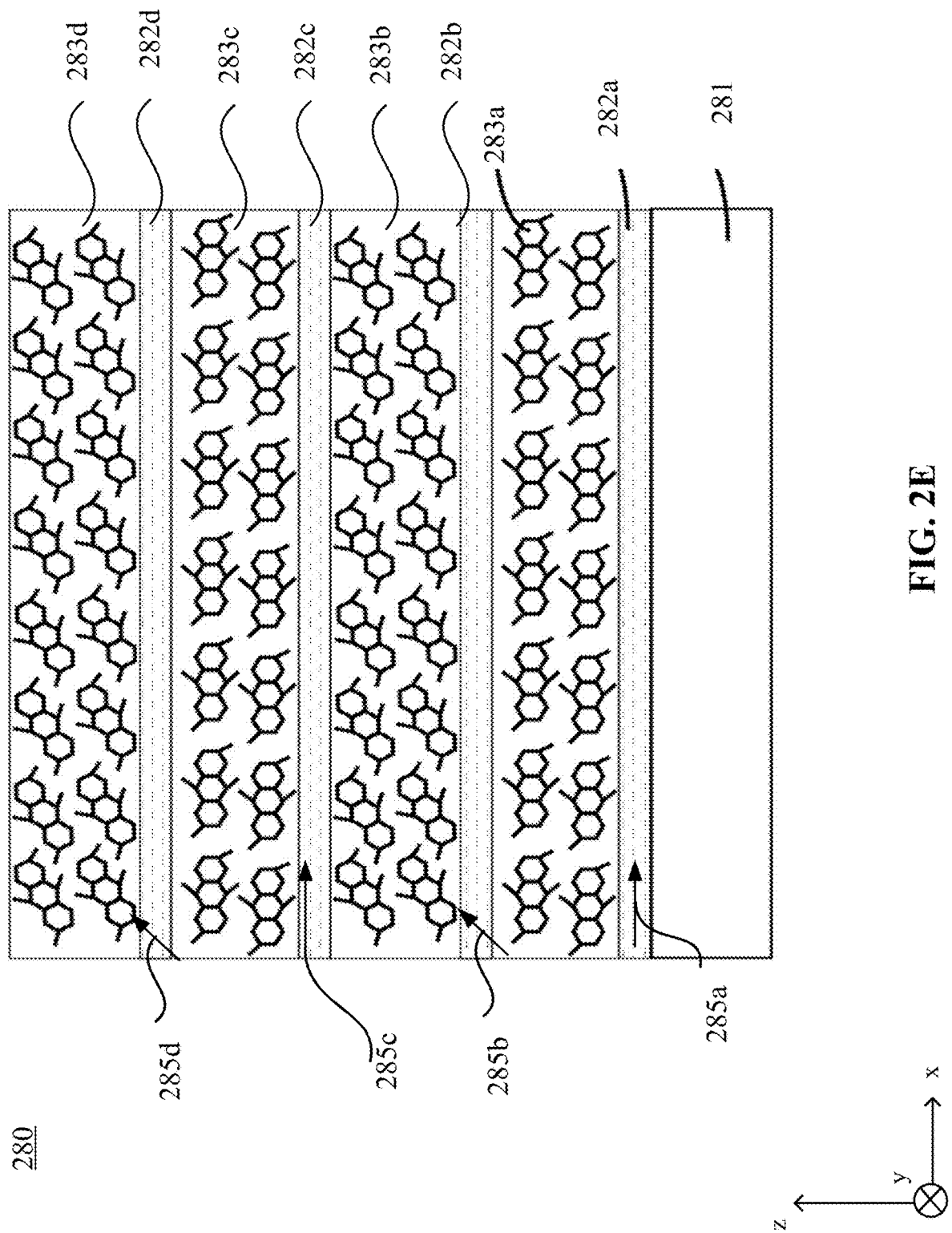

For example, in the embodiments shown in FIGS. 2A-2E, the film stack may include alternating first films and the second films, in which a first film and a neighboring second film may form a film set. The film stack may include a plurality of film sets. At least one (e.g., each) first film may include an alignment structure, and at least one (e.g., each) second film may include a solid crystal (or a solid crystal film). The crystal molecules in the solid crystal film may be substantially uniformly aligned in a predetermined alignment pattern (e.g., a predetermined direction). In some embodiments, e.g., as shown in FIG. 2A, FIG. 2B, FIG. 2C, FIG. 2D, or FIG. 2E, the film stack may be optically anisotropic, and may form, or be incorporated into, an optical element such as a reflective polarizer. For illustrative purposes, FIGS. 2A-2D merely illustrate one or two film sets in the film stacks, and FIG. 2E illustrates four film sets in the thin film stack. It is understood that the film stack may include any suitable number of film sets, for example, 5 sets, 10 sets, 15 sets, 20 sets, 25 sets, or 30 sets, and so on.

As shown in FIG. 2A, a film stack 200 (e.g., a thin-film stack 200) may include a substrate 201 and a plurality of film sets disposed on the substrate 201. The film stack 200 may include alternating first films 202 and the second films 203, in which a first film 202 and a neighboring second film 203 may form a film set. The film stack 200 may include a plurality of film sets. The first film 202 and the second film 203 may be embodiments of the first film 102 and the second film 103 shown in FIGS. 1A and 1B, respectively. In some embodiments, at least one (e.g., each) first film 202 may include an alignment structure, and at least one (e.g., each) second film 203 may include a solid crystal (or a solid crystal film). The first film 202 may also be referred to as an alignment structure 202, and the second film 203 may also be referred to as a solid crystal 203. For illustrative purposes, FIG. 2A merely illustrates one film set include in the film stack 200. It is understood that the film stack 200 may include any suitable number of film sets, for example, 5 sets, 10 sets, 15 sets, 20 sets, 25 sets, or 30 sets, and so on.

The substrate 201 may be configured to provide support and/or protection to various layers, films, and/or structures disposed at the substrate 201 (e.g., on the substrate 201). The alignment structure 210 may be disposed at the substrate 201. In some embodiments, the alignment structure 202 may be an integral part of the substrate 201. For example, the alignment structure 202 may be etched on or at least partially in a surface of the substrate 201. In some embodiments, the alignment structure 210 may be integrally formed inside the substrate 201. In some embodiments, the alignment structure 202 may be separately formed (e.g., deposited) onto the surface of the substrate 201. In some embodiments, the substrate 201 may be compatible with (e.g., lattice constant-matched) the crystal molecules included in the solid crystal 203.

In some embodiments, the substrate 201 may be optically transparent (e.g., having a light transmittance of at least about 60%) at least in a visible spectrum (e.g., wavelength ranging from about 380 nm to about 700 nm). In some embodiments, the substrate 201 may also be transparent in at least a portion of the infrared ("IR") spectrum (e.g., wavelength ranging from about 700 nm to about 2 mm). The substrate 201 may include a suitable material that is substantially transparent to lights of the above-listed wavelength ranges, such as, a glass, a plastic, a sapphire, a polymer, a semiconductor, or a combination thereof, etc. The substrate 201 may be rigid, semi-rigid, flexible, or semi-flexible. In some embodiments, the substrate 201 may have one or more surfaces in a flat, a convex, a concave, an asphere, or a freeform shape. In some embodiments, the substrate 201 may be a part of another optical element or device, or a part of another opto-electrical element or device. For example, the substrate 201 may be a solid optical lens or a part of a solid optical lens. In some embodiments, the substrate 201 may be a part of a functional device, such as a display screen.

In some embodiments, the substrate 201 may be used to fabricate, store, or transport the film stack 200. In some embodiments, the substrate 201 may be detachable or removable from the rest of the film stack 200 after the rest of the film stack 200 is fabricated or transported to another place or device. That is, the substrate 201 may be used in fabrication, transportation, and/or storage to support the solid crystal 203 provided on the substrate 201, and may be separated or removed from the solid crystal 203 of the film stack 200 when the fabrication of the film stack 200 is completed, or when the film stack 200 is to be implemented in another optical device or in an optical system.

The solid crystal 203 may be in a form of a film, a layer, or a plate. For convenience of discussion, the solid crystal 203 may also be referred to as a solid crystal film 203 or a solid crystal layer 203. For illustrative purposes, the substrate 201, the alignment structure 202, and the solid crystal 203 are shown as having a flat shape. In some embodiments, at least one of the substrate 201, the alignment structure 202, or the solid crystal 203 may have a curved shape. The solid crystal film 203 may be in contact with the alignment structure 202, and crystal molecules 204 included in the solid crystal film 203 may be at least partially aligned by the alignment structure 202. In some embodiments, each layer of the crystal molecules 204 included in the solid crystal film 203 may lie flat on the alignment structure 202 in the x-y plane, and may follow an orientation or an alignment direction 205 (denoted by an arrow as shown in FIG. 2A) within the x-y plane perpendicular to a thickness direction 206 (e.g., a z-axis direction) of the solid crystal film 203. For example, the crystal molecules 204 may be spatially uniformly aligned along an x-axis direction as shown in FIG. 2A.

Multiple layers of the crystal molecules 204 may be disposed (e.g., grown) along the z-axis direction to form the solid crystal film 203. For discussion purposes, each crystal molecule 204 is depicted as having a longitudinal direction (or a length direction) and a lateral direction (or a width direction), and an axis of the crystal molecule 204 is presumed to be in the longitudinal direction of the crystal molecule 204, along the presumed axis of highest refractive index for crystal molecule 204. As shown in FIG. 2A, the orientations of the axes of the crystal molecules 204 are uniformly aligned by the alignment structure 202 in the alignment direction 205. A plane including the longitudinal direction and the lateral direction of the crystal molecule 204 is parallel to the surface of the substrate 201 or the x-y plane (i.e., the crystal molecule 204 lies flat in the x-y plane). For illustrative purposes, the crystal molecules 204 in the solid crystal film 203 or the solid crystal layer 203 are drawn to have a same shape. In some embodiments, the crystal molecules 204 in a solid crystal layer may be the same (e.g., molecules of the same crystal material). In some embodiments, the crystal molecules 204 in one solid crystal layer may include two or more different molecules (e.g., molecules of two or more different crystal materials).

As shown in FIG. 2B, a film stack 220 (e.g., a thin-film stack 220) may include a substrate 221 and a plurality of film sets disposed on the substrate. The substrate 221 may be similar to the substrate 201 shown in FIG. 2A. The film stack 220 may include alternating first films 222 and second films 223, in which a first film 222 and a neighboring second film 223 may form a film set. The film stack 220 may include a plurality of film sets. The first film 222 and the second film 223 may be embodiments of the first film 102 and the second film 103 shown in FIGS. 1A and 1B, respectively. In some embodiments, at least one (e.g., each) first film 222 may include an alignment structure, and at least one (e.g., each) second film 223 may include a solid crystal (or a solid crystal film). For discussion purposes, the first film 222 may also be referred to as an alignment structure 222, and the second film 223 may also be referred to as a solid crystal 223. For illustrative purposes, FIG. 2B merely illustrates one film set include in the film stack 220. It is understood that the film stack 220 may include any suitable number of film sets, for example, 5 sets, 10 sets, 15 sets, 20 sets, 25 sets, or 30 sets, and so on.

Crystal molecules 224 included in the solid crystal film 223 may be at least partially aligned by the alignment structure 222. In the embodiment shown in FIG. 2A, the crystal molecules 204 lie flat in the x-y plane (e.g., a plane including a longitudinal direction and a lateral direction of the crystal molecules 204 is parallel to the surface of the substrate 201, or the x-y plane). In the embodiment shown in FIG. 2B, the crystal molecules 224 may not lie flat in the x-y plane, but may lie flat in the x-z plane, i.e., a plane including the longitudinal direction and the lateral direction of the crystal molecules 204 perpendicular to the surface of the substrate 221. Each layer of the crystal molecules 224 may follow an orientation or an alignment direction 225 (denoted by an arrow as shown in FIG. 2B) within the x-y plane that is perpendicular to a thickness direction 226 (e.g., a z-axis direction) of the solid crystal film 223. For example, the crystal molecules 224 may be spatially uniformly aligned along the x-axis direction as shown in FIG. 2B. In other words, the orientations of the axes of the crystal molecules 224 may be uniformly aligned by the alignment structure 222.

As shown in FIG. 2C, a film stack 240 (e.g., a thin-film stack 240) may include a substrate 241 and a plurality of film sets disposed on the substrate. The substrate 241 may be similar to the substrate 201 shown in FIG. 2A. The film stack 240 may include alternating first films 242 and second films 243, in which a first film 242 and a neighboring second film 243 may form a film set. The film stack 240 may include a plurality of film sets. The first film 242 and the second film 243 may be embodiments of the first film 102 and the second film 103 shown in FIGS. 1A and 1B, respectively. In some embodiments, at least one (e.g., each) first film 242 may include an alignment structure, and at least one (e.g., each) second film 243 may include a solid crystal (or a solid crystal film). For discussion purposes, the first film 242 may be referred as an alignment structure 242, and the second film 243 may be referred to as a solid crystal film 243 or a solid crystal 243. For illustrative purposes, FIG. 2C merely illustrates one film set include in the film stack 240. It is understood that the film stack 240 may include any suitable number of film sets, for example, 5 sets, 10 sets, 15 sets, 20 sets, 25 sets, or 30 sets, and so on.

Crystal molecules 244 included in the solid crystal film 243 may be at least partially aligned by an alignment structure 242. The longitudinal direction (e.g., orientation of the axis) of each crystal molecule 244 in the x-z plane may form an angle with respective to a surface of a substrate 241 (or a surface of the alignment structure 242). For example, the crystal molecules 244 may follow an orientation or an alignment direction 245 (denoted by an arrow as shown in FIG. 2C) within an x-z plane. That is, the orientations of axes of the crystal molecules 244 may be uniformly aligned in the alignment direction 245 in the x-z plane, forming a suitable angle relative to a surface of the substrate 241 (or a surface of the alignment structure 242). The angle of the crystal molecules 244 (e.g., the orientations of the axes of the molecules 244) with respect to the surface of the substrate 241 may be any suitable angles, such as about 30°, about 45°, etc. In some embodiments, the crystal molecules 244 included in the solid crystal film 243 may have other suitable orientations or alignment directions under appropriate crystal growth conditions. For example, the crystal molecules 244 may follow an orientation or an alignment direction in the thickness direction (e.g., the z-axis direction) of the solid crystal film 243.

As shown in FIG. 2D, a film stack 260 (e.g., a thin-film stack 260) may include a substrate 261 and a plurality of film sets disposed on the substrate. The substrate 261 may be similar to the substrate 201 shown in FIG. 2A. The film stack 260 may include alternating first films and the second films, in which a first film and a neighboring second film may form a film set. The film stack 260 may include a plurality of film sets. A first film 262*a* or 262*b* and a second film 263*a* or 263*b* may be embodiments of the first film 102 and the second film 103 shown in FIGS. 1A and 1B, respectively. In some embodiments, at least one (e.g., each) first film 262*a* and/or 262*b* may include an alignment structure, and at least one (e.g., each) second film 263*a* and/or 263*b* may include a solid crystal (or a solid crystal film). For discussion purposes, the first film 262*a* or 262*b* may be referred to as an alignment structure 262*a* or 262*b*, and the second film 263*a* or 263*b* may be referred to as a solid crystal film 263*a* or 263*b*. For illustrative purposes, FIG. 2D merely illustrates two film sets include in the film stack 260. Solid crystal films 263a and 263b, and two alignment structures 262a and 262b are shown to be included in the film stack 260. It is understood that the film stack 260 may include any suitable number of film sets, for example, 5 sets, 10 sets, 15 sets, 20 sets, 25 sets, or 30 sets, and so on.

Crystal molecules 264a included in the solid crystal film 263a may be at least partially aligned by the alignment structure 262a, and crystal molecules 264b included in the solid crystal film 263b may be at least partially aligned by the alignment structure 262b. The multiple alignment structures may define the same or different predetermined alignment patterns for aligning crystal molecules disposed thereon. In the embodiment shown in FIG. 2D, the respective alignment structures may provide a substantially same alignment pattern (e.g., spatially uniform alignment direction) for the crystal molecules included in the respective solid crystal films. For example, the crystal molecules 264a and 264b may be aligned in the x-axis directions 265a and 265b, as shown in FIG. 2D. Although each solid crystal film 263a and 263b is shown to be similar to the solid crystal film 223 shown in FIG. 2B, in some embodiments, each solid crystal film 263a and 263b may be similar to the solid crystal film 203 shown in FIG. 2A or the solid crystal film 243 shown in FIG. 2C.

In the embodiments, the alignment structures may provide different alignment patterns for the crystal molecules included in the respective solid crystal films. For example, as shown in FIG. 2E, alignment structures 282a and 282c may provide a spatially uniform alignment direction in a first direction 285a or 285c (e.g., the x-axis direction), and alignment structures 282b and 282d may provide a spatially uniform alignment direction in a second direction 285b or 285d different from the first direction 285a or 285c. For example, the second direction 285b or 285d may be a tilted alignment direction.

Figure 3A:
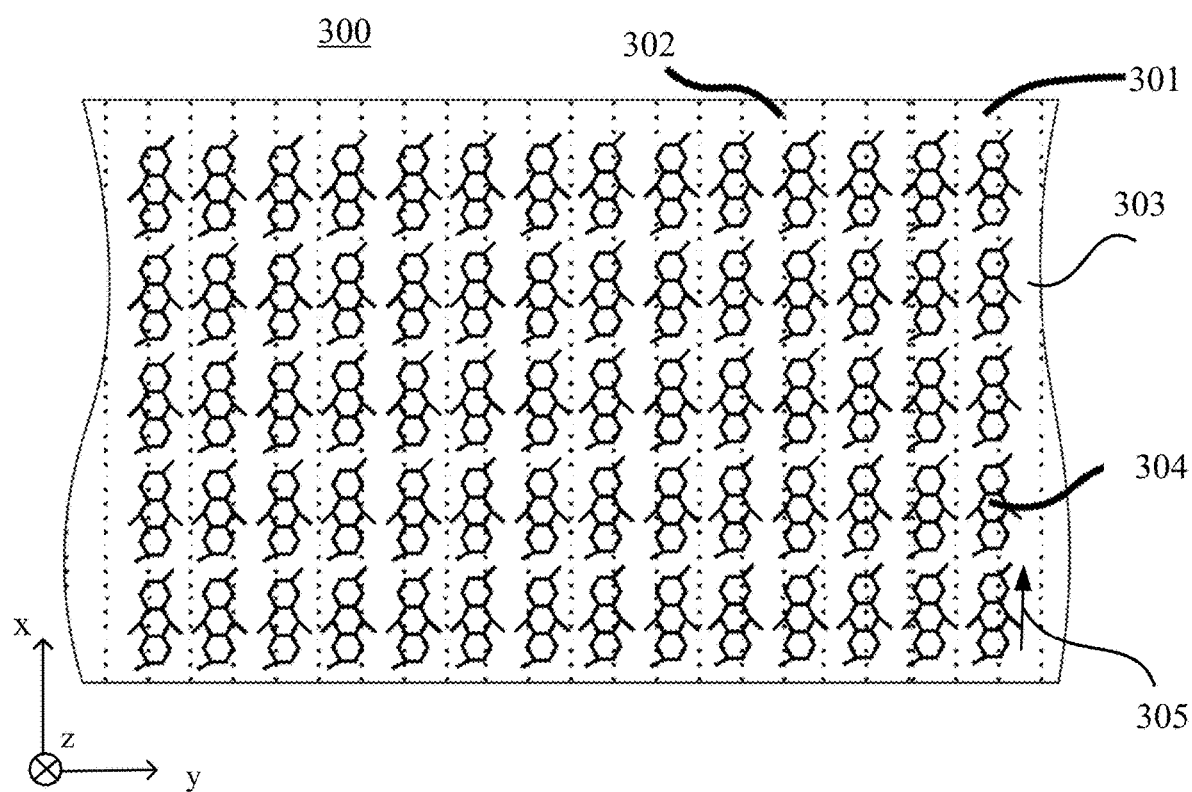
FIGS. 3A-3B illustrate schematic cross-sectional views of film stacks, according to various embodiments of the present disclosure.
Figure 3B:
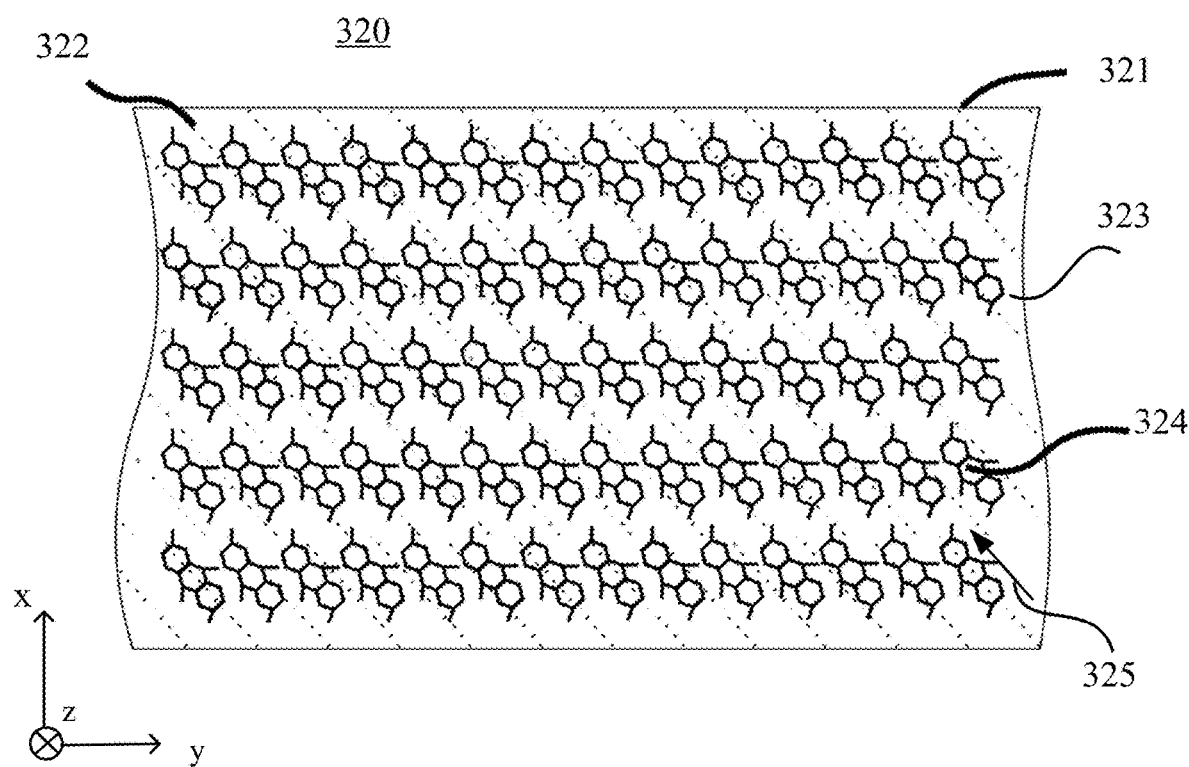

FIGS. 3A and 3B schematically illustrate top views (e.g., x-y sectional views) of film stacks (e.g., thin-film stacks), according to various embodiments of the present disclosure. In the embodiments shown in FIGS. 3A and 3B, the crystal molecules in the respective solid crystal films may be substantially uniformly aligned in a predetermined pattern (e.g., in a predetermined direction). The film stacks shown in FIGS. 3A and 3B may include structures or elements that are the same as or similar to those included in the film stacks shown in FIGS. 1A-2D (e.g., the film stack 100 shown in FIG. 1A). Descriptions of the same or similar structures or elements included in the embodiments shown in FIGS. 3A and 3B can refer to the above descriptions (including, e.g., those rendered in connection with the embodiment shown in FIG. 1A). The specific alignment of the molecules in the top views of FIG. 3A and FIG. 3B are for illustrative purposes.

As shown in FIG. 3A, a film stack 300 (e.g., a thin-film stack 300) may include a substrate 301 and one or more film sets disposed on the substrate 301. The substrate 301 may be similar to the substrate 201 shown in FIG. 2A. In some embodiments, the film stack 300 may include alternating first films 302 and the second films 303, in which a first film 302 and a neighboring second film 303 may form a film set. The first film 302 and the second film 303 may be embodiments of the first film 102 and the second film 103 shown in FIGS. 1A and 1B, respectively. In some embodiments, at least one (e.g., each) first film 302 may include an alignment structure (for discussion purposes, the first film 302 may also be referred to as an alignment structure 302), and at least one (e.g., each) second film 303 may include a solid crystal or a solid crystal film (for discussion purposes, the second film 303 may also be referred to as a solid crystal 303 or a solid crystal film 303).

In at least one (e.g., each) of the plurality of film sets, the solid crystal film 303 may be disposed at (e.g., on) the alignment structure 302. The solid crystal film 303 may be in contact with the alignment structure 302. Crystal molecules 304 included in the solid crystal film 303 may be at least partially aligned by the alignment structure 302. In some embodiments, as shown in FIG. 3A, the crystal molecules 304 included in the solid crystal film 303 may lie flat on the alignment structure 302, and may follow an orientation or an alignment pattern (e.g., direction 305) (denoted by an arrow as shown in FIG. 3A) within a plane (e.g., an x-y plane) perpendicular to a thickness direction (e.g., a z-axis) of the solid crystal film 303. For example, the crystal molecules 304 may be aligned along an x-axis direction in FIG. 3A. In other words, the orientations of the axes of the crystal molecules 304 may be aligned in the alignment direction 305. In some embodiments, the crystal molecules 304 may be aligned along a y-axis direction. In some embodiments, the crystal molecules 304 may be aligned in a suitable direction within an x-y plane. In some embodiments, the film stack 300 having the top view shown in FIG. 3A may have a corresponding cross-sectional view shown in FIG. 2A.

As shown in FIG. 3B, a film stack 320 may include a substrate 321 and a plurality of film sets disposed on the substrate 321. The substrate 321 may be similar to the substrate 201 shown in FIG. 2A. In some embodiments, the film stack 320 may include alternating first films 322 and the second films 323, in which a first film 322 and a neighboring second film 323 may form a film set. The first film 322 and the second film 323 may be embodiments of the first film 102 and the second film 103 shown in FIGS. 1A and 1B, respectively. In some embodiments, at least one (e.g., each) first film 322 may include or function as an alignment structure (for discussion purposes, the first film 322 may also be referred to as an alignment structure 322), and at least one (e.g., each) second film 323 may include a solid crystal or a solid crystal film (for discussion purposes, the second film 323 may also be referred to as a solid crystal 323 or a solid crystal film 323). In at least one (e.g., each) of the plurality of film sets, the solid crystal film 323 may be disposed at (e.g., on) the alignment structure 322. Crystal molecules 324 included in the solid crystal film 323 may lie flat on the alignment structure 322, and may follow an orientation or an alignment pattern (e.g., direction 325) (denoted by an arrow as shown in FIG. 3B) within a plane (e.g., the x-y plane) perpendicular to a thickness direction (e.g., a z-axis) of the solid crystal film 323. In other words, the orientations of the axes of the crystal molecules 324 may be aligned in the alignment direction 325. The alignment direction 325 may form an angle relative to the x or y axis. Any suitable angle may be configured. For example, in some embodiments, the crystal molecules 324 may be aligned in a direction having an angle of about 45° with respect to the x-axis direction.

Figure 4A:
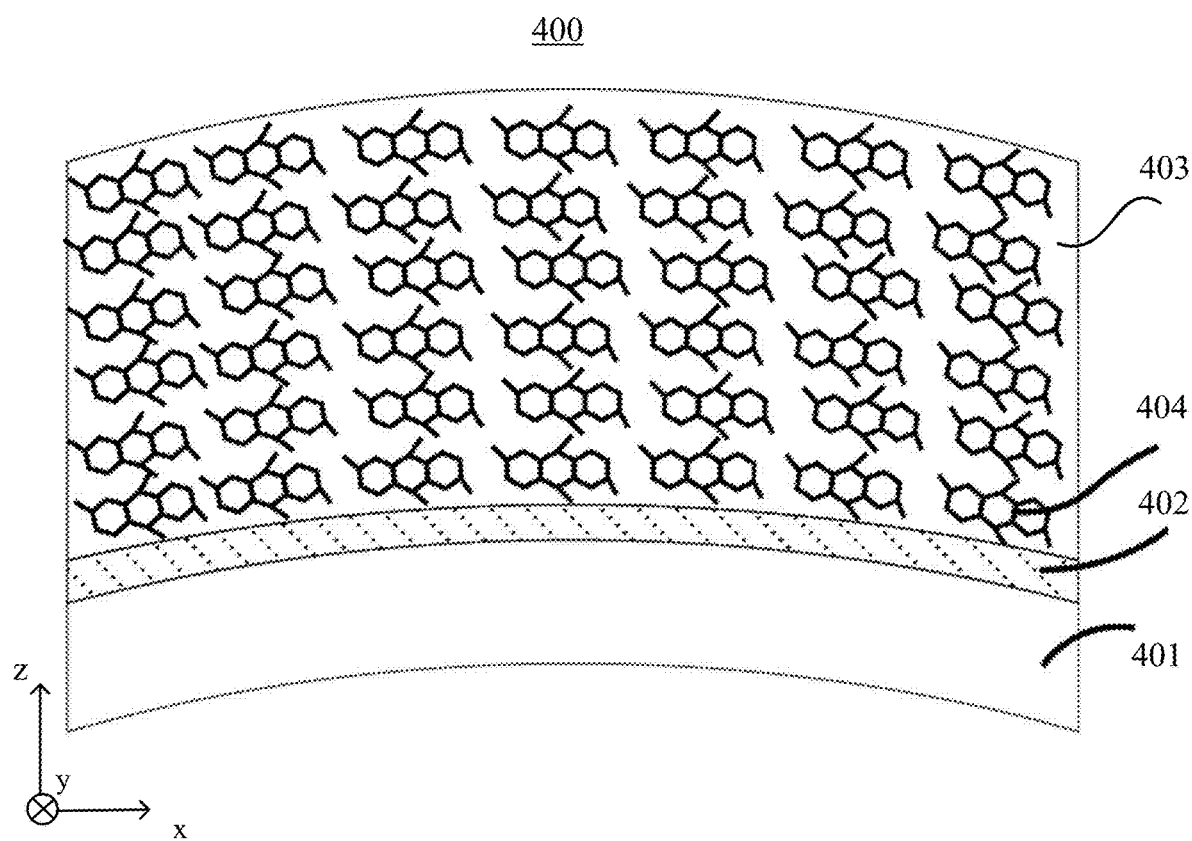
FIGS. 4A-4C illustrate schematic cross-sectional views of film stacks, according to various embodiments of the present disclosure.
Figure 4B:
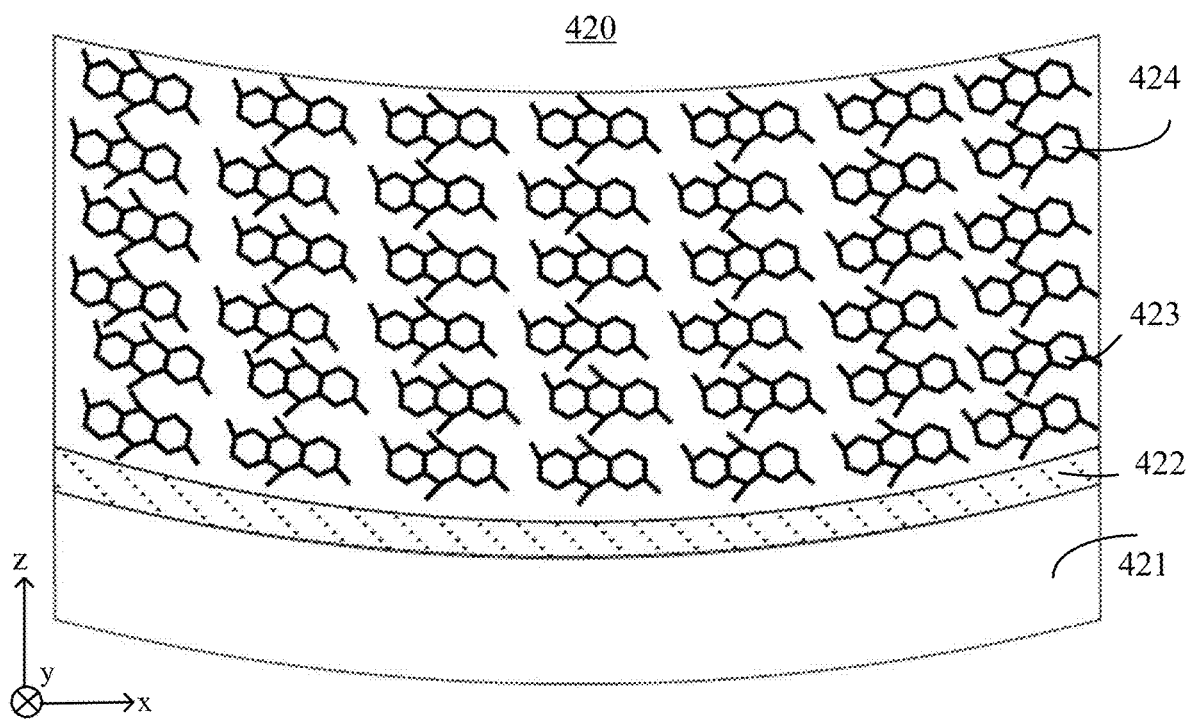
Figure 4C:
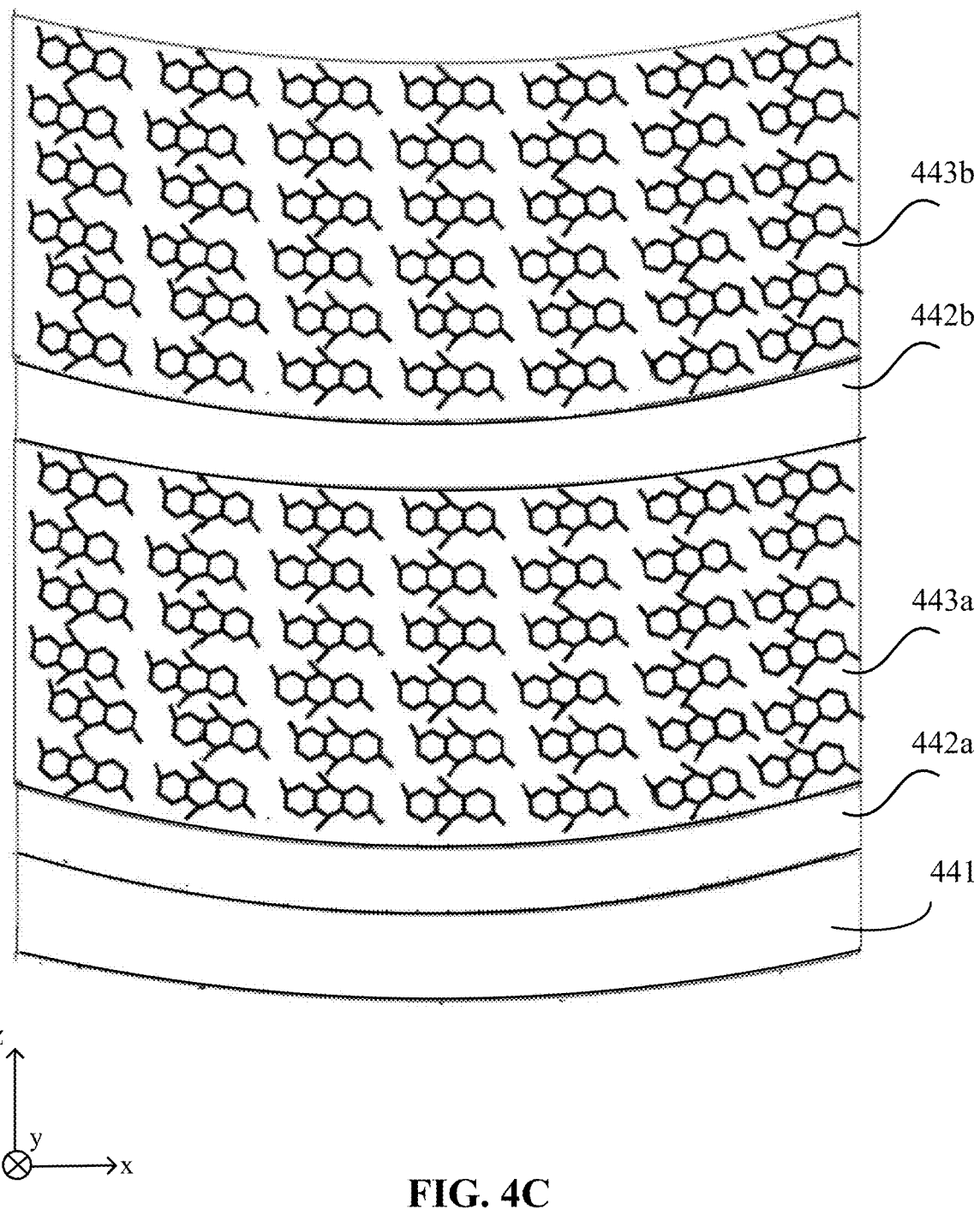

FIGS. 4A-4C schematically illustrate x-z sectional views of film stacks (e.g., thin-film stacks), according to various embodiments of the present disclosure. The film stacks shown in FIGS. 4A-4C may include curved substrates and curved solid crystal films, and may function as curved refractive polarizers. The film stacks shown in FIGS. 4A-4C may include structures or elements that are the same as or similar to those included in the film stack shown in FIGS. 1A-3B (e.g., the film stack 100 shown in FIG. 1A). Descriptions of the same or similar structures or elements included in the embodiments shown in FIGS. 4A-4C can refer to the above descriptions (including, e.g., those rendered in connection with the embodiment shown in FIG. 1A).

As shown in FIG. 4A, a film stack 400 (e.g., a thin-film stack 400) may include a substrate 401, and a plurality of film sets disposed on the substrate 401. In some embodiments, the film stack 400 may include alternating first films 402 and the second films 403, in which a first film 402 and a neighboring second film 403 may form a film set. The first film 402 and the second film 403 may be embodiments of the first film 102 and the second film 103 shown in FIGS. 1A and 1B, respectively. In some embodiments, at least one (e.g., each) first film 402 may include an alignment structure (for discussion purposes, the first film 402 may also be referred to as an alignment structure 402), and at least one (e.g., each) second film 403 may include a solid crystal or a solid crystal film (for discussion purposes, the second film 403 may also be referred to as a solid crystal 403 or a solid crystal film 403). For illustrative purposes, FIG. 4A merely illustrates one film set include in the film stack 400. It is understood that the film stack 400 may include any suitable number of film sets, for example, 5 sets, 10 sets, 15 sets, 20 sets, 25 sets, or 30 sets, and so on.

In at least one (e.g., each) of the film sets, the solid crystal film 403 may be disposed at (e.g., on) the alignment structure 402. Crystal molecules 404 included in the solid crystal film 403 may be at least partially aligned by the alignment structure 402. The substrate 401 may include one or more curved surfaces. For example, one or both of an upper surface and a lower surface of the substrate 401 may have a curved shape. In some embodiments, the alignment structure 402 disposed at the substrate 401 may include one or more curved surfaces. For example, at least a lower surface of the alignment structure 402 that faces the upper surface of the substrate 401 may have a curved shape. The curved shape of the alignment structure 402 may match with the curved shape of the upper surface of the substrate 401. In some embodiments, as shown in FIG. 4A, both the substrate 401 and the alignment structure 402 may have a convex shape. In some embodiments, the alignment structure 402 may directly formed (e.g., etched) on a curved surface of the substrate 401.

The solid crystal film 403 may have a first surface and an opposing second surface. One or both of the first surface and the second surface of the solid crystal film 403 may be non-rectilinear. In some embodiments, both the first surface and the second surface of the solid crystal film 403 may be non-rectilinear. For example, both the first surface (e.g., an upper surface) and the second surface (e.g., a lower surface) of the solid crystal film 403 may have a curved shape that matches with the curved shape of the alignment structure 402. For example, as shown in FIG. 4A, the solid crystal film 403 may have a convex shape that may match with the convex shape of the substrate 402.

In some embodiments, the crystal molecules 404 included in the solid crystal film 403 may have substantially uniform orientations or alignments (e.g., along a same predetermined linear direction) within the solid crystal film 403. In some embodiments, as shown in FIG. 4A, the crystal molecules 404 included in the solid crystal film 403 may have different orientations or alignments.

As shown in FIG. 4B, a film stack 420 (e.g., a thin-film stack 420) may include a substrate 421 and a plurality of film sets disposed on the substrate 421. In some embodiments, the film stack 420 may include alternating first films 422 and the second films 423, in which a first film 422 and a neighboring second film 423 may form a film set. The first film 422 and the second film 423 may be embodiments of the first film 102 and the second film 103 shown in FIGS. 1A and 1B, respectively. In some embodiments, at least one (e.g., each) first film 422 may include an alignment structure (for discussion purposes, the first film 422 may also be referred to as an alignment structure 422), and at least one (e.g., each) second film 423 may include a solid crystal or a solid crystal film (for discussion purposes, the second film 423 may also be referred to as a solid crystal 423 or a solid crystal film 423). For illustrative purposes, FIG. 4B merely illustrates one film set include in the film stack 420. It is understood that the film stack 420 may include any suitable number of film sets, for example, 5 sets, 10 sets, 15 sets, 20 sets, 25 sets, or 30 sets, and so on.

In at least one (e.g., each) of the film sets, the solid crystal film 423 may be disposed at (e.g., on) the alignment structure 422. Crystal molecules 424 included in the solid crystal film 423 may be at least partially aligned by the alignment structure 422. The substrate 421 may have a concave shape, the alignment structure 422 may have a concave shape, and the solid crystal film 423 may have a concave shape. Although in the embodiment shown in FIG. 4B, the alignment structure 422 in contact with the substrate 421 is shown as a separate element disposed on the substrate 421, in some embodiments, the alignment structure 422 may be directly formed (e.g., etched) on a curved surface of the substrate 421. In some embodiments, the crystal molecules 424 included in the solid crystal film 423 may have substantially uniform orientations or alignments (e.g., along a same predetermined linear direction) within the solid crystal film 423. In some embodiments, as shown in FIG. 4B, the crystal molecules 424 included in the solid crystal film 423 may have different orientations or alignments.

As shown in FIG. 4C, a film stack 440 (e.g., a thin-film stack 440) may include a substrate 441 and a plurality of film sets disposed on the substrate 441. The substrate 441 may be a curved substrate. In some embodiments, the film stack 440 may include alternating first films and the second films, in which a first film and a neighboring second film may form a film set. A first film 442a or 442b and a second film 443a or 443b may be embodiments of the first film 102 and the second film 103 shown in FIGS. 1A and 1B, respectively. In some embodiments, at least one (e.g., each) second film 443a and/or 443b may include a curved (e.g., concave) solid crystal film. In some embodiments, the curved solid crystal film may be obtained by shaping a meniscus during a crystal growth process. Crystal molecules 444 may be aligned during the growth process based on the shape of the meniscus. In such an embodiment, an alignment structure may be omitted during the fabrication process of the solid crystal film. For illustrative purposes, FIG. 4C merely illustrates two film sets include in the film stack 440. It is understood that the film stack 440 may include any suitable number of film sets, for example, 5 sets, 10 sets, 15 sets, 20 sets, 25 sets, or 30 sets, and so on.

Figure 5A:
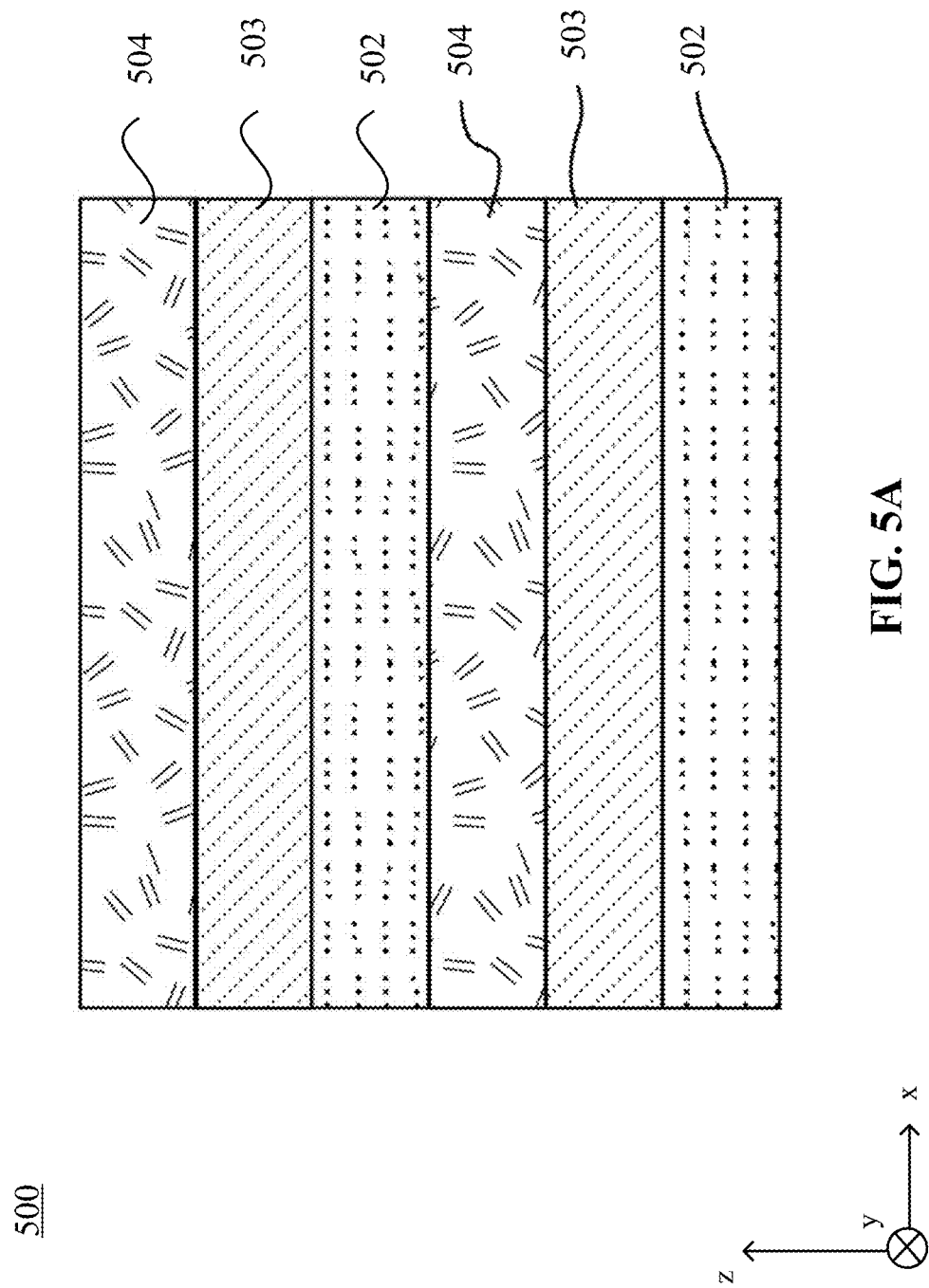
FIGS. 5A-5C illustrate schematic cross-sectional views of film stacks, according to various embodiments of the present disclosure.
Figure 5B:
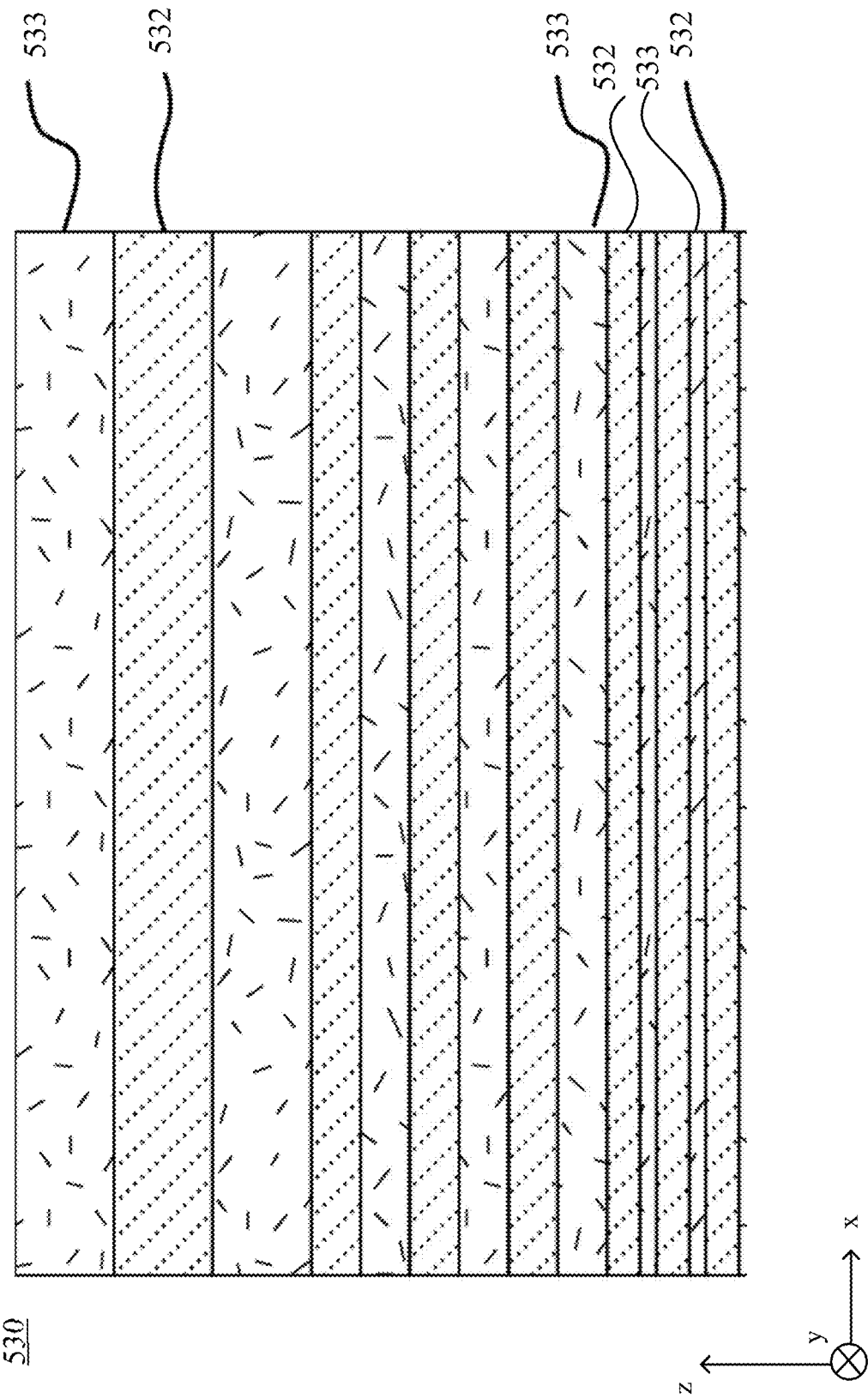
Figure 5C:
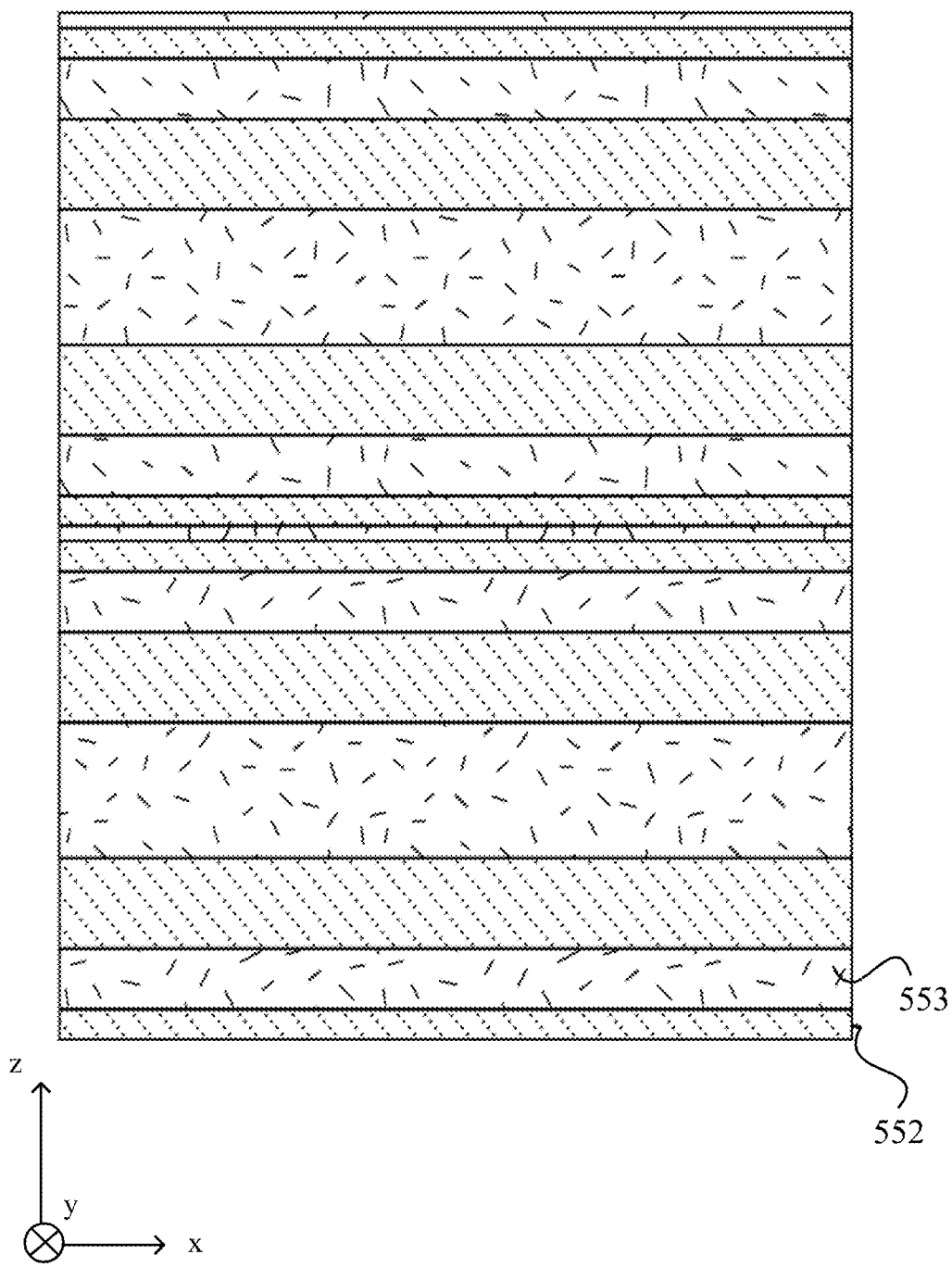

FIGS. 5A-5C schematically illustrate x-z sectional views of film stacks (e.g., thin-film stacks), according to various embodiments of the present disclosure. The film stacks shown in FIGS. 5A-5C may include structures or elements that are the same as or similar to those included in the film stack shown in FIGS. 1A-4C (e.g., the film stack 100 shown in FIG. 1A). Descriptions of the same or similar structures or elements included in the embodiments shown in FIGS. 5A-5C can refer to the above descriptions (including, e.g., those rendered in connection with the embodiment shown in FIG. 1A).

As shown in FIG. 5A, a film stack 500 (e.g., a thin-film stack 500) may include alternating first films 502, second films 503, and third films 504. For example, the film stack 500 may include a plurality of first films 502, a plurality of second films 503, and a plurality of third films 504 alternately arranged. A first film 502, a second film 503, a third film 504 that are disposed in a sequence may form a film set, in which the first film 502, the second film 503, the third film 504 may be adjacent to one another. The film stack 500 may include a plurality of film sets. In some embodiments, the film stack 500 may include a substrate on which the plurality of film sets may be disposed. Although not shown, in some embodiments, the film stack 500 may include alternating first films 502, second films 503, third films 504, fourth films, fifth films, and so no.

In some embodiments, the first film 502 and the second film 503 may be embodiments of the first film 102 and the second film 103 shown in FIGS. 1A and 1B, respectively. In some embodiments, at least one (e.g., each) first film 502 may include an alignment structure (for discussion purposes, the first film 502 may also be referred to as an alignment structure 502), and at least one (e.g., each) second film 503 may include a solid crystal or a solid crystal film (for discussion purposes, the second film 503 may also be referred to as a solid crystal 503 or a solid crystal film 503). In some embodiments, at least one (e.g., each) third film 504 may include an anisotropic organic solid crystalline material (e.g., an anisotropic organic solid crystal), an anisotropic polymer (e.g., an anisotropic crystalline polymer), an anisotropic inorganic crystalline material (e.g., an anisotropic inorganic solid crystal), or an isotropic material (e.g., an isotropic polymer or an isotropic inorganic crystal). In some embodiments, the in-plane optical anisotropies of the first film 502, the second film 503, and the third film 504 may be different. For example, the in-plane optical anisotropies of at least two of the first film 502, the second film 503, and the third film 504 may be different. In some embodiments, the first in-plane refractive indices of the first film 502, the second film 503, and the third film 504 may be different. For example, the first in-plane refractive indices of at least two of the first film 502, the second film 503, and the third film 504 may be different.

In some embodiments, the thicknesses of the first films 502 may be substantially the same. In some embodiments, the thicknesses of the second films 503 may be substantially the same. In some embodiments, the thicknesses of the third films 504 may be substantially the same. Although not shown, in some embodiments, the thicknesses of the first films 502 may be different, for example, the thicknesses of at least two first films 502 may be different. In some embodiments, the thicknesses of the second films 503 may be different, for example, the thicknesses of at least two second films 503 may be different. In some embodiments, the thicknesses of the third films 504 may be different for example, the thicknesses of at least two third films 504 may be different.

As shown in FIG. 5B, a film stack 530 (e.g., a thin-film stack 530) may include alternating first films 532 and second films 533. The first film 532 and the second film 533 may be similar to the first film 502 and the second film 503, respectively. In the embodiment shown in FIG. 5B, the thicknesses of the first films 532 may be different, for example, the thicknesses of at least two first films 532 may be different. The thicknesses of the second films 533 may be different, for example, the thicknesses of at least two second films 533 may be different. For example, along a thickness direction of the film stack 530 (e.g., +z-axis direction), the thicknesses of the first films 532 may gradually increase, and/or the thicknesses of the second films 533 may gradually increase. A first film 532 and a neighboring second film 533 may form a film set. In some embodiments, as the thicknesses of the first film 532 and the second film 533 in a film set gradually increase, the overall thickness of the film set may gradually increase. Accordingly, the wavelength range reflected by the film set may be red shifted, i.e., the reflected wavelength range may shift to a longer wavelength range. The film stack 530 may have a broadband bandgap structure, for example, the film stack 530 may function as a broadband reflective polarizer, e.g., covering the visible spectrum.

As shown in FIG. 5C, a film stack 550 (e.g., a thin-film stack 550) may include alternating first films 552 and second films 553. The first film 552 and the second film 553 may be similar to the first film 502 and the second film 503, respectively. In the embodiment shown in FIG. 5C, the thicknesses of the first films 552 may be different, for example, the thicknesses of at least two first films 552 may be different. The thicknesses of the second films 553 may be different, for example, the thicknesses of at least two second films 553 may be different. In the embodiment shown in FIG. 5C, along a thickness direction of the film stack 550 (e.g., +z-axis direction), the thicknesses of the first films 552 may first increase then decrease, and/or the thicknesses of the second films 553 may first increase then decrease. A first film 552 and a neighboring second film 553 may form a film set. In some embodiments, as the thicknesses of the first film 552 and the second film 553 in a film set first increase then decrease, the overall thickness of the film set may first increase then decrease. In some embodiments, the film stack 550 may include a periodic arrangement of the film sets. The film stack 550 may have a broadband bandgap structure, e.g., the film stack 550 may function as a broadband reflective polarizer.

Although not shown, in some embodiments, along a thickness direction of the film stack 550 (e.g., +z-axis direction), the thicknesses of the first films 552 may first decrease then increase, and/or the thicknesses of the second films 553 may first decrease then increase. A first film 552 and a neighboring second film 553 may form a film set. In some embodiments, as the thicknesses of the first film 552 and the second film 553 in a film set first decrease then increase, the overall thickness of the film set may first decrease then increase.

Figure 6A:
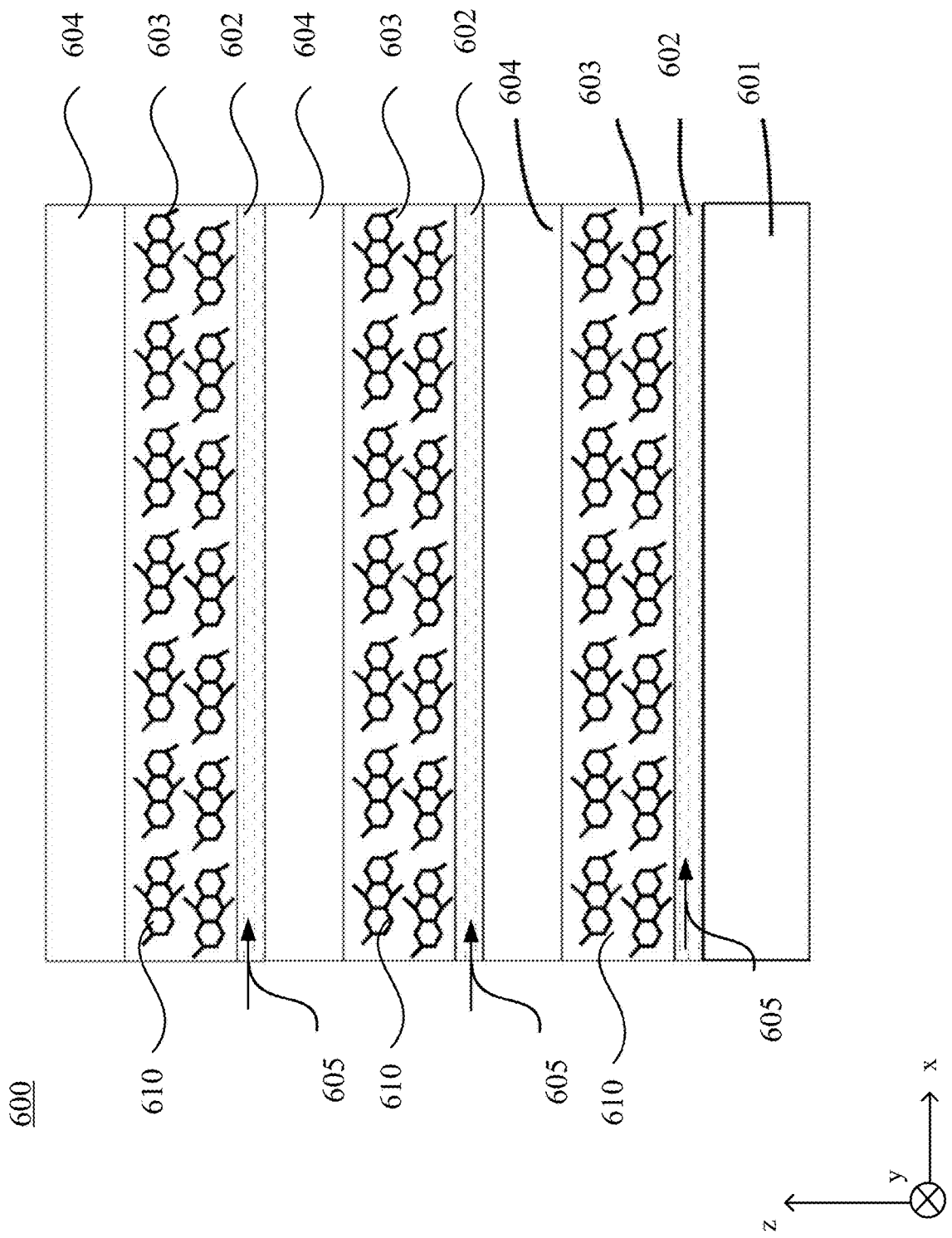
FIGS. 6A-6C illustrate schematic cross-sectional views of film stacks, according to various embodiments of the present disclosure.
Figure 6B:
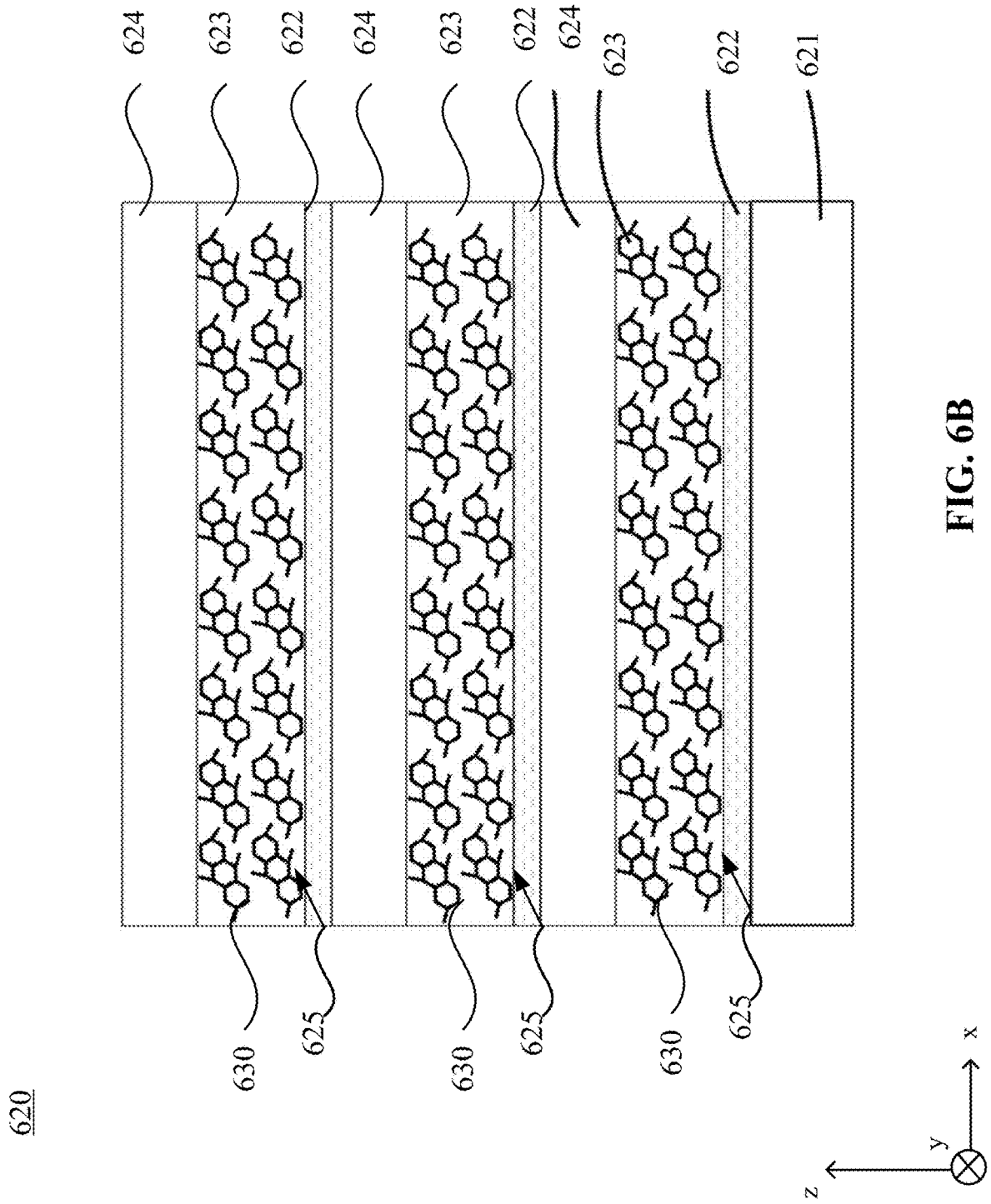
Figure 6C:
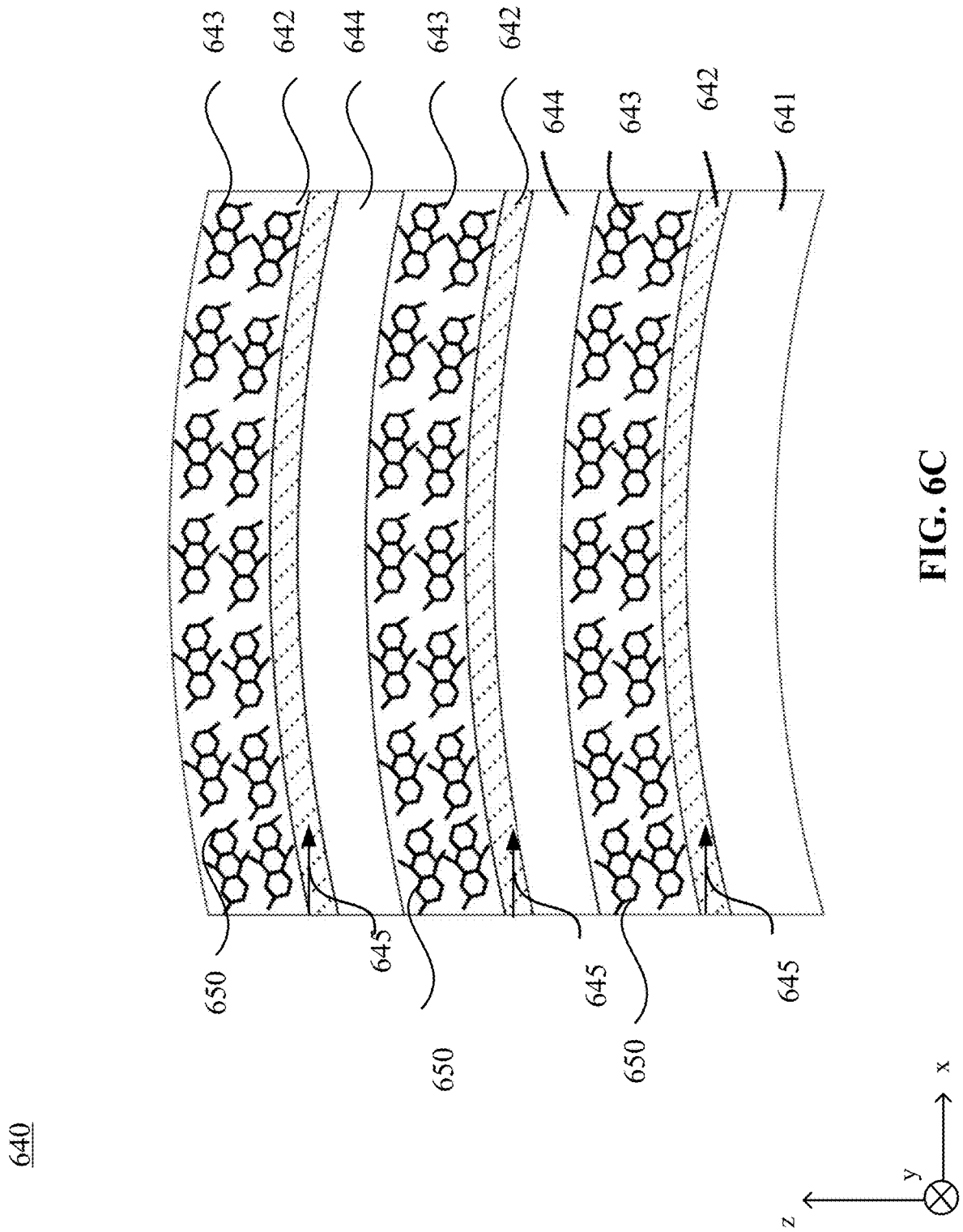

FIGS. 6A-6C schematically illustrate x-z sectional views of film stacks (e.g., thin-film stacks), according to various embodiments of the present disclosure. The film stacks shown in FIGS. 6A-6C may include structures or elements that are the same as or similar to those included in the film stack shown in FIGS. 1A-5C (e.g., the film stack 100 shown in FIG. 1A). Descriptions of the same or similar structures or elements included in the embodiments shown in FIGS. 6A-6C can refer to the above descriptions (including, e.g., those rendered in connection with the embodiment shown in FIG. 1A).

As shown in FIG. 6A, a film stack 600 (e.g., a thin-film stack 600) may include a substrate 601 and a plurality of film sets disposed on the substrate 601. The substrate 601 may be similar to the substrate 201 shown in FIG. 2A. The film stack 600 may include alternating first films 602, second films 603, and third films 604. The first film 602, the second film 603, and the third film 604 may be similar to the first film 502, the second film 503, and the third film 504 shown in FIG. 5A, respectively. In some embodiments, the in-plane optical anisotropies of the first film 602, the second film 603, and the third film 604 may be different. In at least one (e.g., each) of the plurality of film sets, the second film 603 may be disposed at (e.g., on) the first film 602, and the third film 604 may be disposed at (e.g., on) the second film 603. The second film 603 may be a solid crystal film 03. Crystal molecules 610 included in the solid crystal film 603 may be at least partially aligned by the alignment structure 602, e.g., in an alignment direction 605 (denoted by an arrow as shown in FIG. 6A) within the x-y plane. For example, the crystal molecules 610 may be spatially uniformly aligned along the x-axis direction as shown in FIG. 6A. In other words, the orientations of the axes of the crystal molecules 610 may be uniformly aligned by the alignment structure 602.

As shown in FIG. 6B, a film stack 620 (e.g., a thin-film stack 620) may include a substrate 621 and a plurality of film sets disposed on the substrate 621. The substrate 621 may be similar to the substrate 201 shown in FIG. 2A. The film stack 620 may include alternating first films 622, second films 623, and third films 624. The first film 622, the second film 623, and the third film 624 may be similar to the first film 502, the second film 503, and the third film 504 shown in FIG. 5A, respectively. For example, at least one (e.g., each) first film 622 may include an alignment structure 622, and at least one (e.g., each) second film 623 may include a solid crystal (or a solid crystal film) 623. In some embodiments, the in-plane optical anisotropies of the first film 622, the second film 623, and the third film 624 may be different. In at least one (e.g., each) of the plurality of film sets, the solid crystal film 623 may be disposed at (e.g., on) the alignment structure 622, and the third film 624 may be disposed at (e.g., on) the solid crystal film 623.

Crystal molecules 630 included in the solid crystal film 623 may be at least partially aligned by the alignment structure 622, e.g., in an alignment direction 625 (denoted by an arrow as shown in FIG. 6B) within the x-y plane. The longitudinal direction (e.g., orientation of the axis) of each crystal molecule 630 in the x-z plane may form an angle with respective to a surface of the substrate 621 (or a surface of the alignment structure 622). That is, the orientations of axes of the molecules 630 may be uniformly aligned in the alignment direction 625 in the x-z plane, forming a suitable angle relative to a surface of the substrate 621 (or a surface of the alignment structure 622). The angle of the crystal molecules 630 (e.g., the orientations of the axes of the crystal molecules 630) with respective to the surface of the substrate 621 may be any suitable angles, such as about 30°, about 45°, etc. In some embodiments, the crystal molecules 630 included in the solid crystal film 623 may have other suitable orientations or alignment directions under appropriate crystal growth conditions. For example, the crystal molecules 630 may follow an orientation or an alignment direction in the thickness direction (e.g., the z-axis direction) of the solid crystal film 623.

As shown in FIG. 6C, a film stack 640 (e.g., a thin-film stack 640) may include a substrate 641 and a plurality of film sets disposed on the substrate 641. The substrate 641 may be similar to the substrate 201 shown in FIG. 2A. The film stack 640 may include alternating first films 642, second films 643, and third films 644. The first film 642, the second film 643, and the third film 644 may be similar to the first film 502, the second film 503, and the third film 504 shown in FIG. 5A, respectively. For example, at least one (e.g., each) first film 642 may include an alignment structure 642, and at least one (e.g., each) second film 643 may include a solid crystal (or a solid crystal film) 643. In some embodiments, the in-plane optical anisotropies of the first film 642, the second film 643, and the third film 644 may be different. In at least one (e.g., each) of the plurality of film sets, the solid crystal film 643 may be disposed at (e.g., on) the alignment structure 642, and the third film 644 may be disposed at (e.g., on) the solid crystal film 643. Crystal molecules 650 included in the solid crystal film 643 may be at least partially aligned by the alignment structure 642, e.g., in an alignment direction 645 (denoted by an arrow as shown in FIG. 6A) within the x-y plane. For example, the crystal molecules 650 may be spatially uniformly aligned along the x-axis direction as shown in FIG. 6C. In other words, the orientations of the axes of the crystal molecules 650 may be uniformly aligned by the alignment structure 642.

The substrate 641 may include one or more curved surfaces. For example, one or both of an upper surface and a lower surface of the substrate 641 may have a curved shape. In some embodiments, the alignment structure 642 disposed at the substrate 641 may include one or more curved surfaces. For example, at least a lower surface of the alignment structure 642 that faces the upper surface of the substrate 641 may have a curved shape. The curved shape of the alignment structure 642 may match with the curved shape of the upper surface of the substrate 641. The solid crystal film 643 may have a first surface and an opposing second surface. One or both of the first surface and the second surface of the solid crystal film 643 may be non-rectilinear. In some embodiments, both the first surface and the second surface of the solid crystal film 643 may be non-rectilinear. For example, both the first surface (e.g., an upper surface) and the second surface (e.g., a lower surface) of the solid crystal film 643 may have a curved shape that matches with the curved shape of the alignment structure 642. For example, as shown in FIG. 6C, the solid crystal film 643 may have a convex shape that may match with the convex shape of the substrate 641.

The third film 644 may have a first surface and an opposing second surface. One or both of the first surface and the second surface of the third film 644 may be non-rectilinear. In some embodiments, both the first surface and the second surface of the third film 644 may be non-rectilinear. For example, both the first surface (e.g., an upper surface) and the second surface (e.g., a lower surface) of the third film 644 may have a curved shape that matches with the curved shape of the solid crystal film 643. For example, as shown in FIG. 6C, the third film 644 may have a convex shape that may match with the convex shape of the substrate 641.

FIGS. 7A-7E are plots of reflectance versus wavelength of the film stack 100 shown in FIGS. 1A and 1B, for orthogonally polarized lights (e.g., s-polarized light and p-polarized light). As shown in FIGS. 7A-7E, the horizontal axis is wavelength (unit: nm), and the vertical axis is normalized reflectance. FIGS. 7A-7E are simulated results showing relationships between wavelength and normalized reflectance, for orthogonally polarized lights (s-polarized light and p-polarized light), when the film stack 100 has various optical anisotropy and various numbers of film sets. Referring to FIGS. 1A and 1B and FIGS. 7A-7E, the s-polarized light is presumed to be polarized in the y-axis direction in FIGS. 1A and 1B, and the p-polarized light is presumed to be polarized in the x-axis direction in FIGS. 1A and 1B. M is the number of the film sets included in the film stack 100, L is an overall thickness of the film sets (which may be equal to the thickness of the film stack 100).

The first film 102 is presumed to be optically isotropic, and $n_L$ is the refractive index of the first film 102. That is, both the first in-plane refractive index $n_{1x}$ and the second in-plane refractive index $n_{1y}$ of the first film 102 are equal to $n_L$. The second film 103 may be optically anisotropic. $\Delta n_x$ is the refractive index difference between the first in-plane refractive index $n_{2x}$ of the second film (solid crystal) 103 and the first in-plane refractive index $n_{1x}$ of the first film 102 (e.g., $\Delta n_x = n_{2x} - n_{1x}$), $\Delta n_y$ is the refractive index difference between the second in-plane refractive index $n_{2y}$ of the second film (solid crystal) 103 and the second in-plane refractive index $n_{1y}$ of the first film 102 (e.g., $\Delta n_y = n_{2y} - n_{1y}$), and $\Delta n_z$ is the refractive index difference between the third out-of-plane refractive index $n_{2z}$ of the second film (solid crystal) 103 and the third out-of-plane refractive index $n_{1z}$ of the first film 102 (e.g., $\Delta n_z = n_{2z} - n_{1z}$). The parameter $\lambda_0$ is the design wavelength. A thickness gradient from bottom to top of the film stack 100 is presumed to be about 25%. The normalized reflectance for the s-polarized light and the p-polarized light is evaluated in a wavelength range from about 400 nm to about 800 nm.

Figure 7A:
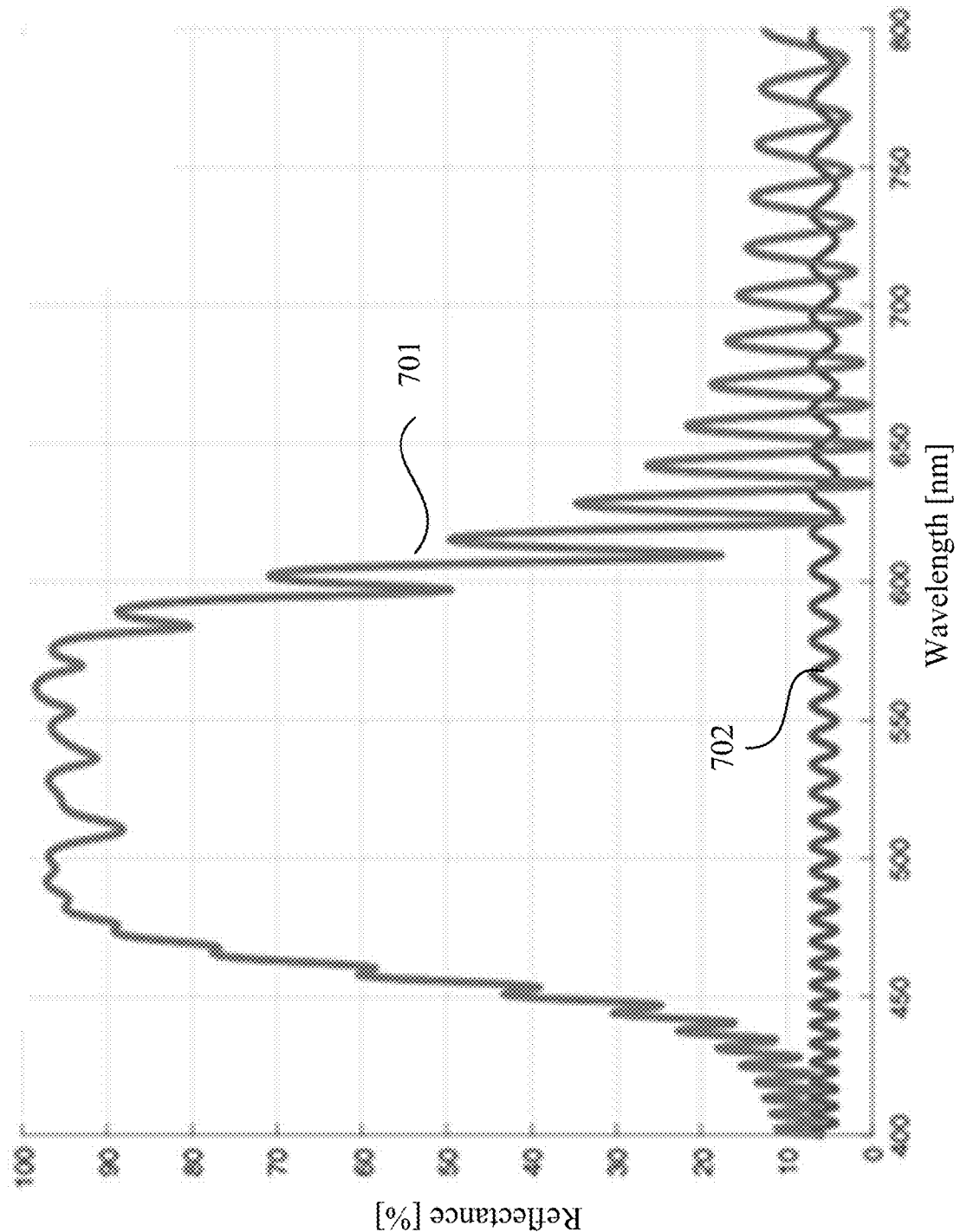
FIGS. 7A-7E are plots of reflectance versus wavelength of film stacks, according to various embodiments of the present disclosure.

As shown in FIG. 7A, the film stack 100 has M=55, $\lambda_0$=500 nm, L=8.5 μm, $n_L$=1.62, $\Delta n_x$=0.2, $\Delta n_y$=0, $\Delta n_z$=−0.11. These parameters are exemplary. Curves 701 and 702 show the normalized reflectance verse wavelength for the p-polarized light and the s-polarized light, respectively. As shown in the curves 701 and 702, the film stack 100 has a higher reflectance for the p-polarized light than the s-polarized light in the wavelength range of about 400 nm to about 800 nm. In the wavelength range from about 400 nm to about 800 nm, the s-polarized light is substantially transmitted by the film stack 100, with the normalized reflectance about 8%. In the wavelength range from about 455 nm to about 605 nm, the p-polarized light is substantially reflected by the film stack 100, and the normalized reflectance of the film stack 100 for the p-polarized light is above about 50%.

Figure 7B:
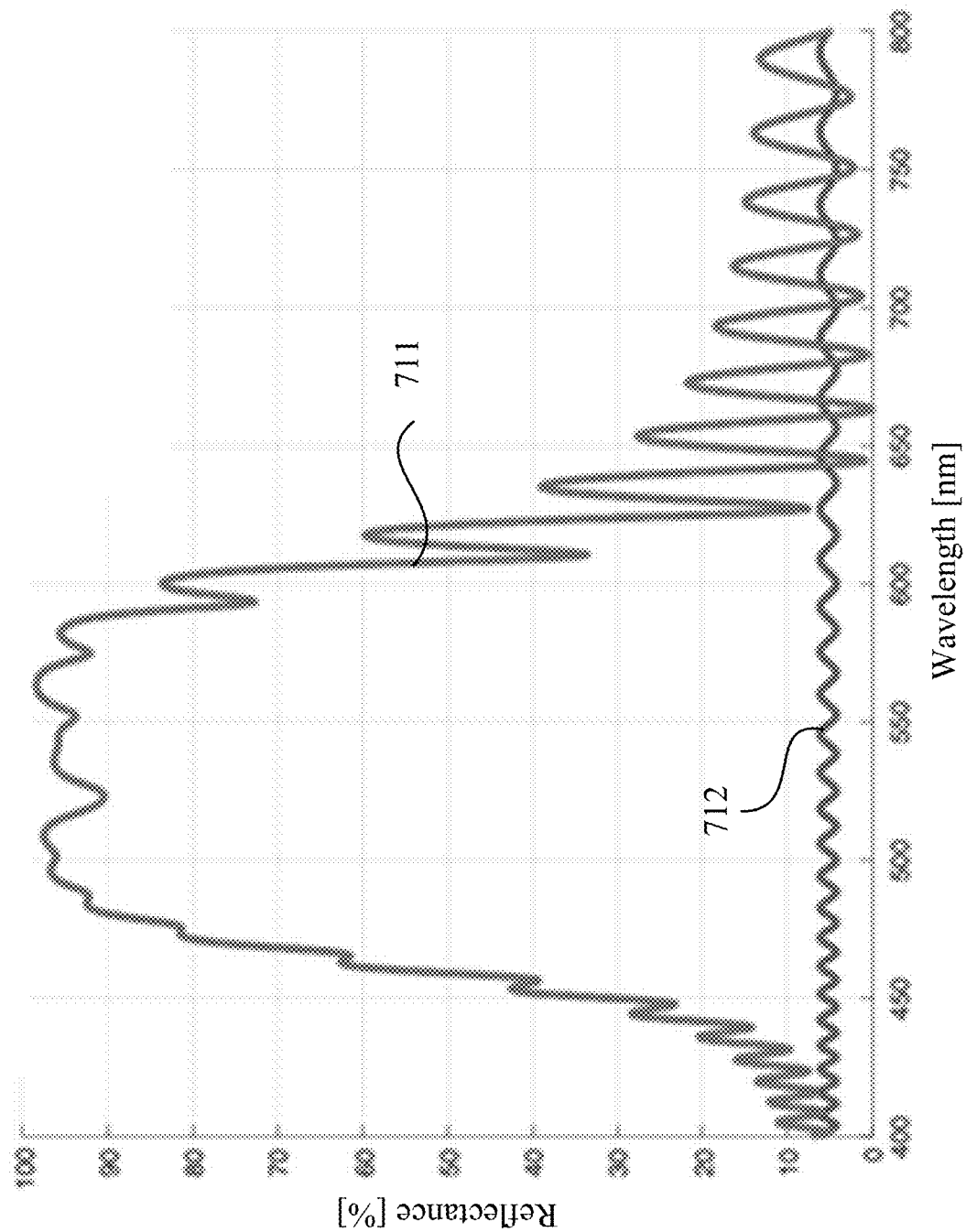

As shown in FIG. 7B, the film stack 100 has M=42, $\lambda_0$=500 nm, L=6.6 μm, $n_L$=1.59, $\Delta n_x$=0.23, $\Delta n_y$=0, $\Delta n_z$=−0.05. These parameters are exemplary. Curves 711 and 712 show the normalized reflectance verse wavelength for the p-polarized light and the s-polarized light, respectively. As shown in the curves 711 and 712, the film stack 100 has a higher reflectance for the p-polarized light than the s-polarized light in the wavelength range of about 400 nm to about 800 nm. In the wavelength range from about 400 nm to about 800 nm, the s-polarized light is substantially transmitted by the film stack 100, with the normalized reflectance about 5%. In the wavelength range from about 460 nm to about 610 nm, the p-polarized light is substantially reflected by the film stack 100, and the normalized reflectance of the film stack 100 for the p-polarized light is above about 50%.

Figure 7C:
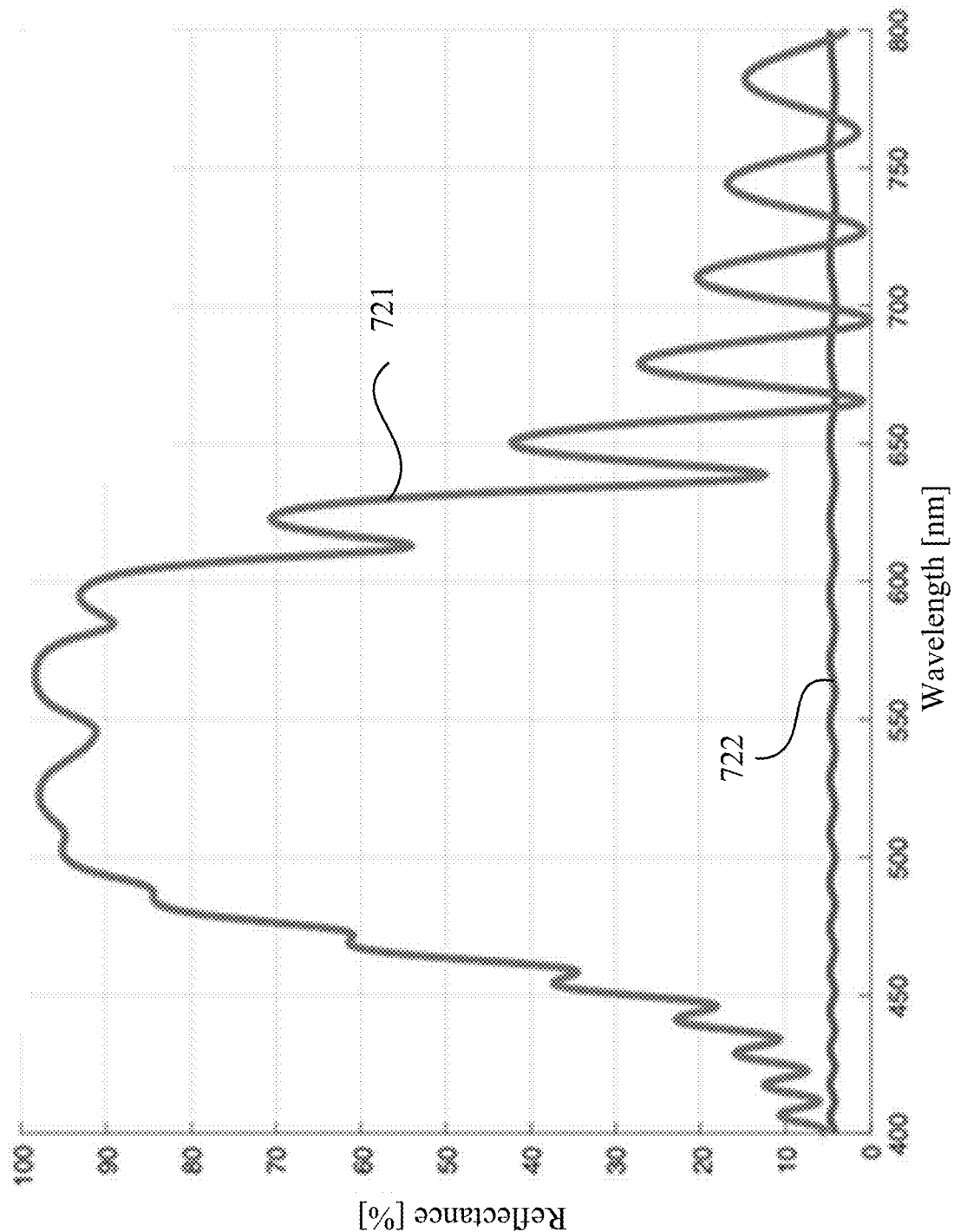

As shown in FIG. 7C, the film stack 100 has M=28, $\lambda_0$=500 nm, L=4.5 μm, $n_L$=1.54, $\Delta n_x$=0.28, $\Delta n_y$=0, $\Delta n_z$=0.05. These parameters are exemplary. Curves 721 and 722 show the normalized reflectance verse wavelength for the p-polarized light and the s-polarized light, respectively. As shown in the curves 721 and 722, the film stack 100 has a higher reflectance for the p-polarized light than the s-polarized light in the wavelength range of about 400 nm to about 800 nm. In the wavelength range from about 400 nm to about 800 nm, the s-polarized light is substantially transmitted by the film stack 100, with the normalized reflectance below about 5%. In the wavelength range from about 465 nm to about 630 nm, the p-polarized light is substantially reflected by the film stack 100, and the normalized reflectance of the p-polarized light is above about 50%.

Figure 7D:
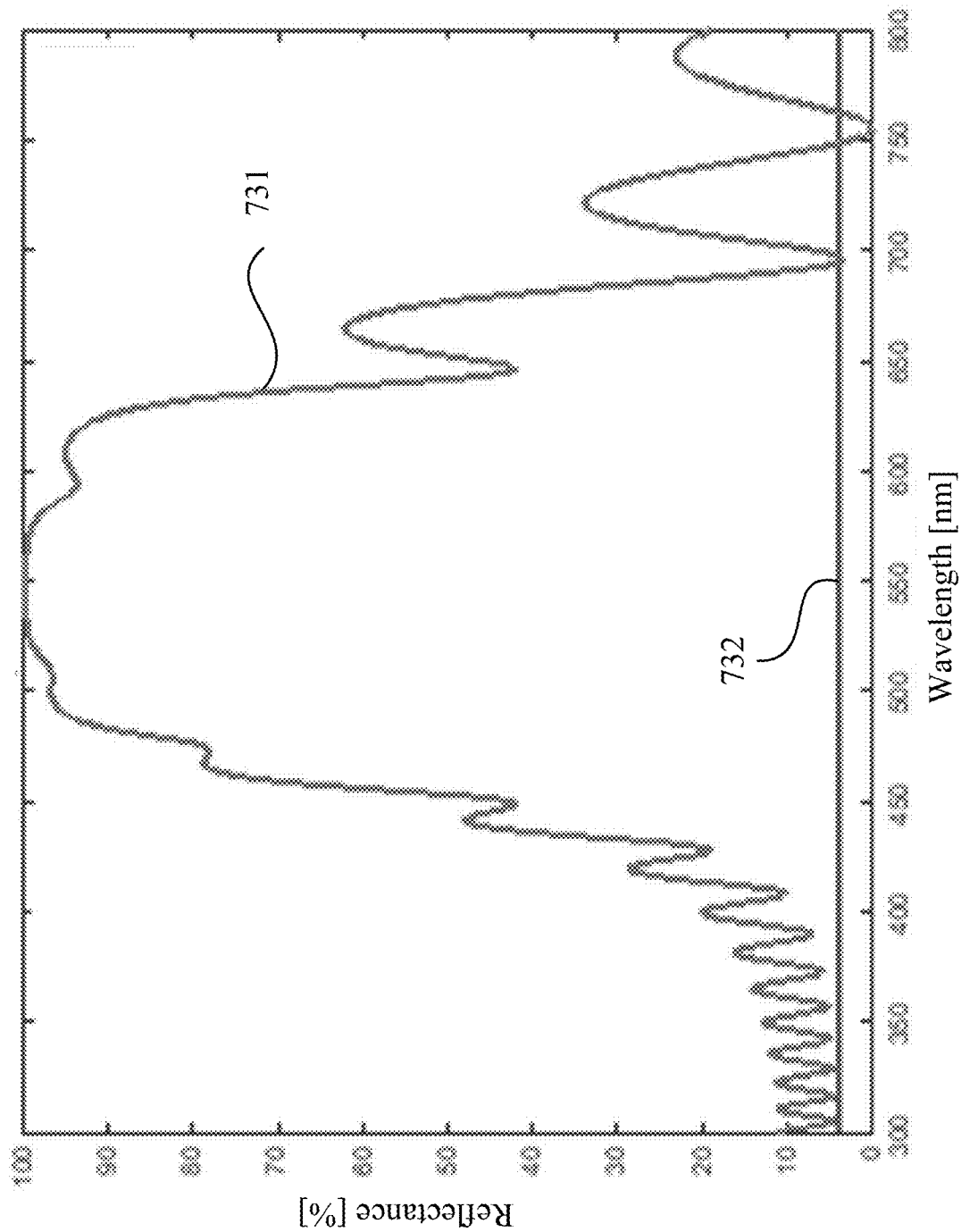

As shown in FIG. 7D, the film stack 100 has M=15, $\lambda_0$=550 nm, L=2.4 μm, $n_L$=1.5, $\Delta n_x$=0.5, $\Delta n_y$=0, $\Delta n_z$=0.0. These parameters are exemplary. Curves 731 and 732 show the normalized reflectance verse wavelength for the p-polarized light and the s-polarized light, respectively. As shown in the curves 731 and 732, the film stack 100 has a higher reflectance for the p-polarized light than the s-polarized light in the wavelength range of about 400 nm to about 800 nm. In the wavelength range from about 400 nm to about 800 nm, the s-polarized light is substantially transmitted by the film stack 100, with the normalized reflectance below about 5%. In the wavelength range from about 455 nm to about 640 nm, the p-polarized light is substantially reflected by the film stack 100, and the normalized reflectance of the p-polarized light is above about 50%.

Figure 7E:
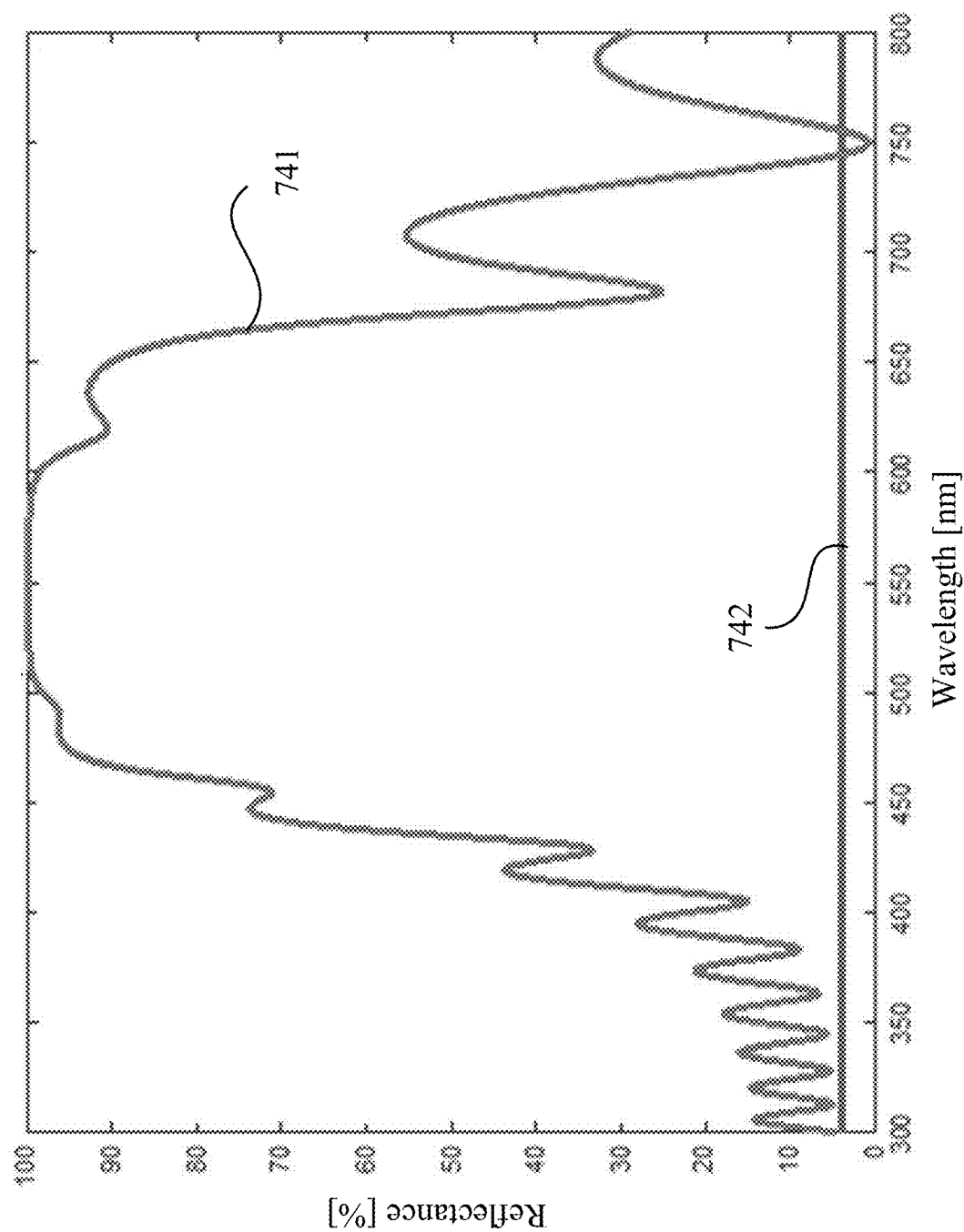

As shown in FIG. 7E, the film stack 100 has M=12, $\lambda_0$=550 nm, L=1.9 μm, $n_L$=1.5, $\Delta n_x$=0.7, $\Delta n_y$=0, $\Delta n_z$=0.0. These parameters are exemplary. Curves 731 and 732 show the normalized reflectance verse wavelength for the p-polarized light and the s-polarized light, respectively. As shown in the curves 741 and 742, the film stack 100 has a higher reflectance for the p-polarized light than the s-polarized light in the wavelength range of about 400 nm to about 800 nm. In the wavelength range from about 400 nm to about 800 nm, the s-polarized light is substantially transmitted by the film stack 100, with the normalized reflectance below about 5%. In the wavelength range from about 440 nm to about 660 nm, the p-polarized light is substantially reflected by the film stack 100, and the normalized reflectance of the p-polarized light is above about 50%.

Referring to FIGS. 1A and 1B and FIGS. 7A-7E, as $\Delta n_x$ gradually increases, the normalized reflectance of the s-polarized light gradually decreases, the average normalized reflectance of the p-polarized light gradually increases. In addition, as $\Delta n_x$ gradually increases, the wavelength range in which the normalized reflectance of the p-polarized light is above about 50% gradually increases. In other words, the wavelength bandwidth in which the s-polarized light and the p-polarized light could be selectively transmitted or reflected (or the reflection bandwidth of the film stack 100) may gradually increase. Further, as $\Delta n_x$ gradually increases, the fluctuation of the normalized reflectance of the p-polarized light and the s-polarized light gradually decreases. As shown in FIG. 7D ($\Delta n_x$=0.5) and FIG. 7E ($\Delta n_x$=0.7), the curves 732 and 742 are substantially smooth in the wavelength range from about 400 nm to about 800 nm as compared to other curves 701, 711, and 721, and the smoothness of the curves 731 and 741 is significantly improved as compared to other curves 701, 711, and 721. As $\Delta n_x$ gradually increases, both the number "M" of film sets included in the film stack 100 and the thickness of the film stack 100 decrease, while the performance of the film stack 100 improves. As $\Delta n_x$ increases from about 0.2 to about 0.7, the number M of film sets included in the film stack 100 is reduced from 55 to 12, and the thickness of the film stack 100 is reduced from about 8.5 μm to about 1.9 μm (both are below 10 μm), while the performance of the film stack 100 improves. A conventional multilayer reflective polarizer has a thickness of tens of micrometers and includes more than one hundred film sets, because of the birefringence limitation that can be achieved with existing polymeric layers, e.g., below about 0.18. As a comparison, the disclosed film stack 100 including solid crystal layers may provide an improved optical performance with significantly reduced number of film sets and thickness.

The film stack or optical devices including the film stack in accordance with embodiments of the present disclosure may be implemented as multifunctional optical components in a large variety of applications, such as polarization conversion components, brightness enhancement components, or optical path-folding components. For example, the—film stack or optical devices including the film stack in accordance with embodiments of the present disclosure may be implemented in various systems, e.g., near-eye displays ("NEDs"), head-up displays ("HUDs"), head-mounted displays ("HMDs"), smart phones, laptops, or televisions, etc. Such implementations are within the scope of the present disclosure. In some embodiments, the disclosed film stack may be implemented as multifunctional optical components in NEDs and HUDs for augmented reality ("AR"), virtual reality ("VR"), and/or mixed reality ("MR"). For example, the disclosed film stack may be implemented as a reflective polarizer in a pancake lens assembly to fold the optical path, thereby reducing a back focal distance in the NED, in a display assembly to enhance the brightness enhancement, etc., which may significantly reduce the weight and size, and enhance the optical performance of the NEDs.

Figure 9A:
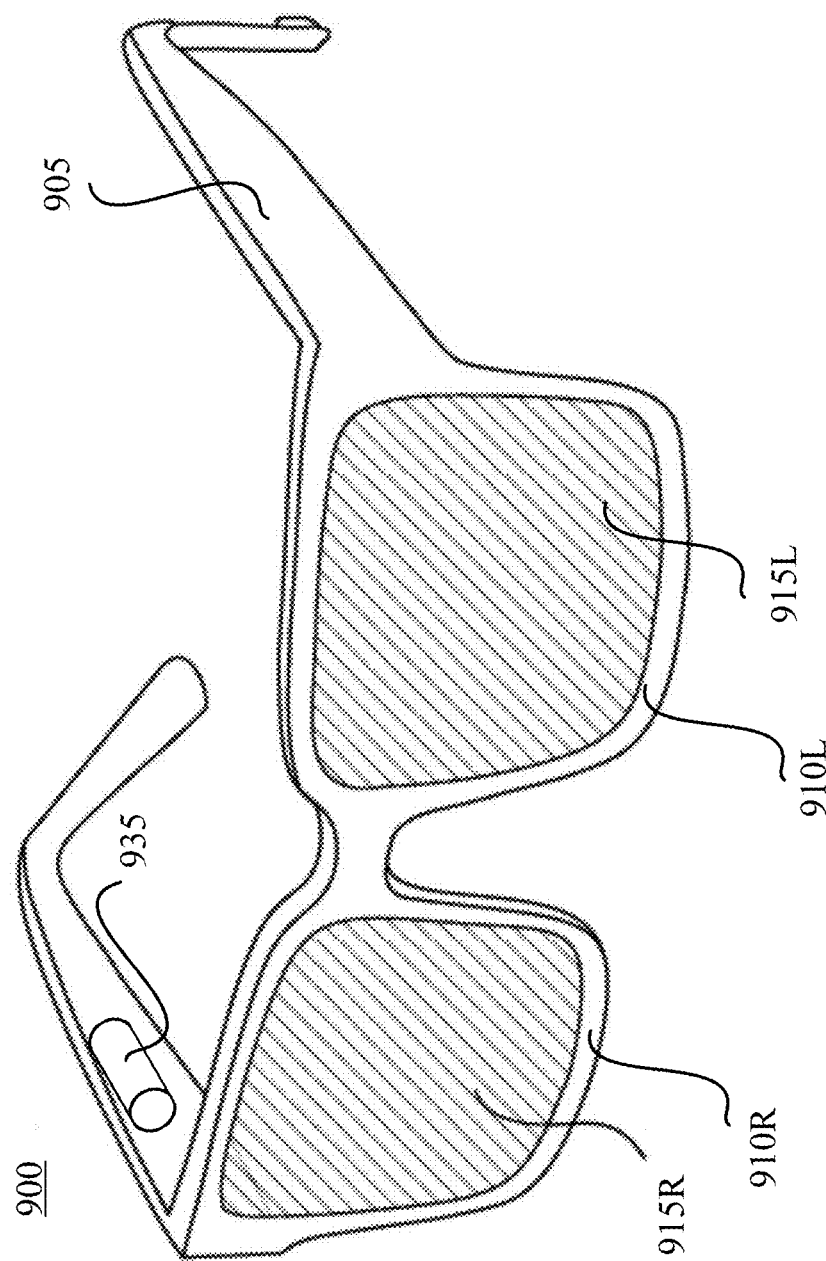
FIG. 9A illustrates a schematic a diagram of a near-eye display ("NED"), according to an embodiment of the present disclosure.
Figure 9B:
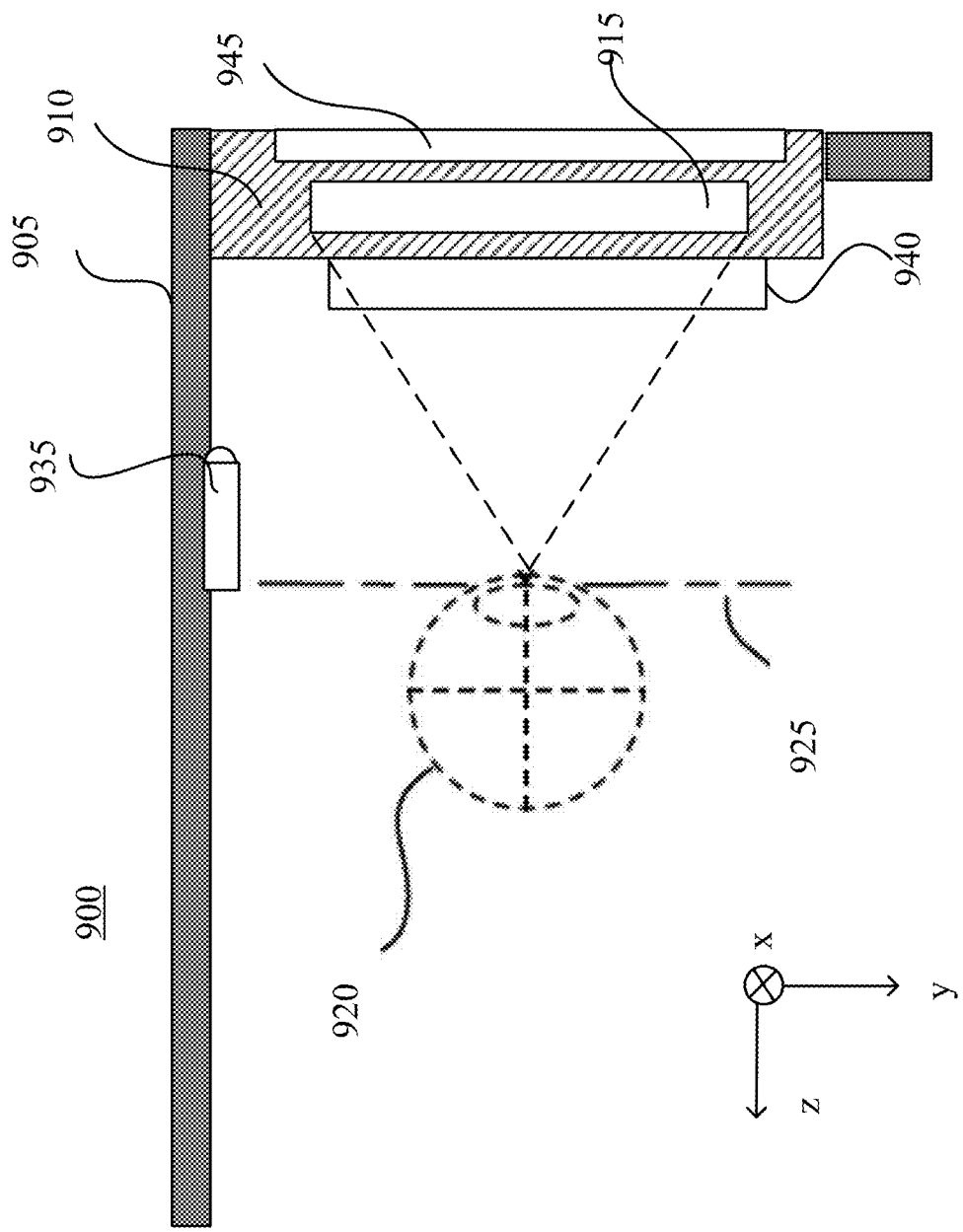
FIG. 9B illustrates a schematic a top, cross-sectional view of a portion of the NED shown in FIG. 9A, according to an embodiment of the present disclosure.

FIG. 9A illustrates a diagram of an NED 900 according to an embodiment of the present disclosure. FIG. 9B illustrates a cross-sectional top view of a half of the NED 900 shown in FIG. 9A according to an embodiment of the present disclosure. The NED 900 may include one or more of the disclosed film stacks. As shown in FIG. 9A, the NED 900 may include a frame 905 configured to be worn by a user. The NED 900 may include a left-eye display system 910L and a right-eye display system 910R, which are mounted to the frame 905. Each of the left-eye display system 910L and the right-eye display system 910R may include one or more image display components configured to project computer-generated virtual images onto a left display window 915L and a right display window 915R in the user's FOV. An example of the left-eye display system 910L and the right-eye display system 910R may include a waveguide display system. For illustrative purposes, FIG. 9A shows that the display system may include a light source assembly 935 coupled to (e.g., mounted on) the frame 905. The NED 900 may function as a VR device, an AR device, an MR device, or a combination thereof. In some embodiments, when the NED 900 functions as an AR and/or an MR device, the right display window 915R and the left display window 915L may be fully or at least partially transparent from the perspective of the user, thereby enabling the user to view a surrounding real world environment. In some embodiments, when the NED 900 functions as a VR device, the right display window 915R and the left display window 915L may be opaque, such that the user may be immersed in the VR imagery provided by the NED 900.

FIG. 9B is a cross-sectional top view of the NED 900 shown in FIG. 9A, according to an embodiment of the present disclosure. As shown in FIG. 9B, a display system 910 (which may represent the right-eye display system 910R or the left-eye display systems 910L) may be a waveguide display system, which may include a waveguide display or a stacked waveguide display for one or more eye 920 of the user. For example, the stacked waveguide display may be a polychromatic display (e.g., a red-green-blue ("RGB") display) including a stack of waveguide displays, the respective monochromatic light sources of which may be configured to emit lights of different colors. In some embodiments, the waveguide display system may include the light source assembly 935 configured to generate an image light, and an output waveguide 915 configured to output an expanded image light to the eye 920 of the user. In some embodiments, the output waveguide 915 may function as a waveguide-based combiner in the NED 900 to overlay the virtual and real world images. The waveguide-based combiner may function as a display window (e.g., the left display window 915L or the right display window 915R). The output waveguide 915 may include one or more in-coupling elements configured to couple a light from the light source assembly into the output waveguide. In some embodiments, the output waveguide 915 may include one or more out-coupling (or decoupling) elements configured to couple the light out of the output waveguide toward the eye 920 of the user. In some embodiments, the output waveguide 915 may include one or more directing elements configured to direct the light output by the one or more coupling elements to the one or more decoupling elements.

In some embodiments, the NED 900 may include a pancake lens assembly 940. The display system 910 and the pancake lens assembly 940 together may provide the image light to an exit pupil 925. The exit pupil 925 may be a location where an eye 920 of the user is positioned. For illustrative purposes, FIG. 9B shows a cross section view associated with a single eye 920. A similar display system, separate from the display system 910, and a similar varifocal/multifocal block, separate from the pancake lens assembly 940, may be included in the other half of the NED 900 (that is not shown) to direct the image light to another eye of the user.

In some embodiments, the NED 900 may include an eye tracking system (not shown). The eye tracking system may include, e.g., one or more light sources configured to illuminate one or both eyes of the user, and one or more cameras configured to capture images of one or both eyes of the user based on the light emitted by the light sources and reflected by the one or both eyes. In some embodiments, the NED 900 may include an adaptive dimming element 945, which may dynamically adjust the transmittance for the real world objects viewed through the NED 900, thereby switching the NED 900 between a VR device and an AR device or between a VR device and an MR device. In some embodiments, along with switching between the AR/MR device and the VR device, the adaptive dimming element 945 may be used in the AR and/MR device to mitigate difference in brightness between real and virtual objects.

In some embodiments, the pancake lens assembly 940 shown in FIG. 9B may include one or more disclosed film stacks. In some embodiments, the display system 910 shown in FIG. 9B may include one or more disclosed film stacks. The above-mentioned applications of the disclosed optical devices in the NEDs are merely for illustrative purposes. In addition, the disclosed optical devices based on solid crystals may also be used to realize eye-tracking components, display resolution enhancement components, and pupil steering elements, etc., which is not limited by the present disclosure. The disclosed optical devices based on solid crystals may be light-weight, thin, compact, and customized. Thus, through using the disclosed optical devices as multi-functional optical components in the NEDs, the weight and size of NEDs may be significantly reduced while the optical performance and appearance may be enhanced, therefore opening up the possibilities to the futuristic smart glasses.

Figure 10:
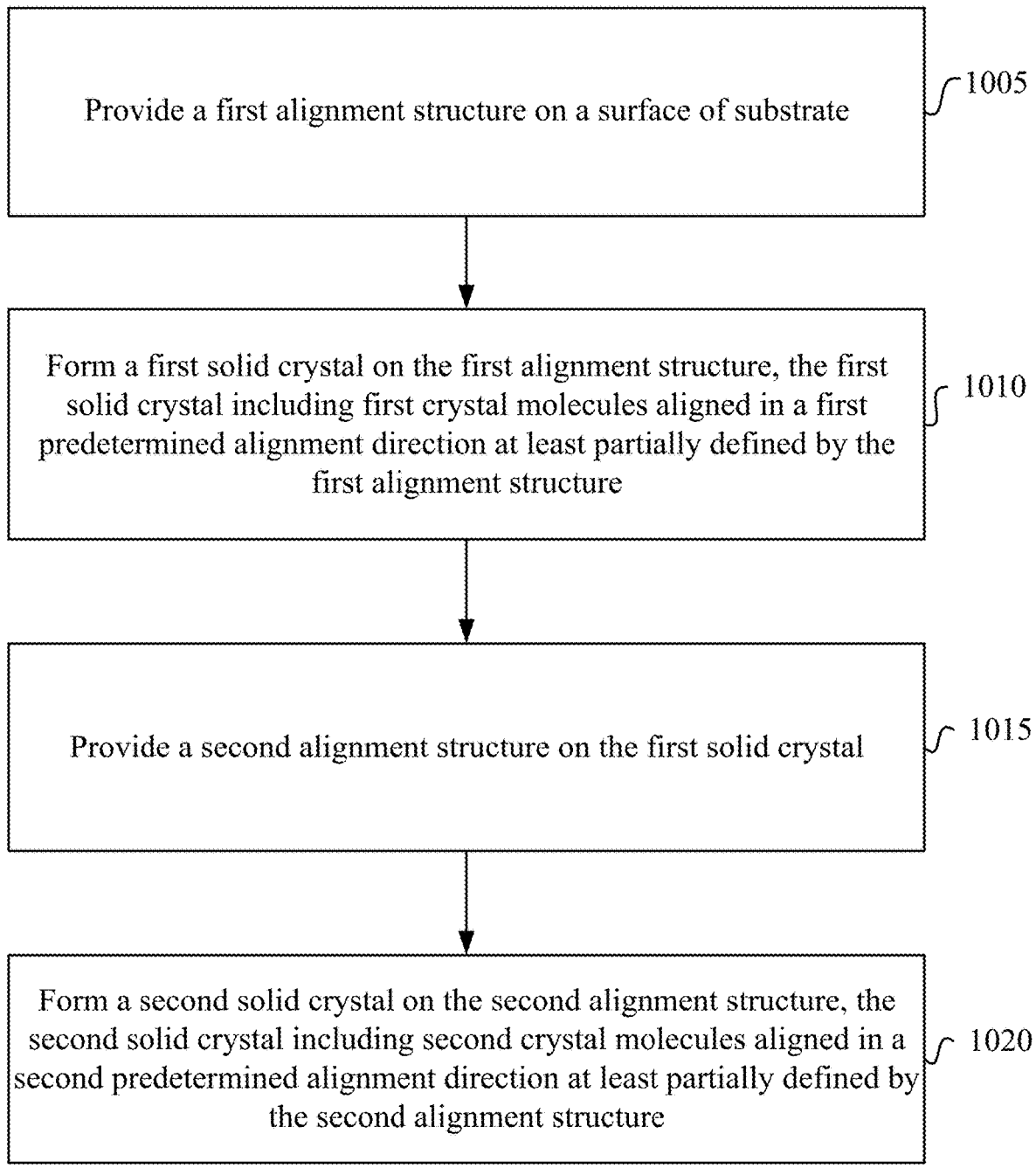
FIG. 10 is a flowchart illustrating a method for fabricating a film stack, according to an embodiment of the present disclosure.

The present disclosure also provides various methods for fabricating the disclosed film stack including solid crystals. For example, FIG. 10 is a flowchart illustrating a method 1000 for fabricating a film stack including alternating first films and second films. The method 100 may include alternatingly forming the first films and second films using any suable processes. In some embodiments, the first films may include alignment structures and the second films may include solid crystals. The first films may be the same or may be different (e.g., having different thicknesses, materials, optical properties, etc.). The second films may be the same or may be different (e.g., having different thicknesses, materials, optical properties, etc.). The method 1000 may include alternatingly forming the alignment structures and solid crystals on respective alignment structures using any suable processes. The steps of forming the alignment structures and forming the solid crystals on the alignment structures may be alternately repeated to achieve a predetermined number of film sets. In some embodiments, the method 1000 may also include, after the second film is formed on the first film, forming a third film on the second film. The method 1000 may include alternatingly forming the first films, the second films, and the third films. In some embodiments, the first film may include an alignment structure, the second film may include a solid crystal, and the third film may include an isotropic polymer. The steps of forming the alignment structures, forming the solid crystals, and forming the isotropic polymers may be alternately repeated to achieve a predetermined number of film sets.

In some embodiments, as shown in FIG. 10, the method 1000 may include providing a first alignment structure on a surface of a substrate (step 1005). Various methods may be used to provide the first alignment structure. In some embodiments, the first alignment structure may be formed (e.g., deposited, coated) as a separate element on a surface of the substrate. In some embodiments, the first alignment structure may be integrally formed on or at least partially in the surface of the substrate through a suitable process (e.g., etching). In some embodiments, the first alignment structure may be provided without using the substrate. For example, the first alignment structure may be a pre-fabricated structure. The first alignment structure may include or define an alignment structure pattern.

In some embodiments, providing the first alignment structure may include at least one of: forming a photoalignment layer on the surface of the substrate by processing a photosensitive material by a light; forming a mechanically rubbed alignment layer on the surface of the substrate; forming an alignment layer with anisotropic nanoimprint on the surface of the substrate; forming an anisotropic relief directly on the surface of the substrate through wet or dry etching of the surface of the substrate; forming the first alignment structure on the surface of the substrate based on a ferroelectric or ferromagnetic material deposited on the surface of the substrate; providing a crystalline layer or a crystalline substrate that defines an alignment pattern as the first alignment structure; or forming the first alignment structure on the surface of the substrate by crystallization in the presence of a magnetic or electric field.

In some embodiments, forming a photoalignment layer on the surface of the substrate by processing a photosensitive material by a light may include: coating a layer of a photoalignment material including polymeric molecules or small molecules, and exposing the layer of the photoalignment material to a polarized light irradiation (e.g., a linearly polarized light with a spatially uniform polarization direction) for inducing molecular orientations (e.g., spatially uniform molecular orientations). In some embodiments, forming the layer of the photoalignment material may include reactive particle deposition, wet growth (such as spin coating, deep coating), inkjet printing, or dry deposition (such as sputtering, ion bombardment). In some embodiments, providing the first alignment structure may include coating a polymer film, annealing the polymer film, and rubbing the polymer film unidirectionally. In some embodiments, the step of annealing the polymer film may be omitted. In some embodiments, providing the first alignment structure may include forming an amorphous or crystalline organic polymer alignment film from a solution via at least one of spin coating, blade coating, slot-die coating, dip coating, spray coating, or printing from gaseous phase via a vapor phase deposition (e.g., physical or chemical vapor deposition). In some embodiments, providing the first alignment structure may include dispensing a crystalline polymer via a vapor phase deposition, and annealing the crystalline polymer at a temperature above the glass transition temperature. In some embodiments, providing the first alignment structure may include forming an inorganic alignment layer by physical or chemical vapor deposition in oblique geometry.

The method 1000 may also include forming a first solid crystal on the first alignment structure, the first solid crystal including first crystal molecules aligned in a first predetermined alignment pattern at least partially defined by the first alignment structure (step 1010). In some embodiments, the first predetermined alignment pattern may be a spatially uniform alignment pattern. Various methods may be used to form the first solid crystal (or first solid crystal film, layer, or plate) on the first alignment structure. In some embodiments, forming the first solid crystal (or solid crystal layer) on the first alignment structure may include one of physical vapor deposition, blade coating, slot-die coating, or ink-jet coating.

For example, in some embodiments, the first solid crystal may be grown on the first alignment structure based on a molten first solid crystal material. Thus, forming the first solid crystal on the first alignment structure may include growing the first solid crystal on the first alignment structure. In some embodiments, forming the first solid crystal on the first alignment structure is performed using at least one of the following processes: a vapor deposition including at least one of an organic crystal molecule beam epitaxy, or a hot wall epitaxy of organic crystal molecules; a solvent assisted deposition via a thermal alignment, a mold alignment, or a surface alignment; a polymer assisted continuous casting; a temperature assisted zone annealing; a physical vapor transport (may also be referred to as physical vapor deposition); a spin coating; or a crystal growth process based on a molten crystal material. In some embodiments, when forming the first solid crystal on the first alignment structure by the solvent assisted deposition, a solvent used in the solvent assisted deposition may maintain the alignment structure, and may not dissolve or swell the alignment structure. For example, solvents such as propylene glycol monomethyl ether acetate ("PGMEA"), methyl ethyl ketone ("MEK") may dissolve or swell the alignment structure and, thus, may not be used in the solvent assisted deposition. In some embodiments, when forming the first solid crystal on the first alignment structure by the temperature assisted zone annealing, a desirable temperature gradient may be configured to accommodate crystallization rate, e.g., through controlling an annealing speed and/or a difference between high and low temperatures.

The method 1000 may also include forming a second alignment structure on the first solid crystal (step 1015). In some embodiments, the step 1015 may be similar to the step 1005. The method 1000 may also include forming a second solid crystal on the second alignment structure, the second solid crystal including second crystal molecules aligned in a second predetermined alignment pattern at least partially defined by the second alignment structure (step 1020). In some embodiments, the second predetermined alignment pattern may be a spatially uniform alignment pattern different from or substantially the same as the first predetermined alignment pattern. In some embodiments, the step 1020 may be similar to the step 1010. The steps of forming the alignment structures and forming the solid crystals may be alternately repeated to achieve a predetermined number of film sets. In some embodiments, the method 1000 may include post-processing the solid crystal, such as thermal annealing or zone annealing, form improving crystallinity in the solid crystal.

In some embodiment, the step 1015 may be omitted. In some embodiments, the method 1000 may include other processes not shown in FIG. 10. For example, in some embodiments, the method 1000 may also include, after the second film (e.g., a solid crystal) is formed on the first film (e.g., an alignment structure), forming a third film on the second film. In some embodiments, the third film may include an anisotropic organic solid crystalline material (e.g., an anisotropic organic solid crystal), an anisotropic polymer (e.g., an anisotropic crystalline polymer), an anisotropic inorganic crystalline material (e.g., an anisotropic inorganic crystal), or an isotropic material (e.g., an isotropic polymer or an isotropic inorganic crystal). The steps of forming the first films, forming the second films, and forming the third films may be alternately repeated to achieve a predetermined number of film sets. In some embodiments, the method 1000 may include post-processing the solid crystal, such as thermal annealing or zone annealing, form improving crystallinity in the solid crystal.

Figure 11A:
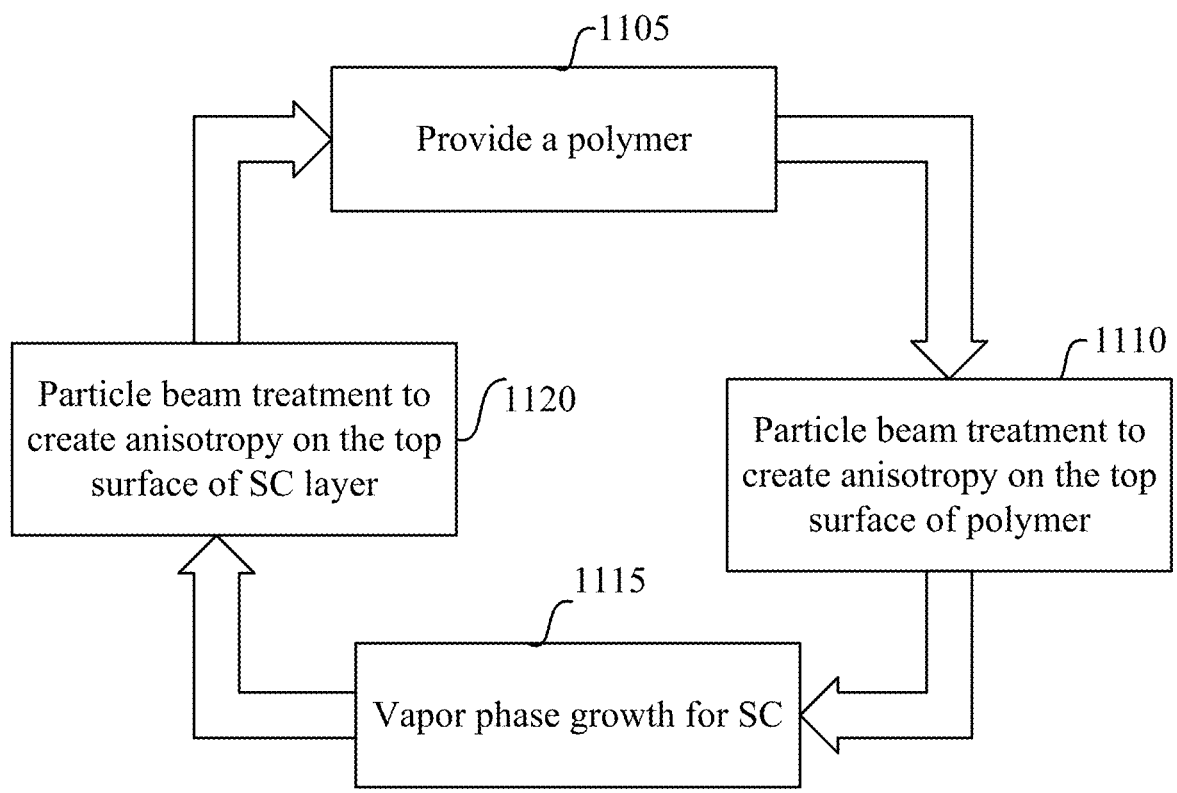
FIG. 11A illustrates processes for fabricating a film stack, according to an embodiment of the present disclosure.
Figure 11B:
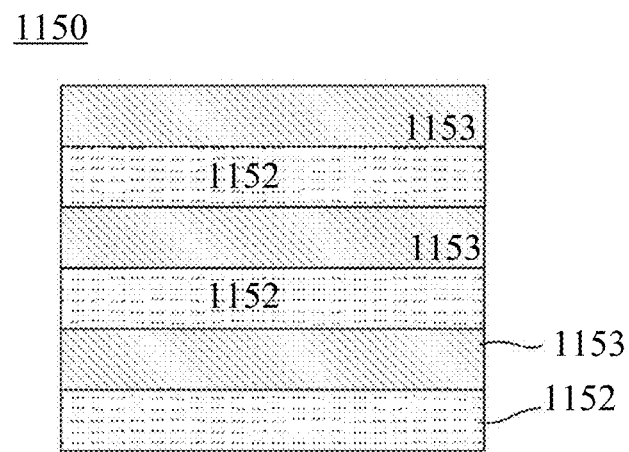
FIG. 11B illustrates a film stack fabricated based on the processes shown in FIG. 11A, according to an embodiment of the present disclosure.

FIG. 11A illustrates processes for fabricating a film stack (e.g., a thin-film stack), according to an embodiment of the present disclosure. FIG. 11B illustrates a film stack 1150 (e.g., a thin-film stack 1150) fabricated based on the processes shown in FIG. 11A, according to an embodiment of the present disclosure. The film stack 1150 fabricated based on the processes shown in FIG. 11A may include structures or elements that are the same as or similar to those included in the film stack shown in FIGS. 1A-6C (e.g., the film stack 100 shown in FIG. 1A). Descriptions of the same or similar structures or elements included in the film stack 1150 can refer to the above descriptions (including, e.g., those rendered in connection with the embodiment shown in FIG. 1A).

As shown in FIGS. 11A and 11B, the processes for fabricating the film stack 1150 may include a first process 1105 of providing a polymer 1152 (e.g., on a surface of substrate). The polymer 1152 may be an optically isotropic polymer or an optically anisotropic polymer. The processes may also include a second process 1110 of introducing a first anisotropy (e.g., forming first anisotropic structures) on a surface (e.g., a top surface) of the polymer 1152 via a particle beam treatment. The particle beam treatment may modify a surface of an isotropic material to be anisotropic or further enhance the anisotropy of the surface of an anisotropic material. For example, the particle beam treatment may bombard the surface of the material with ions at an angle, creating a surface morphology that is anisotropic. Thus, the surface of the material itself may function as an alignment structure for another film that is disposed thereon. In other words, the surface of the polymer 1152 may function as an alignment structure for another film that is disposed thereon.

The processes may also include a third process 1115 of forming a solid crystal 1153 on the surface (e.g., the top surface) of the polymer 1152 via a vapor phase growth. The surface of the polymer 1152 may function as an alignment structure for the solid crystal 1153. The processes may also include a fourth process 1020 of introducing a second anisotropy (e.g., forming second anisotropic structures) on a surface (e.g., a top surface) of the solid crystal 1153 via a particle beam treatment. The particle beam treatment may modify a surface of the solid crystal 1153 to be anisotropic. In some embodiments, the first process 1105, the second process 1110, the third process 1115, and the fourth process 1020 may be alternately repeated to achieve a predetermined number of film sets. In some embodiments, one of the first process 1105, the second process 1110, the third process 1115, and the fourth process 1020 may be omitted or may not be repeated. For example, when the polymer 1152 is an optically anisotropic polymer in which the bulk anisotropy of the polymer 1152 may provide a sufficient alignment to the solid crystal 1153 to support the growth of the solid crystal, the second process 1110 may be omitted. In the embodiment shown in FIG. 11A, the processes for fabricating the film stack 1150 may not include providing an additional alignment layer (e.g., a PAM layer, a mechanically rubbing layer). Instead, the alignment structure may be directly formed by introducing an anisotropy on the top of the surface of the polymer 1152.

In some embodiments, the polymer 1152 may be an optically isotropic polymer. Various methods may be used to form an optically isotropic polymer on the substrate or the solid crystal 1153. In some embodiments, forming the optically isotropic polymer on the substrate or solid crystal may include forming a composition layer including monomers and an initiator on the substrate or the solid crystal, and polymerizing the composition layer. In some embodiments, forming the composition layer including the monomers and the initiator on the substrate or the solid crystal may include coating (e.g., spin coating, blade coating, spray coating, or inkjet printing coating), chemical vapor deposition ("CVD"), plasma chemical vapor deposition ("PCVD), or initiated chemical vapor deposition ("iCVD"), or any combination thereof. In some embodiments, forming the isotropic polymer on the substrate or the solid crystal may include dispensing a solution including a polymer and a solvent on the substrate or the solid crystal to form a solution layer, and evaporating the solvent from the solution layer. In some embodiments, forming the isotropic polymer on the substrate or the solid crystal may include dipping the substrate or the solid crystal in a polymer solution. In some embodiments, forming the isotropic polymer on the substrate or the solid crystal may include laminating the isotropic polymer on the substrate or the solid crystal.

In some embodiments, the polymer 1152 may be an optically anisotropic polymer. Various methods may be used to form an optically anisotropic polymer on the substrate or the solid crystal 1153, such as vapor phase deposition an anisotropic polymer on the substrate or the solid crystal with a subsequent annealing above a glass transition temperature.

Figure 11D:
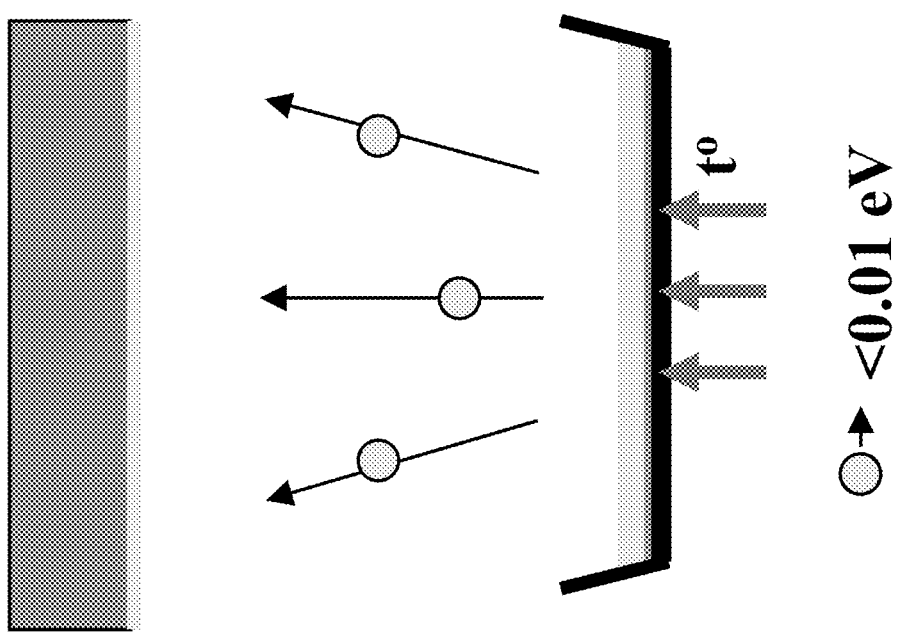
FIGS. 11C-11F illustrate particle beam treatments for introducing an anisotropy on a top surface in the processes shown in FIG. 11A, according to various embodiments of the present disclosure.
Figure 11C:
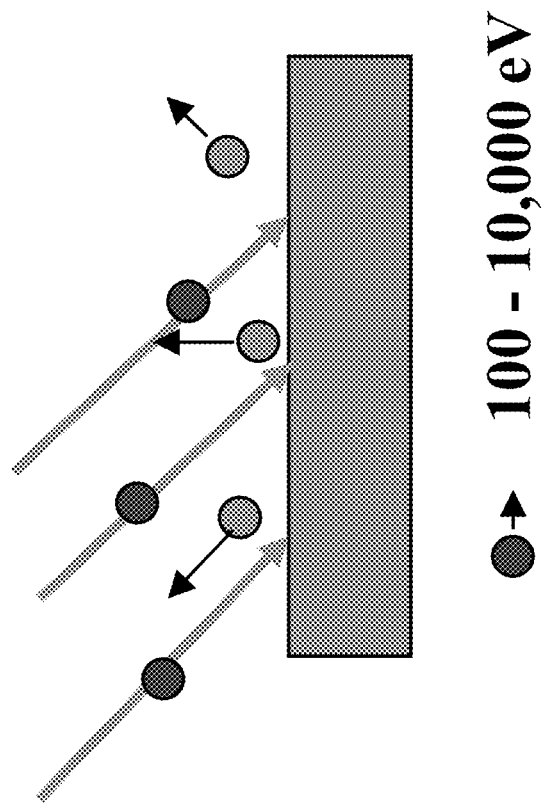
Figure 11F:
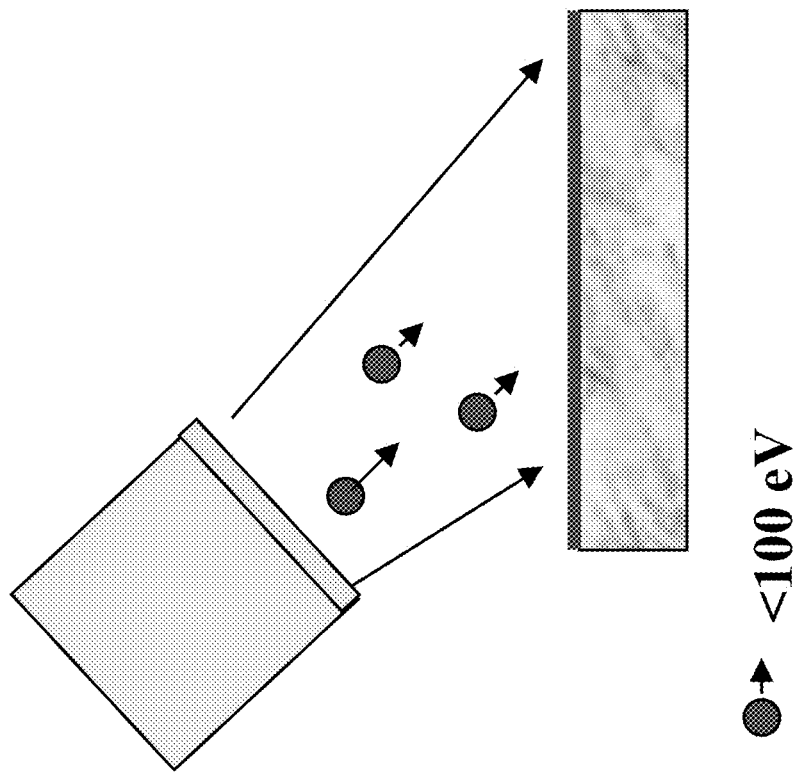
Figure 11E:
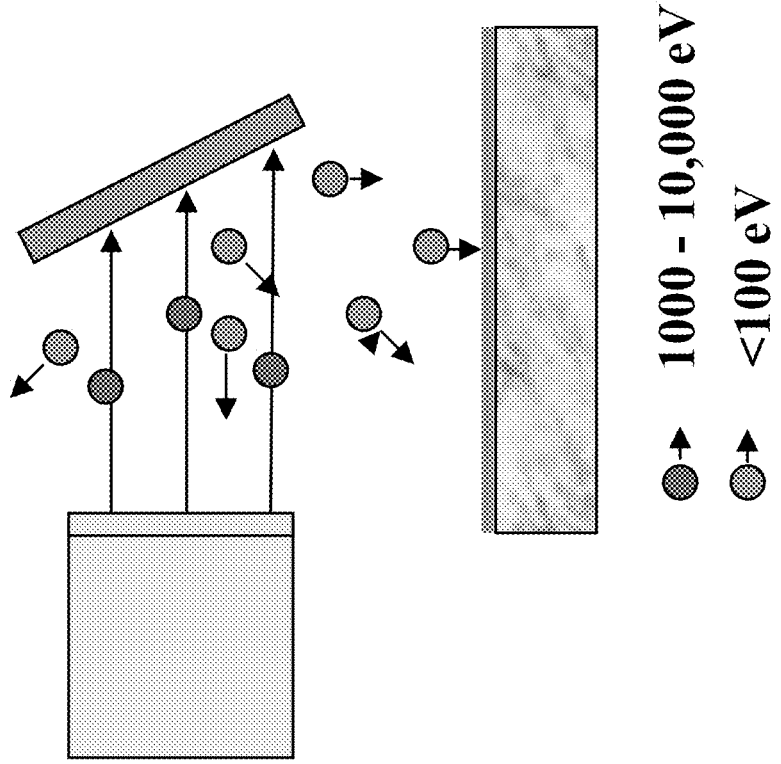

FIGS. 11C-11F illustrate particle beam treatments for introducing an anisotropy on a top surface in the processes shown in FIG. 11A, according to various embodiments of the present disclosure. For illustrative purposes, FIGS. 11C-11F illustrate particle beam treatments for introducing an anisotropy on the top surface of the polymer 1152. The introduced anisotropy on the top surface of the polymer 1152 may function as an alignment layer. FIG. 11C illustrates an etching (or a milling) process for introducing an anisotropy on the top surface of the polymer 1152. FIG. 11D illustrates a vapor deposition process for introducing an anisotropy on the top surface of the polymer 1152. FIG. 11E illustrates a sputtering deposition process for introducing an anisotropy on the top surface of the polymer 1152. FIG. 11F illustrates a direct deposition process for introducing an anisotropy on the top surface of the polymer 1152.

Figure 12A:
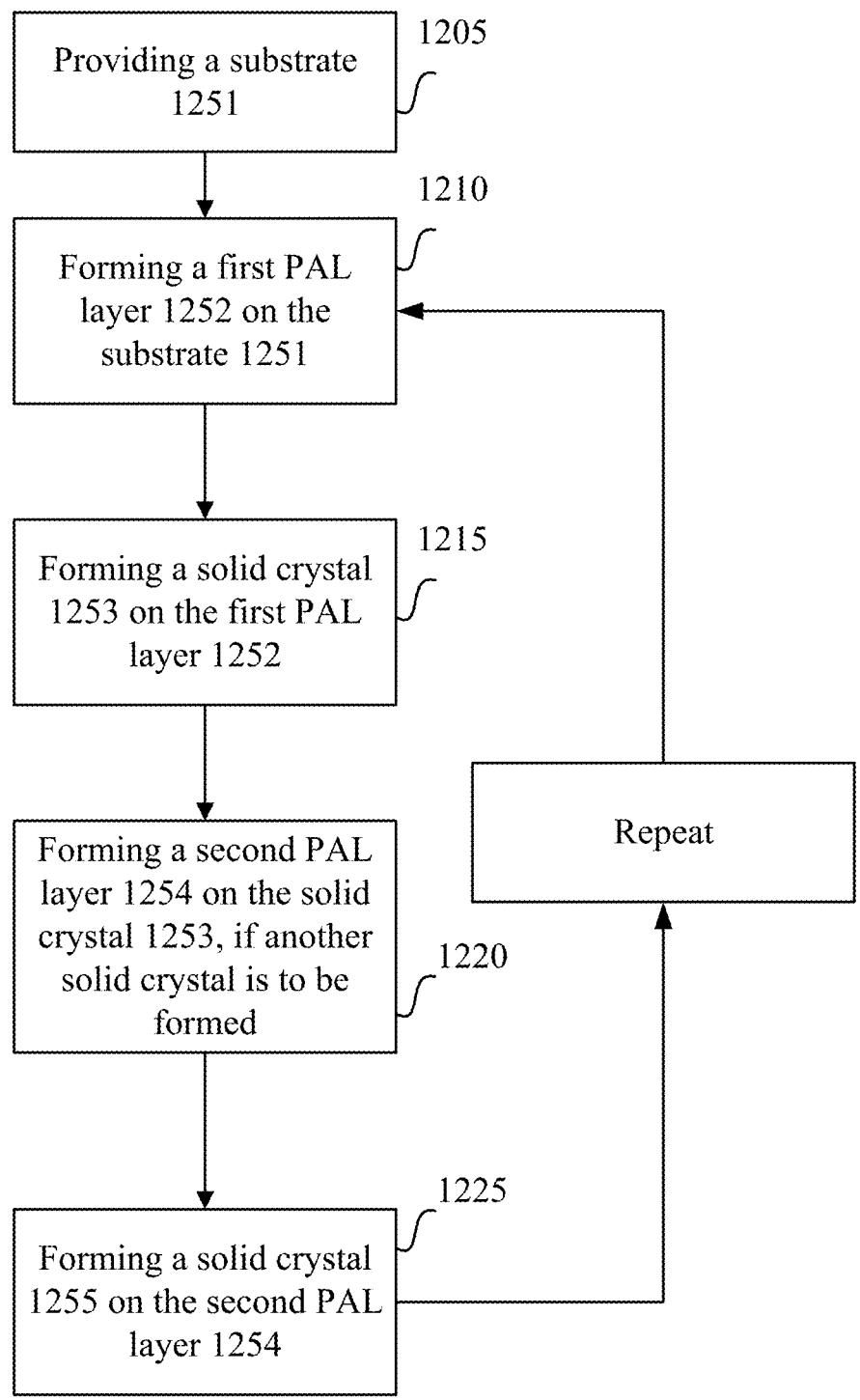
FIG. 12A illustrates processes for fabricating a film stack, according to an embodiment of the present disclosure.
Figure 12B:
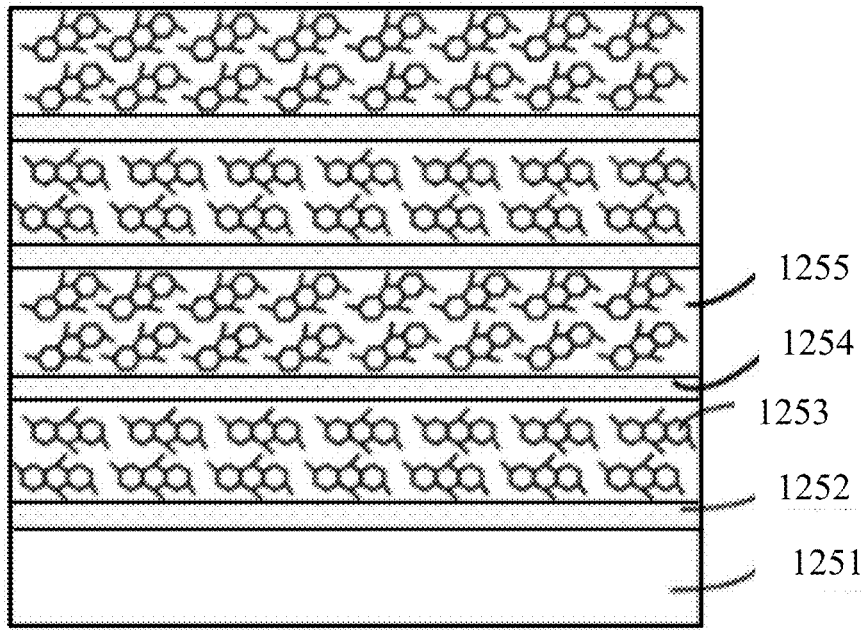
FIG. 12B illustrates a film stack fabricated based on the processes shown in FIG. 12A, according to an embodiment of the present disclosure.
Figure 12C:
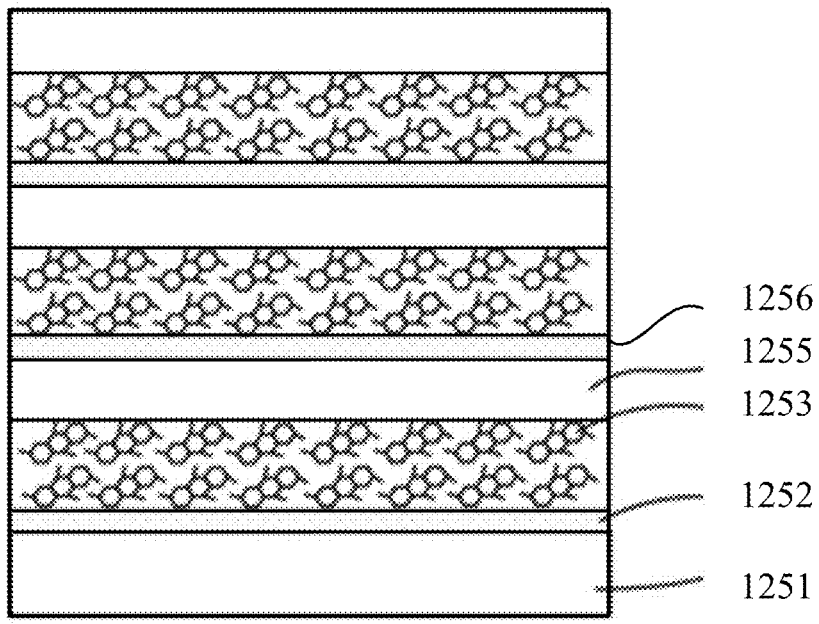
FIG. 12C illustrates a film stack fabricated based on the processes shown in FIG. 12A, according to another embodiment of the present disclosure.

FIG. 12A illustrates processes for fabricating a film stack (e.g., a thin-film stack), according to an embodiment of the present disclosure. FIG. 12B illustrates a film stack 1250 (e.g, a thin-film stack 1250) fabricated based on the processes shown in FIG. 12A, according to an embodiment of the present disclosure. FIG. 12C illustrates a film stack 1280 (e.g., a thin-film stack 1280) fabricated based on the processes shown in FIG. 12A, according to another embodiment of the present disclosure. The film stack 1250 fabricated based on the processes shown in FIG. 12A may include structures or elements that are the same as or similar to those included in the film stack shown in FIGS. 1A-6C (e.g., the film stack 260 shown in FIG. 2D, or the film stack 280 shown in FIG. 2E, the film stack 600 shown in FIG. 6A). Descriptions of the same or similar structures or elements included in the film stack 1250 can refer to the above descriptions (including, e.g., those rendered in connection with the embodiment shown in FIG. 2D, FIG. 2E, or FIG. 6A).

As shown in FIGS. 12A and 12B, the processes may include a step 1205 of providing a substrate 1251. The processes may also include a step 1210 of forming a first photoalignment ("PAL") layer 1252 on the substrate 1251 via wet deposition or vapor growth ("VP growth"). The processes may also include a step 1215 of forming a solid crystal ("SC") or solid crystal layer ("SC layer") 1253 on the first PAL layer 1252 via a vapor phase growth. The processes may also include an optional step 1220 of forming a second PAL layer 1254 on the solid crystal 1253 via a vapor phase growth, if another solid crystal is to be formed on the second PAL layer 1254. In some embodiments, the processes may also include of an optional step 1225 of forming a solid crystal 1255 on the second PAL layer 1254. If additional SC layers are needed, the steps 1210 to step 1225 may be repeated. Depending on the number of SC layers, the step 1220 may not be performed. In some embodiments, the solid crystal 1215 and 1225 may have a substantially same alignment. In some embodiments, the solid crystal 1215 and 1225 may have different alignments.

As shown in FIGS. 12A and 12C, after forming a solid crystal ("SC") or solid crystal layer ("SC layer") 1253 on the first PAL layer 1252 via a vapor phase growth in the third process 1215, a polymer 1255 may be formed on the solid crystal layer 1253 via a vapor phase growth in the process 1225. The polymer 1255 may be an isotopic polymer or an anisotropic polymer. Then a second PAL layer 1256 may be formed on the on the polymer 1255 via a vapor phase growth. In some embodiments, the steps may be alternately repeated for achieving a predetermined number of film sets. The polymer 1255 that is an isotopic or anisotropic polymer may be formed on the solid crystal layer via various methods disclosed herein.

Figures 13A, 13B:
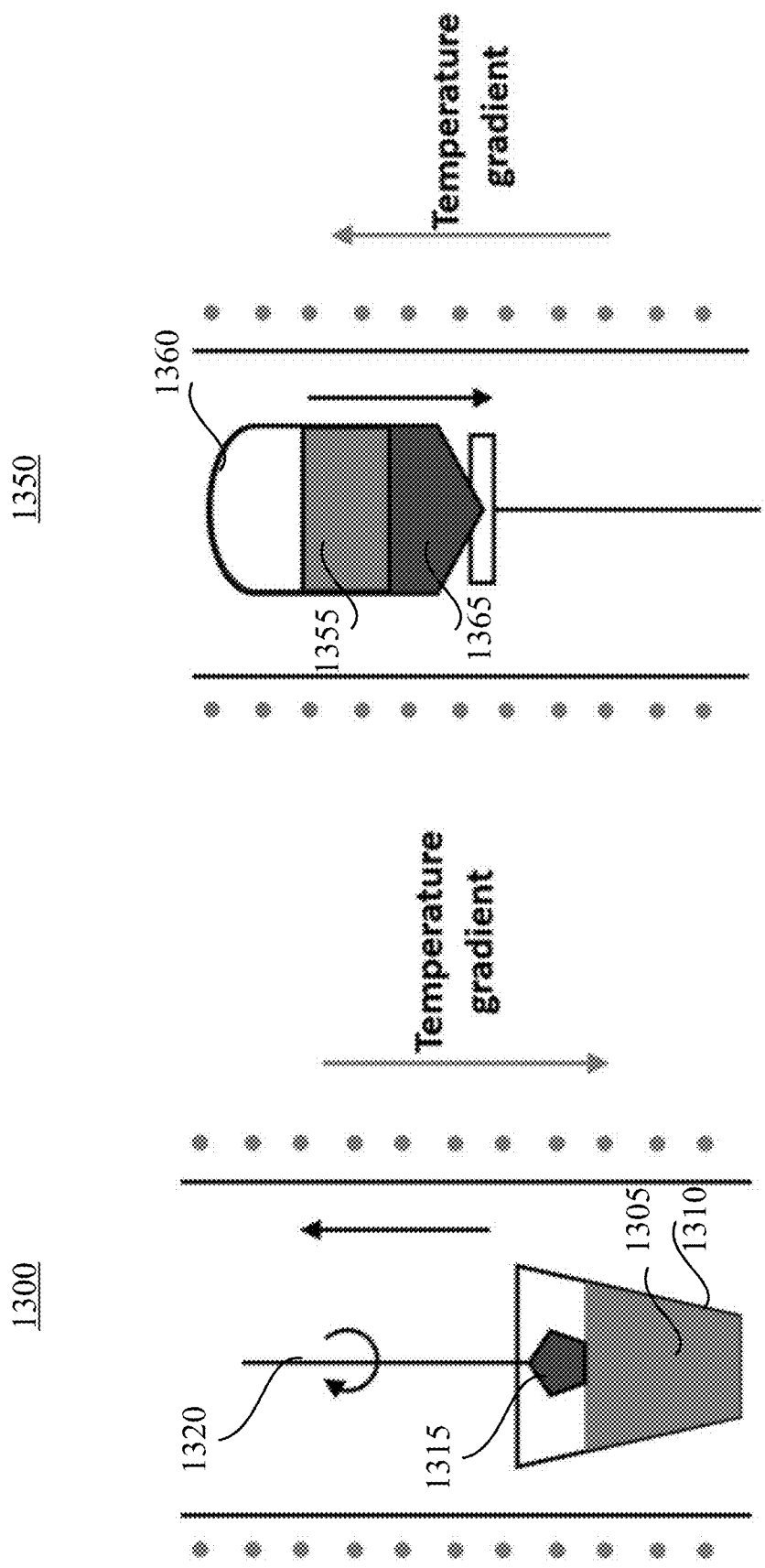
FIGS. 13A and 13B illustrate schematic diagrams of systems for fabricating solid crystal layers, according to various embodiments of the present disclosure.

FIG. 13A schematically illustrates a system 1300 for fabricating a solid crystal layer, according to an embodiment of the present disclosure. As shown in FIG. 13A, a molten crystal material 1305 (e.g., organic crystal material) may be disposed in a crucible 1310. A rod-mounted seed crystal 1315 oriented at a high precision may be dipped into the molten crystal material 1305. A rod 1320 of the seed crystal 1315 may be slowly pulled upwards and rotated simultaneously. By controlling the temperature gradients, rate of pulling, and/or speed of rotation at a high precision, a solid crystal layer may ingot from the molten crystal material 1305. Such process of fabricating a solid crystal layer may be performed in an inert atmosphere, such as argon, in an inert chamber, such as quartz.

FIG. 13B schematically illustrates a system 1350 for fabricating a solid crystal layer, according to another embodiment of the present disclosure. As shown in FIG. 13B, a molten crystal material 1355 (e.g., an organic crystal material) may be disposed in a crucible 1360. The molten crystal material 1355 may be slowly cooled from one end of the crucible 1360, where a seed crystal 1365 is placed. The molten crystal material 1355 may be translated along the axis of a temperature gradient in the crucible 1360. A single crystal of the same crystallographic orientation as the seed crystal 1365 may be grown on the seed crystal 1365, and may be progressively formed along the length of the crucible 1360.

Figure 14A:
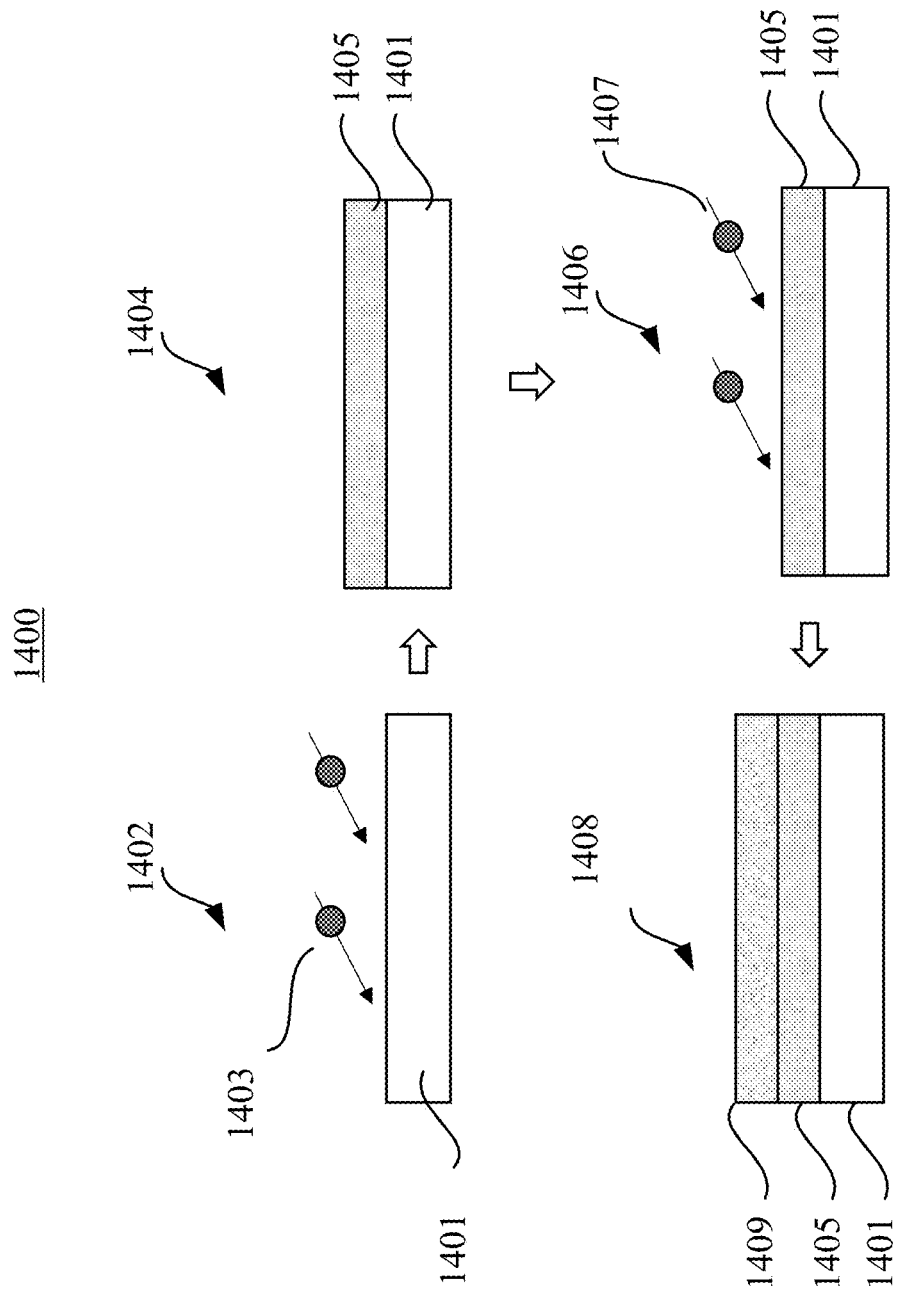
FIGS. 14A-14D illustrate processes for fabricating film stacks, according to various embodiments of the present disclosure.

FIGS. 14A-14D illustrate processes for fabricating film stacks (e.g., thin-film stacks), according to various embodiments of the present disclosure. As shown in FIG. 14A, a process or method 1400 for fabricating a film stack may include a step 1402 of obliquely bombarding a surface (e.g., a top surface) of a substrate 1401 with a particle beam 1403, to generate a surface anisotropy of the substrate 1401. The surface anisotropy generated on the surface (e.g., the top surface) of the substrate 1401 may function as alignment structures for aligning molecules in a solid crystal or a liquid crystal. The process 1400 for fabricating a film stack may include a step 1404 of dispensing (e.g., depositing, coating) a first material on the obliquely bombarded surface (e.g., the top surface) of the substrate 1401 to form a first film 1405. In some embodiments, the first film 1405 may be an optically anisotropic film. In some embodiments, the generated surface anisotropy of the substrate 1401 may function as alignment structures for aligning molecules of the first material in a first predetermined alignment pattern, e.g., aligning the molecules spatially uniformly in a first predetermined direction. In some embodiments, the step 1404 may also include annealing the first film 1405 for evaporating a solvent, polymerizing, and/or improving crystallinity in the first film 1405.

The processes for fabricating a film stack may include a step 1406 of obliquely bombarding a surface (e.g., a top surface) of the first film 1405 with a particle beam 1407, to generate a surface anisotropy. The generated surface anisotropy of the first film 1405 may function as alignment structures for aligning molecules in a solid crystal or a liquid crystal formed thereon. The process 1400 for fabricating a film stack may include a step 1408 of dispensing (e.g., depositing, coating) a second material on the obliquely bombarded surface (e.g., the top surface) of the first film 1405 to form a second film 1409. In some embodiments, the second film 1409 may be an optically anisotropic film. The generated surface anisotropy of the first film 1405 may function as alignment structures for aligning molecules in the second material in a second predetermined alignment pattern, e.g., aligning the molecules spatially uniformly in a second predetermined direction. In some embodiments, the process 1408 may also include annealing the second film 1409 for evaporating a solvent, polymerizing, and/or improving crystallinity in the second film 1409. At least one of the first material or the second material may include an organic solid crystal material, and at least one of the first film 1405 or the second film 1409 may be an organic solid crystal layer.

In some embodiments, the process 1400 for fabricating a film stack may further include a step of obliquely bombarding a surface (e.g., a top surface) of the second film 1409 with a particle beam to generate a surface anisotropy, and a step of dispensing (e.g., depositing, coating) a first material on the obliquely bombarded surface (e.g., the top surface) of the second film 1409 to form another first film 1405. The processes of forming first films 1405 and second films 1409 may be alternately repeated for achieving a predetermined number of films.

In some embodiments, one of the first material and the second material may be an optically isotropic material and, accordingly, one of the first film 1405 and the second film 1409 may be an optically isotropic film. Thus, the step of obliquely bombarding a surface of a previous film/substrate on which the one of the first film 1405 and the second film 1409 is formed may be omitted and not repeated. For example, when the second film 1409 is an optically isotropic film, the step of obliquely bombarding a surface of the first film 1405 on which the second film 1409 is formed may be omitted and not repeated. For example, when the first film 1405 is an optically isotropic film, the step of obliquely bombarding a surface of the substrate 1401 and the second film 1409 on which the first films 1405 are formed may be omitted and not repeated.

In the embodiment shown in FIG. 14A, a particle beam (e.g., an ion beam or a plasma beam) may anisotropically etch a surface layer of the film (i.e., the ions may not penetrate inside the film). Instead of coating an alignment film, a surface of a preceding film may be modified for providing an alignment to a subsequent film formed on the preceding film. Thus, additional alignment layers may be omitted.

Figure 14B:
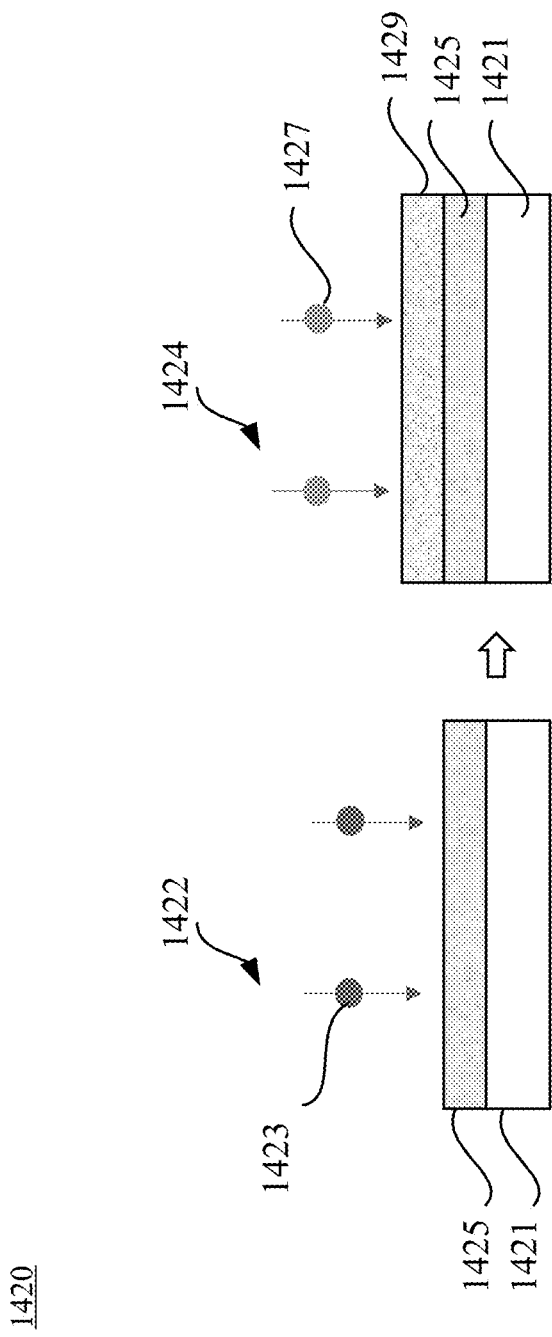

As shown in FIG. 14B, a process or method 1420 for fabricating a film stack may include a step 1422 of dispensing (e.g., depositing, coating) a first material on a surface (e.g., a top surface) of a substrate 1421 (e.g., a wafer) to form a first film 1425. In some embodiments, the surface (e.g., a top surface) of a substrate 1421 (e.g., a wafer) may have been processed for growing a crystal film. In some embodiments, the first film 1425 may be an organic solid crystal film, which may be deposited on the substrate 1421 by a suitable vapor deposition technique, e.g., molecular beam epitaxy 1423. A chamber used for molecular beam epitaxy may include a number of effusion cells with different materials, such that the compositions (e.g., ingredients and/or concentrations of ingredients) of the organic solid crystal film may be changed. The process 1420 for fabricating a film stack may include a step 1424 of dispensing (e.g., depositing, coating) a second material on a surface (e.g., a top surface) of the first film 1425 to form a second film 1429. In some embodiments, the second film 1429 may be an organic solid crystal film, which may be deposited by a suitable vapor deposition technique, e.g., molecular beam epitaxy 1427. In some embodiments, the second film 1429 may be deposited in the same chamber by changing ratios of materials in the particle beam. Accordingly, the ratios of the materials in the deposited second film 1429 may be changed. In some embodiments, one of the first film 1425 and the second film 1429 may not be an organic solid crystal film. The steps of forming the first film 1405 and second film 1409 may be alternately repeated for achieving a predetermined number of films.

Figure 14C:
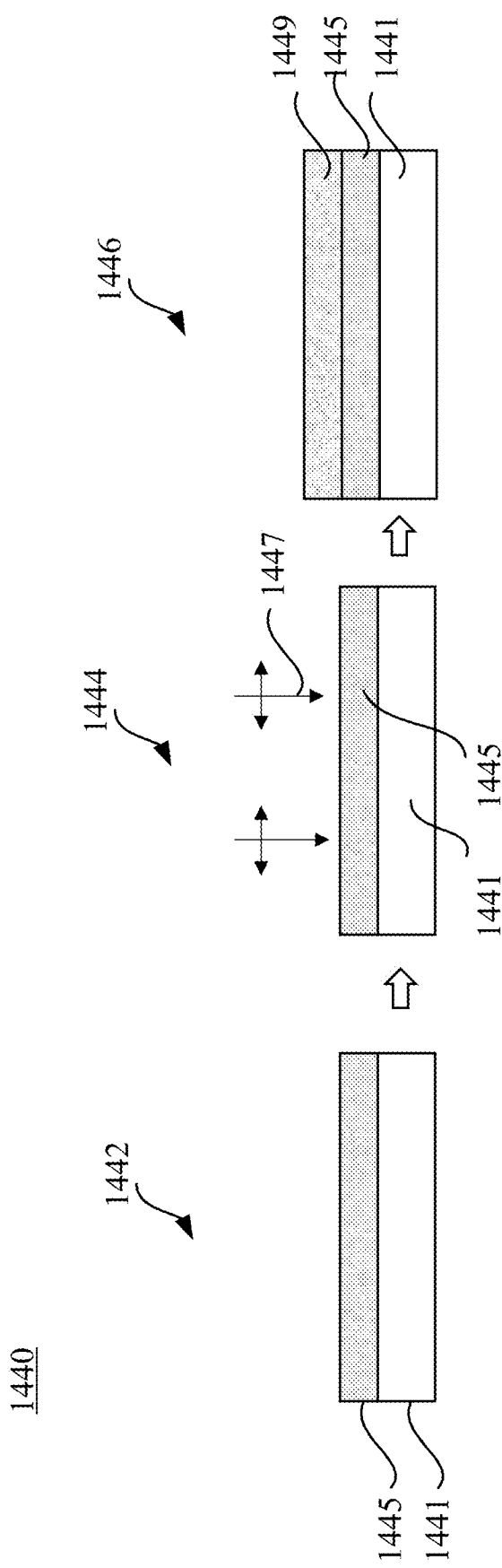

As shown in FIG. 14C, a process or method 1440 for fabricating a film stack may include a step 1442 of dispensing (e.g., depositing, coating) a first material on a surface (e.g., a top surface) of a substrate 1441 to form a first film 1445. In some embodiments, the first material may include a photoalignment material, and the first film 1445 may be a photoalignment layer. In some embodiments, the step 1442 may also include annealing the first film 1445. In some embodiments, the process 1440 for fabricating a film stack may include a step 1444 of exposing the first film 1445 under a polarized light irradiation for introducing a predetermined alignment direction. For example, the first film 1445 may be exposed to a linearly polarized light 1447 having a horizontal polarization direction as shown in in FIG. 14C. After a sufficient exposure, the first film 1445 may be configured to provide a horizontal alignment direction. That is, the exposed first film 1445 may function as a photoalignment layer for a solid crystal that is to be disposed on the photoalignment layer in subsequent processes. In addition, the exposed first film 1445 may also be an optically anisotropic film. The process 1440 for fabricating a film stack may include a step 1446 of dispensing (e.g., depositing, coating) a second material on a surface (e.g., a top surface) of the first film 1445 to form a second film 1449. In some embodiments, the second material may include an organic solid crystal material, and the second film 1449 may be an organic solid crystal film. Crystal molecules in the second film 1449 may be aligned by the exposed first film 1445 in the predetermined alignment direction, e.g., the horizontal direction shown in FIG. 14C. In some embodiments, the step 1446 may also include annealing the second film 1449. In some embodiments, the steps of forming the first film 1445, exposing the first film 1445, and forming the second film 1449 on the first film 1445 may be alternately repeated for achieving a predetermined number of films.

Figure 14D:
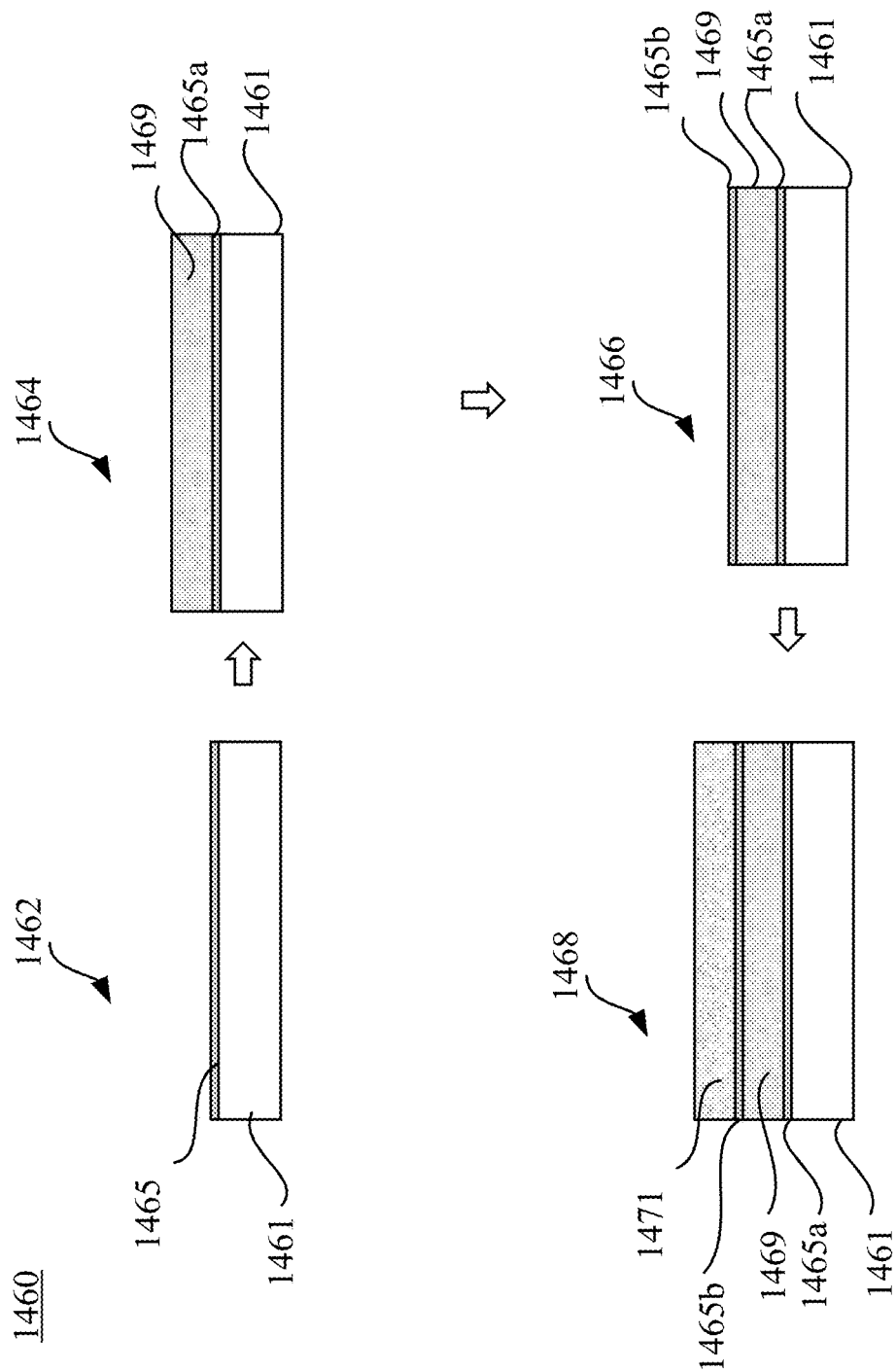

As shown in FIG. 14D, a process or method 1460 for fabricating a film stack may include a step 1462 of dispensing (e.g., depositing, coating) a first material on a surface (e.g., a top surface) of a substrate 1461 to form a first film 1465a. In some embodiments, the first material may include a photoalignment material, and the first film 1465a may be a photoalignment layer. In some embodiments, the step 1462 may also include exposing the first film 1465a under a polarized light irradiation for introducing a predetermined alignment direction. In some embodiments, the first material may include an inorganic material (e.g., $SiO_2$), which may be obliquely deposited on the surface (e.g., the top surface) of the substrate 1461 to form the first film 1465a.

The process 1460 for fabricating a film stack may include a step 1464 of dispensing (e.g., deposing, coating) a second material on a surface (e.g., a top surface) of the first film 1465a to form a second film 1469. In some embodiments, the second material may be an organic solid crystal, and the second film 1469 may be an organic solid crystal film. Crystal molecules in the second film 1469 may be aligned in a predetermined alignment direction by the first film 1465a. The second film 1469 may be an optically anisotropic film. In some embodiment, the step 1464 may also include annealing the second film 1469.

The process 1460 for fabricating a film stack may include a step 1466 of dispensing (e.g., depositing, coating) a third material on a surface (e.g., a top surface) of the second film 1469 to form a third film 1465b. In some embodiments, the third material may include a photoalignment material, and the third film 1465b may be a photoalignment layer. In some embodiments, the step 1466 may also include exposing the third film 1465b under a polarized light irradiation for introducing a predetermined alignment direction. In some embodiments, the first material may include an inorganic material (e.g., $SiO_2$), which may be obliquely deposited on the surface (e.g., the top surface) of the second film 1469 to form the third film 1465b. The third film 1465b may be substantially the same as or different from the first film 1465a.

The process 1460 for fabricating a film stack may include a step 1468 of dispensing (e.g., deposing) a fourth material on a surface (e.g., a top surface) of the third film 1465b to form a fourth film 1471. In some embodiments, the fourth material may be an organic solid crystal, and the fourth film 1471 may be an organic solid crystal film. Crystal molecules in the fourth film 1471 may be aligned in a predetermined alignment direction by the third film 1465b. The fourth film 1471 may be an optically anisotropic film. In some embodiment, the process 1468 may also include annealing the fourth film 1471.

Figure 14F:
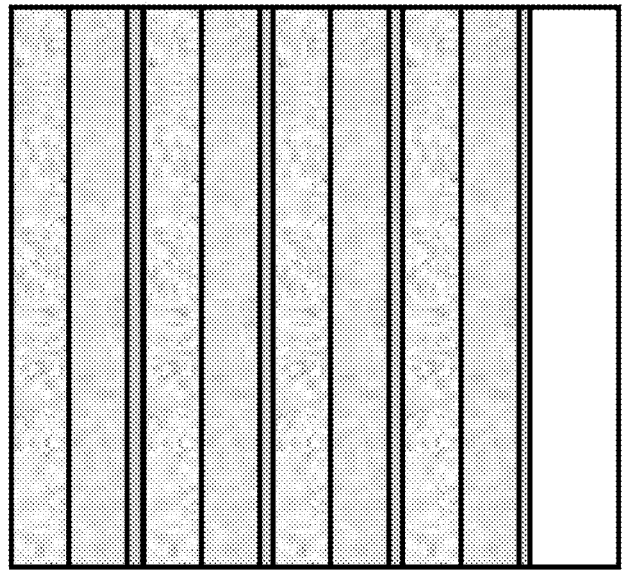
FIGS. 14E and 14F illustrate film stack fabricated based on the processes shown in FIG. 14D, according to various embodiments of the present disclosure.
Figure 14E:
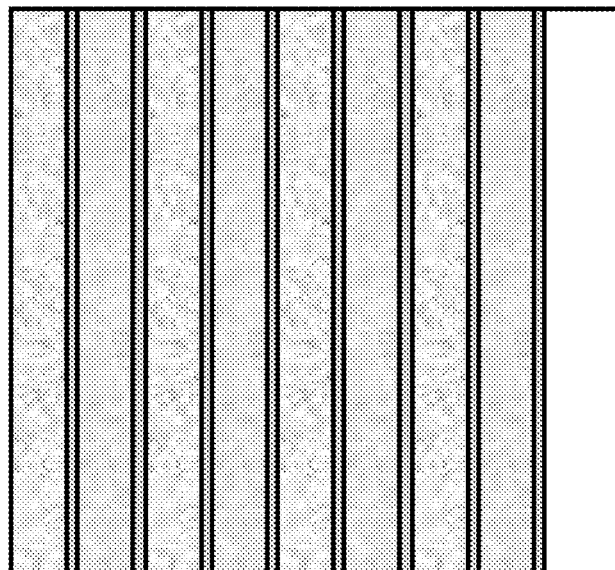

In some embodiments, the steps of forming the first film 1465a, the second film 1469, the third film 1465b, and the fourth film 1471 may be alternately repeated for achieving a predetermined number of films. For example, FIG. 14E illustrates a film stack 1480 (e.g., a thin-film stack 1480) fabricated based on the process shown in FIG. 14D. In some embodiments, one of the second material and the fourth material may be an optically isotropic material and the other may be the solid crystal material. Accordingly, one of the second film 1469 and the fourth film 1471 may be an optically isotropic film, and the other of the second film 1469 and the fourth film 1471 may be an optically anisotropic solid crystal film. Thus, one of the steps of forming the first film 1465a and the third film 1465b may be omitted and not repeated. For example, when the second film 1469 is an optically isotropic film and the fourth film 1471 is an optically anisotropic solid crystal film, the step of forming the first film 1465a may be omitted and not repeated. For example, when the fourth film 1471 is an optically isotropic film and the second film 1469 is an optically anisotropic solid crystal film the step of forming the third film 1465b may be omitted and not repeated. FIG. 14F illustrates a film stack 1490 (e.g., a thin-film stack 1490) fabricated based on the process shown in FIG. 14D.

In some embodiments, the present disclosure provides an organic solid crystal including a layer of an organic single crystal or a layer of a polycrystal having at least one crystal orientation along at least one in-plane direction. A first refractive index of the organic solid crystal may be in a range of about 1.6 to about 2.6 along at least one crystal orientation. An optical anisotropy of the solid crystal may be greater than or equal to about 0.03. An orientation of the first refractive index may be perpendicular to any of in-plane direction or in parallel with one of the in-plane directions. The organic solid crystal may be flat or curved.

In some embodiments, a method for fabricating a solid crystal includes growing an organic solid crystal via a physical vapor transport on a flat/curved substrate with a first surface (controlled-nucleation surface) in contact with the organic solid crystal. The flat/curved substrate may provide a mechanical support for the crystal growth, and define the curvature for at least one surface of the organic solid crystal. The controlled-nucleation surface may control the orientation of organic solid crystal molecules, therefore controlling the crystal orientation. In some embodiments, the first surface may include crystalline fluorine-containing polymers (e.g., polytetrafluoroethylene, polyvinylidene fluoride). In some embodiments, the fluorine-containing polymers may be formed in a state having the long chain substantially in parallel with one of the in-plane directions or perpendicular to the in-plane directions. In some embodiments, the controlled-nucleation surface may include polyolefin polymers (e.g., polyethylene). In some embodiments, the polyolefin polymers may be formed in a state having the long chain substantially in parallel with one of the in-plane directions or perpendicular to the in-plane directions. In some embodiments, the first surface may include liquid crystal polymers with the nematic phase, which allows the liquid crystal polymer molecules to align in pre-designed direction. In some embodiments, the controlled-nucleation surface may include alignment layer (e.g., photo-alignment layer, polyimide with uniaxial rubbing). In some embodiments, the controlled-nucleation surface may include amorphous polymers with a low surface energy (e.g., silicone, siloxane), such that the molecular orientation of the organic solid crystal may be controlled through surface energy. In some embodiments, the controlled-nucleation surface may include the same organic solid crystal or its derivatives. In some embodiments, the first surface may include amorphous/crystalline inorganic material (e.g., $SiO_2$). In some embodiments, the inorganic surface may be functionalized with organic ligands. In some embodiments, the controlled-nucleation surface may include one or more materials as listed above. In some embodiments, the substrate and the first surface may include the same material, which may be highly oriented by stretching and heating in one direction. Examples include polyethylene-naphthalate, polyphenylene-sulphide, polyolefin, polyimide. In some embodiments, the substrate may include a material that is different from the controlled-nucleation surface. Examples include inorganic materials such as $SiO_2$, fused silica, quartz, silicone, siloxane, silicon, SiC, $LiNbO_3$, sapphire, etc., organic materials such as fluorinated polymers, polyolefin, polycyclic aliphatic polymer, cyclic aromatic polymer, heteroaromatic polymer, etc.

In some embodiments, growing the organic solid crystal via physical vapor transport on a flat/curved substrate with a first surface (controlled-nucleation surface) in contact with the organic solid crystal may include the use of non-reactive gas such as non-solvent vapor (e.g., inert gas) and solvent vapor. Controlling type and percentage of non-solvent vapor may allow control over concentration of organic solid crystal vapor, the speed of flow, and kinetics of solidification, therefore controlling nucleation and crystal growth rate. The solvent vapor may selectively dissolve and remove defects, such as amorphous domains or boundary between polycrystalline domains.

In some embodiments, a method for fabricating a solid crystal includes growing an organic solid crystal via recrystallizing from a melting state, where an ampoule with a designed configuration and surface modification is employed. In some embodiments, the ampoule may include a nucleation area and a crystal growth area. The nucleation area may include at least one nucleation channel with the inner diameter ranging from sub-micron to centimeter size. Configuration of the channel (e.g., curved/straight cylinder) may allow a tuning of the lattice type and orientation. The nucleation area may be connected with the crystal growth area, which is larger in at least one dimension compared with nucleation channel. Configuration of the crystal growth area may be designed to comply the shape and size of the organic solid crystal. Examples include flat slab, curved slab, cuboid, cylinder, etc. In some embodiments, the ampoule may further include a double wall structure with the gap filled with buffer material (e.g., organic solid crystal of the same) to reduce impact of thermal expansion mismatch between ample and organic solid crystal as temperature changes during process. In some embodiments, an inside of the ampoule may be filled with organic solid crystal to be processed. Recrystallization may occur as the ampoule moves from a first temperature above the melting temperature to a second temperature below the melting temperature. The process may be repeated to the point where a desirable crystallinity is reached. In some embodiments, the growth of the organic solid crystal may also include the process of cleavage, polishing or in-mold lamination to adjust surface roughness, thickness, and/or a curvature.

In some embodiments, the ampoule may include a bulk piece for mechanical support and the surfaces in contact with the organic crystal to control the orientation of molecules, thereby controlling the crystal orientation. The surfaces may control the orientation of the organic solid crystal molecules, thereby controlling the crystal orientation. In some embodiments, the first surface may include crystalline fluorine-containing polymers (e.g., polytetrafluoroethylene, polyvinylidene fluoride). The fluorine-containing polymers may be formed in a state having the long chain substantially in parallel with one of the in-plane directions or perpendicular to the in-plane directions. In some embodiments, the controlled-nucleation surface may include polyolefin polymers (e.g., polyethylene). The polyolefin polymers may be formed in a state having the long chain substantially in parallel with one of the in-plane directions or perpendicular to the in-plane directions. In some embodiments, the first surface may include liquid crystal polymers with the nematic phase, which allows the liquid crystal polymer molecules to align in pre-designed direction. In some embodiments, the controlled-nucleation surface may include alignment layer (e.g., photo-alignment layer, polyimide with uniaxial rubbing). In some embodiments, the controlled-nucleation surface may include amorphous polymers with low surface energy (e.g., silicone, siloxane), such that the molecular orientation of the organic solid crystal may be controlled through surface energy. In some embodiments, the controlled-nucleation surface may include the same organic solid crystal or its derivatives. In some embodiments, the first surface may include amorphous/crystalline inorganic material (e.g., $SiO_2$). In some embodiments, the inorganic surface may be functionalized with organic ligands. In some embodiments, the controlled-nucleation surface may include one or more materials as listed above. In some embodiments, the substrate and the first surface may include the same material, which may be made highly oriented by stretching and heating in one direction. Examples include polyethylene-naphthalate, polyphenylene-sulphide, polyolefin, polyimide. In some embodiments, the substrate may include a material that is different from the controlled-nucleation surface. Examples include inorganic materials such as $SiO_2$, fused silica, quartz, silicone, siloxane, silicon, SiC, $LiNbO_3$, sapphire, etc., organic materials such as fluorinated polymers, polyolefin, polycyclic aliphatic polymer, cyclic aromatic polymer, heteroaromatic polymer, etc.

In some embodiments, a method for fabricating a solid crystal includes a first step of solvent assisted coating, and a second step of zone-annealing. The solvent coating system may include a blade to spread coating materials and create a meniscus area at the coating front to control solvent evaporation, a nozzle to deliver organic solid crystal solution to the coating front, a substrate to support organic solid crystal, and a temperature control of the substrate to control solvent evaporation. The zone-annealing system may include a heating zone and two cooling zones to control temperature profile, an automated arm to push the subject through heating and cooling zones with controlled speed, and a controlled atmosphere environment (e.g., vacuum, inert gas, solvent/non-solvent vapor). In some embodiments, the substrate may include a bulk piece and a controlled-nucleation surface in contact with organic solid crystal, where the bulk is to provide mechanical support and heat transfer, and the controlled-nucleation surface is to control the orientation of molecules therefore controlling the crystal orientation. In some embodiments, the first surface may include crystalline fluorine-containing polymers (e.g., polytetrafluoroethylene, polyvinylidene fluoride). In some embodiments, the fluorine-containing polymers may be formed in a state having the long chain substantially in parallel with one of the in-plane directions or perpendicular to the in-plane directions. In some embodiments, the controlled-nucleation surface may include polyolefin polymers (e.g., polyethylene). In some embodiments, the polyolefin polymers may be formed in a state having the long chain substantially in parallel with one of the in-plane directions or perpendicular to the in-plane directions. In some embodiments, the first surface may include liquid crystal polymers with the nematic phase, which allows the liquid crystal polymer molecules to align in pre-designed direction. In some embodiments, the controlled-nucleation surface may include alignment layer (e.g., photo-alignment layer, polyimide with uniaxial rubbing). In some embodiments, the controlled-nucleation surface may include amorphous polymers with low surface energy (e.g., silicone, siloxane), such that the molecular orientation of the organic solid crystal is controlled through surface energy. In some embodiments, the controlled-nucleation surface is mainly maid the same organic solid crystal or its derivatives. In some embodiments, the first surface may include amorphous/crystalline inorganic material (e.g., $SiO_2$). In some embodiments, the inorganic surface may be functionalized with organic ligands. In some embodiments, the controlled-nucleation surface may include one or more materials as listed above. In some embodiments, the substrate and the first surface are made of the same material, which has been made highly oriented by stretching and heating in one direction. Examples include polyethylene-naphthalate, polyphenylene-sulphide, polyolefin, polyimide. In some embodiments, the substrate may include a material that is different from the controlled-nucleation surface. Examples include inorganic materials such as $SiO_2$, fused silica, quartz, silicone, siloxane, silicon, SiC, $LiNbO^3$, sapphire, etc., organic materials such as fluorinated polymers, polyolefin, polycyclic aliphatic polymer, cyclic aromatic polymer, heteroaromatic polymer, etc. In some embodiments, the substrate may include a sandwich configuration, where an buffer layer (e.g., organic solid crystal of the same) is sandwiched in between two substrates. In some embodiments, the substrate further may include at least one micro-channel on the first surface, where the shape, size, or orientation of the micro-channel varies to comply crystallization round. In some embodiments, the growth of the organic solid crystal may further involve delamination from the substrate, and cutting or in-mold lamination to adjust shape and curvature. In some embodiments, the coating blade may further include microstructures to facilitate mass transport of organic solid crystal molecules from solution to crystallization front.

In some embodiments, a method for fabricating a solid crystal includes an electric field assisted deposition to crystalize organic molecules with controlled alignment. In some embodiments, the deposition system may include an anode, a cathode, and a gap in between, where the electric field may be adjusted and may drive the organic solid crystal molecules in the solution to crystalize on the surface of the electrodes with controlled crystallinity. Each of the electrodes further may include a conductive layer (e.g., ITO, conductive polymer) on its first surface.

In some embodiments, a method for fabricating a solid crystal includes gel spinning. During the gel spinning, the organic solid crystal, such as crystalline polymer (e.g., polyethylene naphthalate), may be fed into the extruder together with a solvent, and converted into a solution. Then the solution may be spun through a spinning plate containing a plurality of spin holes. The fluid fiber may be further cooled into to form gel fibers. Drawing of the fiber to promote chain alignment and crystallinity may occur either before, during or after evaporation of the solvent. The fabrication of the solid crystal may further involve shot compaction where compression press may be applied to uni-directionally arranged fibers at elevated temperatures.

In some embodiments, the organic solid crystal may include at least one of the polycyclic aromatic hydrocarbon molecules: naphthalene, anthracene, tetracene, pentacene, pyrene, polycene, fluoranthene, benzophenone, benzochromene, benzil, benzimidazole, benzene, hexachlorobenzene, nitropyridine-N-oxide, benzene-1, 4-dicarboxylic acid, diphenylacetylene, N-(4-nitrophenyl)-(s)-prolinal, 4,5-dicyanoimidazole, benzodithiophene, cyanopyridine, thienothiophene, stilbene, azobenzene, or their derivatives.

In some embodiments, the organic solid crystal may include at least one of the following molecules which contain a ring structure system and two terminal group systems. The ring structure system may include saturated cyclic groups, such as cyclohexane, cyclopentane, tetrahydropyran, piperidine, tetrahydrofuran, pyrrolidine, tetrahydrothiophene and their derivatives. The ring structure system may further include unsaturated aromatic groups, such as benzene, naphthalene, anthracene, thiophene, bi-phenyl, tolane, benzimidazole, diphenylacetylene, cyanopyridine, thienothiophene, dibenzothiophene, carbazole, silafluorene and their derivatives. The terminal groups system may include at least one of $C_1$-$C_{10}$ alkyl, alkoxy, alkenyl groups, —CN, —NCS, —SCN, —SF$_5$, —Br, —Cl, —F, —OCF$_3$, —CF$_3$, mono- or polyfluorinated $C_1$-$C_{10}$ alkyl, or alkoxy group.

In some embodiments, the organic solid crystal layer may include of crystalline polymers with precursors with aromatic hydrocarbon or heteroarene groups and their derivatives. Example of such polymer includes polyethylene naphthalate, poly (vinyl phenyl sulfide), poly(a-methyl styrene, polythienothiophene, polythiophene, poly(n-vinylphtalimide), parylene, polysulfide, polysulfone, poly(bromophenyl), poly(vinlynaphthalene), liquid crystal polymer with precursors with functional groups, such as naphthalene, anthracene, tetracene, pentacene, pyrene, polycene, fluoranthene, benzophenone, benzochromene, benzil, benzimidazole, benzene, hexachlorobenzene, nitropyridine-N-oxide, benzene-1, 4-dicarboxylic acid, diphenylacetylene, N-(4-nitrophenyl)-(s)-prolinal, 4,5-dicyanoimidazole, benzodithiophene, cyanopyridine, thienothiophene, stilbene, azobenzene, and their derivatives.

In some embodiments, the organic solid crystal layer may include amorphous polymers with aliphatic, hetroaliphatic, aromatic hydrocarbon or heteroarene groups (e.g., polystyrene) as binder. In some embodiments, the organic solid crystal layer may also include additives, such as fatty acid, lipids, plasticizer, and surfactant (e.g., molecules with mono- or polyfluorinated alkyl or alkoxy group).

In some embodiments, the present disclosure provides a multilayered film reflective polarizer including at least one layer that includes a contiguous solid crystal layer. The contiguous crystal layer maybe optically anisotropic with a first high refractive index of at least 1.5, and with an optical anisotropy of at least 0.1. In some embodiments, the multilayered film reflective polarizer may also include a substrate with a first surface, where the surface has an alignment layer. The contiguous solid crystal layer may be in contact with the alignment layer, and the solid crystal layer may be at least partially aligned with the alignment layer. The contiguous layer may guide an electromagnetic radiation a via total internal reflection.

In some embodiments, the multilayered film reflective polarizer may include a stack of multiple contiguous solid crystal layers, each separated by an alignment layer disposed on tor below the solid crystal layer. The solid crystal layer may be at least partially aligned with the alignment layer disposed therebelow. In some embodiments, the multilayered film reflective polarizer may include alternating first films (e.g., optically anisotropic solid crystal layers) and second films. The second film may include an amorphous polymer, an inorganic amorphous material, or an alignment layer. In some embodiments, the refractive indices of two neighboring first film and second film may not match each other in a first in-plane direction (e.g., x-axis direction), may substantially match each other in a second in-plane direction (e.g., y-axis direction) perpendicular the first in-plane direction. For example, $n_{1y}=n_{2y}$, and $n_{1x} \neq n_{2x}$. The multilayered film reflective polarizer may be configured to substantially reflect a light polarized in the first in-plane direction (e.g., the x-axis direction) and to substantially transmit a light polarized in the second in-plane direction (e.g., the y-axis direction). The first film (e.g., optically anisotropic solid crystal layer) may be an optically anisotropic film, and the second film may be an optically anisotropic or isotropic film. When the second film is an optically anisotropic or isotropic film, $n_{2y}=n_{2x} \neq n_{1x}$.

In some embodiment, the alignment layer may include a photosensitive material, of which the molecules/functional groups are capable of orientational ordering under a polarized light irradiation. In some embodiment, the alignment layer may include a polymer, of which the polymer chain/functional group are capable of orientational ordering under mechanical rubbing. In some embodiment, the alignment layer may include an amorphous polymer, in which the orientation of the solid crystal layer may be induced by a surface interaction. In some embodiment, the alignment layer may include a liquid crystalline or crystalline polymer. In some embodiment, the alignment layer may include an amorphous or crystalline inorganic material. In some embodiment, the alignment layer may include a mixture of the above materials.

In some embodiment, the solid crystal layer may include at least one of the polycyclic aromatic hydrocarbon molecules: naphthalene, anthracene, tetracene, pentacene, pyrene, polycene, fluoranthene, benzophenone, benzochromene, benzil, benzimidazole, benzene, hexachlorobenzene, nitropyridine-N-oxide, benzene-1, 4-dicarboxylic acid, diphenylacetylene, diphenylbutadiyne, 1-chloro-4-phenylethynyl benzene, N-(4-nitrophenyl)-(s)-prolinal, 4,5-dicyanoimidazole, benzodithiophene, cyanopyridine, thienothiophene, stilbene, azobenzene, and their derivatives.

In some embodiment, the solid crystal layer may include at least one of the following molecules containing a ring structure system and two terminal group systems. The ring structure system may include saturated cyclic groups, such as cyclohexane, cyclopentane, tetrahydropyran, piperidine, tetrahydrofuran, pyrrolidine, tetrahydrothiophene and their derivatives. The ring structure system may also include unsaturated aromatic groups, such as benzene, naphthalene, anthracene, thiophene, bi-phenyl, tolane, benzimidazole, diphenylacetylene, cyanopyridine, thienothiophene, dibenzothiophene, carbazole, silafluorene and their derivatives. The terminal groups system may include one or more $C_1$-$C_{10}$ alkyl, alkoxy, alkenyl groups, —CN, —NCS, —SCN, —SF$_5$, —Br, —Cl, —F, —OCF$_3$, —CF$_3$, mono- or polyfluorinated $C_1$-$C_{10}$ alkyl or alkoxy group.

In some embodiments, the solid crystal layer may include a crystalline polymers and organic crystals molecules (including at least one of the above-mentioned polycyclic aromatic hydrocarbon molecules or the above-mentioned molecules containing a ring structure system and two terminal group systems). In some embodiments, the crystalline polymers may also include precursors with aromatic hydrocarbon or heteroarene groups and their derivatives. Example of such polymer includes polyethylene naphthalate, poly(vinyl phenyl sulfide), poly(a-methyl styrene, polythienothiophene, polythiophene, poly(n-vinylphtalimide), parylene, polysulfide, polysulfone poly(bromophenyl), poly(vinlynaphthalene), liquid crystal polymer with precursors with functional groups. In some embodiments, the functional groups may include saturated cyclic groups such as cyclohexane, cyclopentane, tetrahydropyran, piperidine, tetrahydrofuran, pyrrolidine, tetrahydrothiophene, or their derivatives. In some embodiments, the functional groups may include unsaturated aromatic groups such as benzene, naphthalene, anthracene, thiophene, bi-phenyl, tolane, benzimidazole, diphenylacetylene, cyanopyridine, thienothiophene, dibenzothiophene, carbazole, silafluorene, or their derivatives. In some embodiments, the functional groups may include $C_1$-$C_{10}$ alkyl, alkoxy, alkenyl groups, —CN, —NCS, —SCN, —$SF_5$, —Br, —Cl, —F, —$OCF_3$, —$CF_3$, mono- or polyfluorinated $C_1$-$C_{10}$ alkyl or alkoxy group).

In some embodiment, forming the alignment layer may include coating a layer of photoalignment material including polymeric molecules or small molecules, and exposing the layer of photoalignment material for generating a molecular orientation. In some embodiment, forming the alignment layer may include coating a polymer film, annealing the polymer film, unidirectionally rubbing the polymer film. In some embodiment, forming the alignment layer may include forming an amorphous or crystalline organic polymer alignment film from a solution via spin coating, blade coating, slot-die coating, printing or gaseous phase including physical or chemical vapor deposition. In some embodiment, forming the alignment layer may include forming an inorganic alignment layer via physical or chemical vapor deposition in oblique geometry. In some embodiment, the organic solid crystal layer may be formed through physical vapor deposition. In some embodiment, the organic solid crystal layer may be formed by blade coating, slot-die coating, or ink-jet coating. The process of forming the alignment layers and the organic solid crystal layers may be alternated repeated for achieving a designed number of layers. In some embodiment, a post process, such as thermal annealing or zone annealing, may be used to improve crystallinity in the organic solid crystal layer.

In some embodiments, the present disclosure provides a film stack (e.g., a thin-film stack). The film stack includes a plurality of first films and a plurality of second films alternately stacked. At least one second film of the plurality of second films includes a solid crystal including crystal molecules aligned in a predetermined alignment direction. At least one first film of the plurality of first films includes an alignment structure configured to at least partially align the crystal molecules of the solid crystal in the predetermined alignment direction. In some embodiments, the solid crystal is an organic solid crystal. In some embodiments, the at least one first film includes an anisotropic organic material, an anisotropic inorganic material, an isotropic organic material, or an isotropic inorganic material. For example, each first film may include an anisotropic organic material, an anisotropic inorganic material, an isotropic organic material, or an isotropic inorganic material. In some embodiments, the at least one first film (e.g., each first film) includes an anisotropic organic solid crystalline material, an anisotropic crystalline polymer, an anisotropic inorganic crystalline material, an isotropic organic material, or an isotropic inorganic material. In some embodiments, the at least one second film has a higher in-plane optical anisotropy than the at least one first film.

In some embodiments, an in-plane optical anisotropy of the at least one second film is at least about 0.2, at least about 0.25, at least about 0.3, at least about 0.35, at least about 0.4, at least about 0.45, or at least about 0.5. In some embodiments, an in-plane optical anisotropy of the at least one first film is smaller than about 0.1, smaller than about 0.08, smaller than about 0.05, or smaller than about 0.03. In some embodiments, a refractive index difference between a first in-plane refractive index of the at least one second film and a first in-plane refractive index of the at least one first film is at least about 0.2, at least about 0.25, at least about 0.3, at least about 0.35, at least about 0.4, at least about 0.45, or at least about 0.5. In some embodiments, a refractive index difference between a second in-plane refractive index of the at least one second film and a second in-plane refractive index of the at least one first film is smaller than about 0.1, smaller than about 0.08, smaller than about 0.05, or smaller than about 0.03. In some embodiments, an in-plane optical anisotropy of the at least one of the plurality of first films is at least about 0.2, at least about 0.25, at least about 0.3, at least about 0.35, at least about 0.4, at least about 0.45, or at least about 0.5.

In some embodiments, the alignment structure includes at least one of a photosensitive material, a polymer, an amorphous polymer, liquid crystalline, a liquid crystalline polymer, an amorphous inorganic material, or a crystalline inorganic material. In some embodiments, the solid crystal is in a form of a continuous layer. In some embodiments, the plurality of second films include a plurality of solid crystals disposed in a stacked configuration, and the plurality of first films include a plurality of alignment structures disposed between the solid crystals. In some embodiments, the solid crystal is optically anisotropic with a principal refractive index of at least about 1.5 and an optical anisotropy of at least about 0.1, the principal refractive index being a refractive index in a direction parallel to an axis of the solid crystal, and the axis of the solid crystal being an axis along which the solid crystal has a highest refractive index. In some embodiments, the film stack also includes a plurality of third films alternately stacked with the first films and the second films.

In some embodiments, at least one of the plurality of third films includes an anisotropic organic material, an anisotropic inorganic material, an isotropic organic material, or an isotropic inorganic material. In some embodiments, the solid crystal may include at least one of: a saturated or unsaturated polycyclic hydrocarbon, including at least one of anthracene, tetracene, pentacene, a derivative of the anthracene, a derivative of the tetracene, or a derivative of the pentacene; nitrogen, sulfur, and oxygen heterocycle; quinoline, benzothiophene, or benzopyran; bent and asymmetric acene including at least one of phenanthrene, phenanthroline, pyrene, fluoranthene, a derivative of the phenanthrene, a derivative of the phenanthroline, a derivative of the pyrene, or a derivative of the fluoranthene; 2,6-naphthalene dicarboxylic acid, 2,6 dimethyl carboxylic ester crystal molecules, a derivative of the 2,6-naphthalene dicarboxylic acid, or a derivative of the 2,6 dimethyl carboxylic ester crystal molecules; or biphenyl, terphenyl, quaterphenyl, or phenylacetylene, or derivatives of the biphenyl, terphenyl, quaterphenyl, or phenylacetylene including substitutes with alkyl groups, cyano groups, isothiocyanate groups, fluorine, chlorine or fluorinated ether.

In some embodiments, the solid crystal has a light transmittance of greater than or equal to 60% in a visible wavelength spectrum. In some embodiments, the alignment structure includes at least one of: a photo-alignment material layer; a mechanically rubbed alignment layer; an alignment layer with anisotropic nanoimprint; an anisotropic relief; a ferroelectric or ferromagnetic material; a thin crystalline layer; or an alignment layer formed by crystallization in a presence of a magnetic field or an electric field.

In some embodiments, the alignment structure includes a hexagonal boron nitride or graphene layer. In some embodiments, the at least one second film is uniaxially or biaxially anisotropic. In some embodiments, the film stack is configured to function as a reflective polarizer to selectively transmit a light with a first polarization, and selectively reflect a light with a second polarization orthogonal to the first polarization.

In some embodiments, the film stack also includes a substrate having a light transmittance of greater than or equal to about 60% in a visible wavelength spectrum, and configured to support the alignment structure. In some embodiments, the substrate includes at least one of a glass, a polymer, or a semiconductor material. In some embodiments, at least one surface of the substrate has a curved shape. The curved shape is one of a convex, concave, asphere, cylindrical, or freeform shape.

In some embodiments, the present disclosure also provides a method. The method includes providing a first alignment structure on a surface of a substrate. The method also includes forming a first solid crystal on the first alignment structure, the first solid crystal including first crystal molecules aligned in a first alignment direction. The method also includes providing a second alignment structure on the first solid crystal. The method also includes forming a second solid crystal on the second alignment structure, the second solid crystal including second crystal molecules aligned in a second alignment direction. Refractive indices of the first solid crystal and the first alignment structure in a first in-plane direction are different. In some embodiments, refractive indices of the first solid crystal and the first alignment structure in a second in-plane direction orthogonal to the first in-plane direction are substantially the same. In some embodiments, providing the first alignment structure on the surface of the substrate includes one of: forming an alignment layer on the substrate through a wet deposition or a vapor phase deposition; or forming an anisotropic relief directly on the substrate through a particle beam treatment. In some embodiments, forming the first solid crystal on the first alignment structure includes: forming the first solid crystal on the first alignment structure through a wet deposition or a vapor phase deposition. In some embodiments, providing the second alignment structure on the first solid crystal includes one of: forming an alignment layer on the first solid crystal through a vapor phase deposition; or forming an anisotropic relief directly on the first solid crystal through a particle beam treatment.

In some embodiments, forming the second solid crystal on the second alignment structure includes: forming the second solid crystal on the second alignment structure through a wet deposition or a vapor phase deposition. In some embodiments, before providing the second alignment structure on the first solid crystal, the method further includes: forming a third film on the first solid crystal, wherein the third film includes the second alignment structure. In some embodiments, forming the third film on the first solid crystal further comprises one of: forming an alignment layer as the third film on the first solid crystal through a vapor phase deposition; or forming an anisotropic relief directly on the third film through a particle beam treatment. In some embodiments, the third film includes an optical isotropic material.

In some embodiments, the present disclosure also provides a method. The method includes alternately forming first films and second films on a substrate. At least one second film includes a solid crystal including crystal molecules aligned in a predetermined alignment direction. At least one first film includes an alignment structure configured to at least partially align the crystal molecules of the solid crystal in the predetermined alignment direction. In some embodiments, refractive indices of the first solid crystal and the first alignment structure in a first in-plane direction are different, and refractive indices of the first solid crystal and the first alignment structure in a second in-plane direction orthogonal to the first in-plane direction are substantially the same. In some embodiments, the method also includes forming a third film between the at least one second film and the at least one first film. The third film is an optically isotropic film.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A film stack, comprising:
   a plurality of first films and a plurality of second films alternately stacked,
   wherein at least one second film of the plurality of second films includes a solid crystal including crystal molecules aligned in a predetermined alignment direction,
   wherein at least one first film of the plurality of first films includes an alignment structure configured to at least partially align the crystal molecules of the solid crystal in the predetermined alignment direction, and
   wherein an in-plane optical anisotropy of the at least one second film is at least 0.5.

2. The film stack of claim 1, wherein the solid crystal is an organic solid crystal.

3. The film stack of claim 1, wherein the at least one first film includes an anisotropic organic material, an anisotropic inorganic material, an isotropic organic material, or an isotropic inorganic material.

4. The film stack of claim 1, wherein the in-plane optical anisotropy of the at least one second film a is higher than an in-plane optical anisotropy of the at least one first film.

5. The film stack of claim 1,
   wherein an in-plane optical anisotropy of the at least one first film is smaller than 0.1.

6. The film stack of claim 1,
   wherein a first refractive index difference between a first in-plane refractive index of the at least one second film and a first in-plane refractive index of the at least one first film is at least 0.2, and a second refractive index difference between a second in-plane refractive index of the at least one second film and a second in-plane refractive index of the at least one first film is smaller than 0.1.

7. The film stack of claim 1, wherein the alignment structure includes at least one of a photosensitive material, a polymer, an amorphous polymer, liquid crystalline, a liquid crystalline polymer, an amorphous inorganic material, or a crystalline inorganic material.

8. The film stack of claim 1, wherein
   the plurality of second films include a plurality of solid crystals disposed in a stacked configuration, and
   the plurality of first films include a plurality of alignment structures disposed between the solid crystals.

9. The film stack of claim 1, wherein the solid crystal is optically anisotropic with a principal refractive index of at least 1.5, the principal refractive index being a refractive index in a direction parallel to an axis of the solid crystal, and the axis of the solid crystal being an axis along which the solid crystal has a highest refractive index.

10. The film stack of claim 1, further comprising a plurality of third films alternately stacked with the first films and the second films.

11. The film stack of claim 10, wherein at least one of the plurality of third films includes an anisotropic organic material, an anisotropic inorganic material, an isotropic organic material, or an isotropic inorganic material.

12. A film stack, comprising:
    a plurality of first films and a plurality of second films alternately stacked,
    wherein at least one second film of the plurality of second films includes a solid crystal including crystal molecules aligned in a predetermined alignment direction,
    wherein at least one first film of the plurality of first films includes an alignment structure configured to at least partially align the crystal molecules of the solid crystal in the predetermined alignment direction, and
    wherein the alignment structure includes a hexagonal boron nitride or graphene layer.

13. The film stack of claim 1, wherein the at least one second film is uniaxially or biaxially anisotropic.

14. The film stack of claim 1, wherein the film stack is configured to function as a reflective polarizer to selectively transmit a light with a first polarization, and selectively reflect a light with a second polarization orthogonal to the first polarization.

15. The film stack of claim 12,
    wherein a first in-plane optical anisotropy of the at least one first film is smaller than 0.1, and a second in-plane optical anisotropy of the at least one second film is at least 0.2.

* * * * *